United States Patent [19]

Yamada et al.

[11] Patent Number: 5,473,450

[45] Date of Patent: Dec. 5, 1995

[54] LIQUID CRYSTAL DISPLAY DEVICE WITH A POLYMER BETWEEN LIQUID CRYSTAL REGIONS

[75] Inventors: Nobuaki Yamada, Higashiosaka; Tomoaki Kuratate, Kobe; Tokihiko Shinomiya, Nara; Toshiyuki Hirai, Tenri; Kohichi Fujimori, Nabari; Masahiko Kondo, Kitakatsuragi; Noriaki Onishi, Osaka; Shuichi Kohzaki, Nara; Kenji Majima, Tenri; Katunobu Awane, Ikoma, all of Japan

[73] Assignee: Sharp Kabushiki Kaisha, Osaka, Japan

[21] Appl. No.: 54,454

[22] Filed: Apr. 27, 1993

[30] Foreign Application Priority Data

| Apr. 28, 1992 | [JP] | Japan | 4-110223 |
|---|---|---|---|
| Aug. 7, 1992 | [JP] | Japan | 4-211846 |
| Oct. 23, 1992 | [JP] | Japan | 4-286487 |
| Nov. 18, 1992 | [JP] | Japan | 4-309082 |
| Nov. 20, 1992 | [JP] | Japan | 4-312444 |
| Nov. 25, 1992 | [JP] | Japan | 4-315419 |
| Nov. 30, 1992 | [JP] | Japan | 4-321024 |
| Dec. 7, 1992 | [JP] | Japan | 4-327037 |
| Dec. 17, 1992 | [JP] | Japan | 4-337651 |
| Feb. 19, 1993 | [JP] | Japan | 5-030996 |
| Apr. 2, 1993 | [JP] | Japan | 5-077253 |
| Apr. 5, 1993 | [JP] | Japan | 5-078378 |

[51] Int. Cl.$^6$ ............................ G02F 1/13; G02F 1/1335
[52] U.S. Cl. ........................... 359/51; 359/52; 359/62
[58] Field of Search .................... 359/51, 52, 62

[56] References Cited

U.S. PATENT DOCUMENTS

| 4,295,712 | 10/1981 | Ishiwatari | 359/81 |
|---|---|---|---|
| 4,579,423 | 4/1986 | Fergason | 359/51 |
| 4,671,618 | 6/1987 | Wu et al. | 359/51 |
| 4,815,826 | 3/1989 | Fergason | 359/51 |

(List continued on next page.)

FOREIGN PATENT DOCUMENTS

| 0552508 | 7/1993 | European Pat. Off. . |
|---|---|---|
| 1376926 | 12/1974 | Germany . |
| 4104183 | 7/1992 | Germany . |
| 58-501631 | 9/1983 | Japan . |
| 59-201021 | 11/1984 | Japan . |

(List continued on next page.)

OTHER PUBLICATIONS

Japanese Journal of Applied Physics, vol. 31, Pt. 2, No. 3B, Mar. 15, 1992, pp. L352–L354.

E. Shimada et al., Extended Abstracts, The 17th Liquid Crystal Forum, pp. 320–321 dated Sep. 23–25, 1991, "Control of an Initial Orientation in Polymer Dispersal Liquid Crystal".

J. D. Margerum et al., Liquid Crystals, vol. 5, No. 5, pp. 1477–1487, 1989, "Effects of off–state alignment in polymer dispersed liquid crystals".

(List continued on next page.)

*Primary Examiner*—Anita Pellman Gross
*Attorney, Agent, or Firm*—David G. Conlin; Kevin J. Fournier

[57] ABSTRACT

A liquid crystal display device of the present invention includes: two substrates facing each other, at least one of the substrates being transparent; electrodes disposed on inside surfaces of the respective substrates; a display medium which is provided between the two substrates and formed of polymer walls containing a polymer as their main component and liquid crystal regions containing liquid crystal as their main component; and a plurality of pixels, wherein the liquid crystal regions are partitioned by the polymer walls and are close to the substrates, portions of the liquid crystal regions close to the substrates being in parallel with the substrates, an interval a between the center of one liquid crystal region and the center of an adjacent liquid crystal region in a direction along the surface of the substrate is within a width of one pixel along the direction, and 80% or more of the intervals a satisfy the relationship: $3b/2 > a > b/2$, where b is an average of the intervals a.

95 Claims, 26 Drawing Sheets

U.S. PATENT DOCUMENTS

| | | | |
|---|---|---|---|
| 4,890,902 | 1/1990 | Doane et al. | 359/51 |
| 4,891,152 | 1/1990 | Miller et al. | 252/299.01 |
| 4,948,232 | 8/1990 | Lange | 359/62 |
| 4,971,719 | 11/1990 | Vaz et al. | 252/299.5 |
| 5,015,074 | 5/1991 | Clerc et al. | 359/53 |
| 5,018,840 | 5/1991 | Ogawa | 359/51 |
| 5,089,904 | 2/1992 | Fergason | 359/52 |
| 5,096,282 | 3/1992 | Margerum et al. | 359/51 |
| 5,103,326 | 4/1992 | Fergason | 359/51 |
| 5,204,763 | 4/1993 | Hikmet | 359/51 |
| 5,210,630 | 5/1993 | Heynderickx et al. | 359/103 |
| 5,262,882 | 11/1993 | Hikmet | 359/51 |
| 5,274,481 | 12/1993 | Kim | 359/51 |
| 5,327,271 | 7/1994 | Takeuchi et al. | 359/51 |
| 5,333,074 | 7/1994 | Hikmet | 359/51 |

FOREIGN PATENT DOCUMENTS

| | | |
|---|---|---|
| 59-226322 | 12/1984 | Japan . |
| 61-502128 | 8/1986 | Japan . |
| 61-205920 | 9/1986 | Japan . |
| 62-277412 | 12/1987 | Japan . |
| 63-264724 | 11/1988 | Japan . |
| 63-264723 | 11/1988 | Japan . |
| 63-264721 | 11/1988 | Japan . |
| 63-264722 | 11/1988 | Japan . |
| 1-145635 | 6/1989 | Japan . |
| 1-145636 | 6/1989 | Japan . |
| 1-269922 | 10/1989 | Japan . |
| 2-28284 | 1/1990 | Japan . |
| 2-85822 | 3/1990 | Japan . |
| 2-75688 | 3/1990 | Japan . |
| 2-99920 | 4/1990 | Japan . |
| 2-116824 | 5/1990 | Japan . |
| 2-153318 | 6/1990 | Japan . |
| 2-153319 | 6/1990 | Japan . |
| 2-272422 | 11/1990 | Japan . |
| 2-272423 | 11/1990 | Japan . |
| 2-272424 | 11/1990 | Japan . |
| 3-46621 | 2/1991 | Japan . |
| 3-61925 | 3/1991 | Japan . |
| 3-59515 | 3/1991 | Japan . |
| 3-72317 | 3/1991 | Japan . |
| 3-192334 | 8/1991 | Japan . |
| 3-278024 | 12/1991 | Japan . |
| 4-14015 | 1/1992 | Japan . |
| 4-31824 | 2/1992 | Japan . |
| 4-39622 | 2/1992 | Japan . |
| 4-39623 | 2/1992 | Japan . |
| 4-31823 | 2/1992 | Japan . |
| WO89/09807 | 10/1989 | WIPO . |

OTHER PUBLICATIONS

H. Yoshida et al., Japan Display '92, pp. 631–634, S17–1 "A Full–Color TFT–LCD with a Polymer–Dispersed Structure".

T. Kamada et al., Japan Display '92, p. 886, PD–12 "Wide Viewing Angle Full–Color TFT LCDs".

K. Takatori et al., Japan Display '92, pp. 591–594, S–15–6 "A Complementary TN LCD with Wide–Viewing–Angle Grayscale".

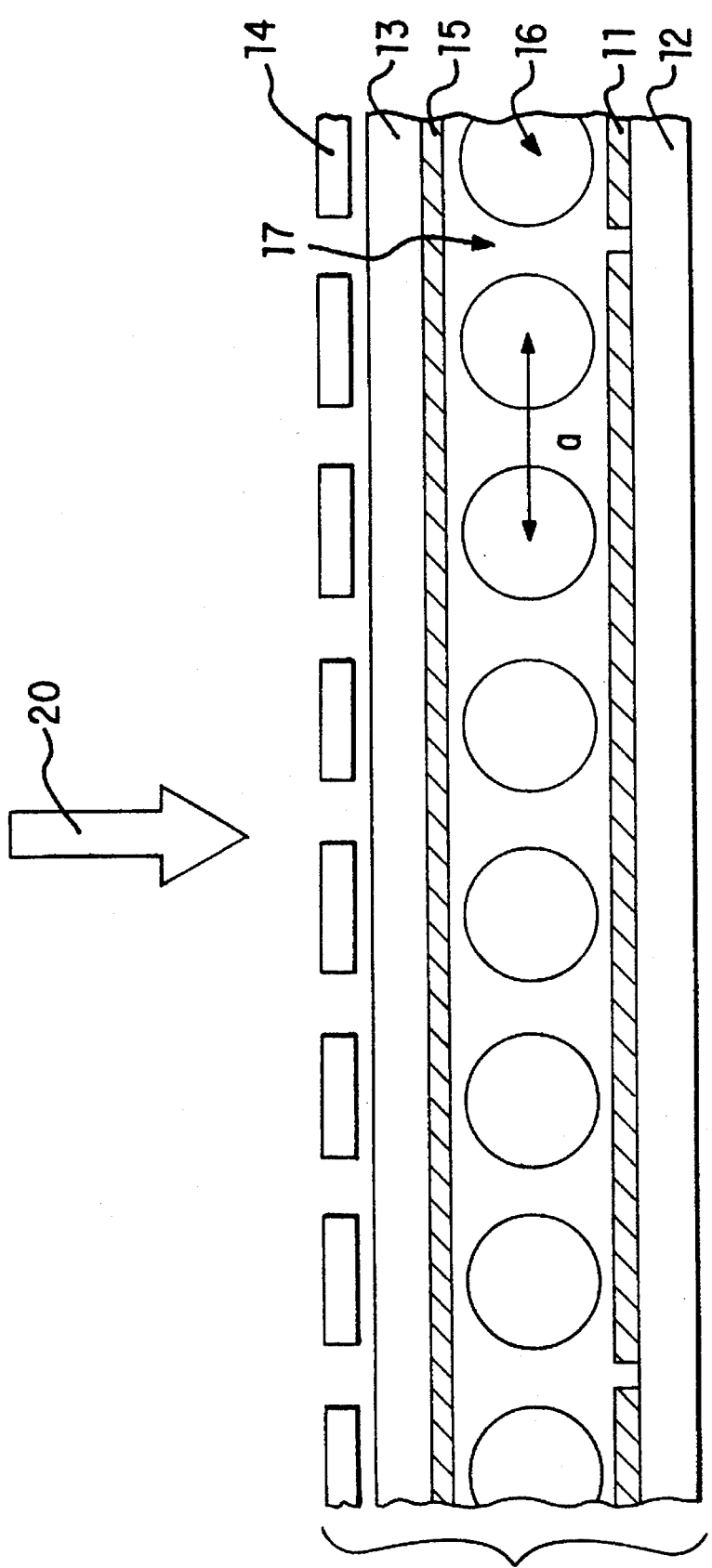

LIQUID CRYSTAL DISPLAY DEVICE WITH A POLYMER BETWEEN LIQUID CRYSTAL REGIONS

BACKGROUND OF THE INVENTION

1. Field of the Invention

The present invention relates to a liquid crystal display device in which a display medium having liquid crystal regions partitioned by polymer walls formed of a polymer is sandwiched between two facing substrates, and a method for producing the same.

2. Description of the Related Art

There are various kinds of display modes for a liquid crystal display device. For example, as liquid crystal display devices taking advantage of electro-optic effects, liquid crystal display devices of a twisted nematic (TN) mode, a super twisted nematic (STN) mode, etc. using nematic liquid crystal molecules have been put to practical use. In addition, a liquid crystal display device using ferroelectric liquid crystal (FLC) has been proposed. These liquid crystal display devices require polarizing plates and an orientation treatment.

Examples of liquid crystal display devices taking advantage of light scattering of liquid crystal, requiring no polarizing plates include a liquid crystal display device of a dynamic scattering (DS) mode or a phase change (PC) mode.

In recent years, a liquid crystal display device requiring no polarizing plates or orientation treatment; i.e., a liquid crystal display device taking advantage of the birefringence of liquid crystal and electrically regulating a transparent state and an opaque state of the device has been proposed. According to the system of this type of liquid crystal display device, a display is performed as follows:

When liquid crystal molecules are aligned by the application of a voltage, the ordinary refractive index of the liquid crystal molecules and the refractive index of a medium for supporting the liquid crystal molecules, such as a polymer coincide with each other, whereby a transparent state is obtained. On the other hand, when no voltage is applied to the device, light scattering is caused due to the turbulence of the orientation of the liquid crystal molecules. In this way, a display is performed.

As a method for producing a light scattering type liquid crystal display device of this system, the following five methods have been proposed.

(1) A display medium is obtained by making liquid crystal contained in polymer capsules (Japanese National Publication No. 58-501631).

(2) A light-curable or thermosetting resin and liquid crystal are mixed; and only the resin is deposited and cured. Then, liquid crystal regions in a spherical shape are formed in the cured resin (Japanese National Publication No. 61-502128).

(3) The diameter of spherical liquid crystal regions is regulated (Japanese Laid-Open Patent Publication No. 3-72317).

(4) A polymer porous film is impregnated with liquid crystal (Japanese Laid-Open Patent Publication No. 3-59515).

(5) Beads formed of a polymer which become a source for light scattering are floated in liquid crystal provided between two transparent electrodes disposed apart from each other (Japanese Laid-Open Patent Publication No. 3-46621).

However, in the case of method (1), since the liquid crystal contained in the polymer capsule is in the form of an individual sphere, a drive voltage for changing the orientation of the liquid crystal molecules is varied depending upon each liquid crystal region. As a result, a drive voltage for simultaneously operating all of the liquid crystal regions is increased, narrowing the application range of the liquid crystal display device.

In the case of method (2), it is difficult to precisely regulate each diameter of the liquid crystal regions in a spherical shape although a phase separation method is used.

In the case of method (3), it is difficult to precisely align the liquid crystal regions in a round shape in a planar manner although a phase separation method is used.

In the case of method (4), there are advantages in that appropriate resin materials and liquid crystal can be selected over a wide range, since a phase separation is not utilized when the liquid crystal regions are formed; and polymer porous films can sufficiently be purified. However, there are disadvantages in that each diameter of the liquid crystal regions in a round shape cannot sufficiently be regulated; and the liquid crystal regions cannot precisely be positioned in a direction along the surface of the substrate.

In the case of method (5), although the intensity of light scattering is large, it is difficult to uniformly disperse the beads and to cause light scattering at almost the same level in each pixel, resulting in the likelihood of an uneven display.

As described above, in a polymer dispersed liquid crystal display device using polymer type liquid crystal, in which liquid crystal regions are dispersed, it has been difficult to form the liquid crystal display regions in a uniform manner and to precisely regulate the position of the liquid crystal regions in a direction along the surface of the substrate. Thus, the liquid crystal regions have a variety of different diameters and the distribution thereof is not uniform. In addition, because of the difficulty in precisely positioning the liquid crystal regions, the drive voltage for each liquid crystal region is different. This results in a threshold value characteristic curve which is not steep and the drive voltage becomes relatively high. Moreover, a number of small liquid crystal regions having low light scattering ability are present, so that contrast in the resulting display is relatively low.

Since the shape of the liquid crystal regions is not uniform and it is difficult to regulate the position of the liquid crystal regions in a direction along the surface of the substrate, a large screen cannot be obtained under a high precision condition. Moreover, in the case where a simple matrix drive method, in which signals are turned on/off to obtain an average signal and a liquid crystal display device is driven by the average signal, is used for the polymer dispersed liquid crystal display device, a duty ratio (i.e., a ratio of time during which each signal is turned on) cannot be made large.

Furthermore, in the polymer dispersed liquid crystal display device, it is difficult to perform orientation treatment. The reason for this is described as follows:

An example of an orientation treatment method is proposed in Japanese Laid-Open Patent Publication No. 3-52843 and "Liquid crystal", Vol. 5, No. 5, p. 1477, (1989). According to this method, a magnetic field, an electric field, etc. are applied to a liquid crystal display device during a production stage while a polymer is formed by the polymerization. However, in this method, since the surface of the polymer is not directly subjected to an orientation treatment, the orientation regulating ability is weak. In addition, liquid crystal molecules are aligned only in one direction, so that this method cannot be applied to modes such as a TN mode and an STN mode, in which liquid crystal molecules should be aligned in different directions to each other along the facing sides of two substrates sandwiching the liquid crystal.

Another example of an orientation treatment method is described in "Extended Abstracts", p. 320 (The 17th Liquid Crystal Forum). According to this method, liquid crystal molecules are indirectly oriented via polymer walls formed on substrates which are subjected to an orientation treatment. However, in this method, it is impossible to prevent a polymer from remaining on the surface of an orientation film on the pixel electrodes, which makes it difficult to directly align liquid crystal molecules and remarkably decreases an orientation regulating ability in the same way as in the above-mentioned method. This causes serious practical problems in the use of a liquid crystal display device obtained by using this method.

Moreover, as described above, in a liquid crystal display device which uses ferroelectric liquid crystal, requiring polarizing plates and an orientation treatment, a smectic (SmC*) phase is utilized for the purpose of causing spontaneous polarization. The regularity of this phase structure is closer to that of crystal, compared with that of a nematic phase, so that the smectic phase is weak against a physical shock. In order to solve this problem, it is considered that a physical shock is alleviated by dispersing ferroelectric liquid crystal in a polymer. However, this method is not put to practical use since it is difficult to perform an orientation treatment in the polymer.

Japanese Laid-Open Patent Publication Nos. 63-264721 and 264722 propose a method for aligning ferroelectric liquid crystal molecules in a polymer. According to this method, a polymer in which ferroelectric crystal is dispersed is formed on a film and is subjected to uniaxial stretching, whereby the ferroelectric liquid crystal molecules are aligned. However, in this method, since a number of interfaces between liquid crystal regions and the polymer walls are present in one pixel, linearly polarized light which is incident upon a liquid crystal display device is scattered and part of the light is depolarized. As a result, the opaque level of the liquid crystal display device is decreased, which causes deteriorated contrast. In the same way, this problem is caused in other display modes requiring polarizing plates, such as the TN mode, the STN mode, and the electrically controlled birefringence (ECB) mode.

Japanese Laid-Open Patent Publication Nos. 59-201021, 61-205920, and 3-192334 disclose that in order to provide shock resistance of an FLC, polymer walls are formed by photolithography on a substrate material subjected to an orientation treatment to form a cell, and then liquid crystal is injected into the cell. However, according to this method, independent liquid crystal areas cannot be formed and cell thickness cannot be regulated with precision.

As described above, it is difficult to conduct an orientation treatment simultaneously with dispersing a liquid crystal material in a polymer. Even though the orientation treatment can be conducted, contrast is remarkably decreased due to the depolarization caused by light scattered on the interfaces between the liquid crystal and the polymer. The reason why it is difficult to conduct the orientation treatment is that the polymer enters between the substrate and the liquid crystal when the liquid crystal is dispersed in the polymer. The light scattering caused on the interfaces between the liquid crystal and the polymer can be prevented by decreasing the interfaces between the liquid crystal in the pixels and the polymer as much as possible and by making at least one liquid crystal region present in one pixel (i.e., regulating the position and size of the liquid crystal regions). However, at the present time, the liquid crystal regions are naturally formed (i.e., the liquid crystal regions are formed under the condition that the position and size thereof are not regulated). Moreover, a liquid crystal display device using FLC has the problem of low shock resistance as described above.

The liquid crystal display devices obtained by the above-mentioned five methods (1) to (5) are light scattering type devices, and thus, these devices cannot be applied to the non light scattering type liquid crystal display devices of a TN mode, an STN mode, an ECB mode, etc.

In addition, for example, Japanese Laid-Open Patent Publication No. 2-153318 discloses that display areas of a liquid crystal display device are limited in a polymer by using a photomask. According to this method, transparent portions cured by light irradiation and uncured portions covered with the photomask are divided while a voltage is applied between electrodes. Then, the photomask is removed, and the uncured portions are cured to form scattering portions. The display device thus obtained is manufactured in view of a display of an independent pattern. When an electrical field is applied to the device, the light scattering portions become transparent, whereby the entire cell becomes transparent. However, in this method, the shape of liquid crystal is not regulated by the photomask.

Japanese Laid-Open Patent Publication No. 59-226322 discloses that a mixture containing a polymer material and a liquid crystal material is dissolved in a solvent, and the solvent is removed from the obtained solution, whereby a phase separation is conducted between the polymer and the liquid crystal.

Furthermore, Japanese Laid-Open Patent Publication No. 2-116824 discloses a method for fixing liquid crystal regions on polymer walls in a liquid crystal display device. According to this method, a liquid crystal material and a polymerizable liquid crystalline compound having a liquid crystalline functional group attached to its side chain are dissolved in a solvent. Then, the solution thus obtained was coated onto the surface of a substrate. After that, the solvent is removed, whereby a phase separation is conducted between the liquid crystal material and the liquid crystalline polymer to fix the liquid crystal regions on the polymer walls.

In the case of the respective above-mentioned suggested methods, unreacted monomers or oligomers remain in the liquid crystal regions of the polymer dispersed liquid crystal display device. Due to these remaining substances, the viscosity of the liquid crystal is high. As a result, the response speed is low. In order to overcome this problem, Japanese Laid-Open Patent Publication Nos. 4-14015 and 4-168422 disclose the use of a resin material of a fluorine type for the purpose of decreasing the drive voltage and improving the electrical holding ratio. However, when a liquid crystal display device is manufactured by using a resin material of a fluorine type, the response speed $\tau_r$ under an applied voltage is increased due to the presence of the fluorine atoms on the interfaces between the liquid crystal and the resin. In contrast, the response speed $\tau_d$ under no applied voltage is decreased, since the driving force (interaction (orientation regulating ability) between the polymer material and the liquid crystal material) for making the liquid crystal return to the original state is weakened.

Examples of a material generally used as a liquid crystal material include cyanobiphenyl type materials and cyanopyrimidine type materials having a CN group in its molecule. Those materials are disclosed in Japanese Laid-Open Patent Publication Nos. 2-28284, 2-75688, 2-85822, and 2-272422 to 2-272424. However, this CN group is polarized, has strong reactivity, and facilitates the introduction of the impurities of the entire system into the liquid crystal material. Because of this, there is a problem that in the manufacturing process for a polymer dispersed liquid crystal display device which has a number of chances to come into contact with other compounds, the liquid crystal display device thus obtained cannot maintain a high electrical holding ratio (90% or more). Moreover, in the case where the polymerizable material contained in a mixture of the liquid crystal material and the polymerizable material is cured to cause a phase separation between the liquid crystal and the polymer, reactive sites of the liquid crystal and the polymerizable material coexist in the mixture, which damages the liquid crystal to remarkably decrease the electrical holding ratio.

Furthermore, in a method for causing a phase separation between the liquid crystal and the photosetting resin by curing the photosetting resin, it is easy to regulate the size of liquid crystal regions; however, an unreacted monomer remains in a display medium containing the liquid crystal and the resin, and the strength of the polymer walls formed of the resin is not sufficient. Thus, electro-optic characteristics of the obtained cell is varied due to thermal change. In addition, there is a problem in that the adhesion between the substrate and the polymer dispersed liquid crystal material is low, so that the polymer dispersed liquid crystal material is partially peeled off from the substrate due to the contraction of the resin.

SUMMARY OF THE INVENTION

A liquid crystal display device of the present invention includes:

two substrates facing each other, at least one of the substrates being transparent;

electrodes disposed on inside surfaces of the respective substrates;

a display medium which is provided between the two substrates and formed of polymer walls and liquid crystal regions partitioned by the polymer walls; and a plurality of pixels, wherein an interval a between a center of one liquid crystal region and a center of an adjacent liquid crystal region in a direction along a surface of the substrate is within a width of one pixel along the direction, and 80% or more of the intervals a satisfy the relationship: $3b/2 > a > b/2$, where b is an average of the intervals a.

In another aspect of the present invention, a method for manufacturing a liquid crystal display device having a plurality of pixels, includes the steps of:

providing a mixture containing a photopolymerizable compound and a liquid crystal material between a pair of substrates, two substrates facing each other, at least one of the substrates being transparent, electrodes being disposed on inside surfaces of the respective substrates; and irradiating light to the mixture with a light intensity distribution in which light intensity of at least one portion of each pixel is 90% or less of a maximum illuminance in a circular area which corresponds to 10 times the pixel area and whose center is situated in a center of the pixel.

In one embodiment, a photomask having a pattern with regularity is placed on the transparent substrate, and light is irradiated through the photomask to the mixture provided between the substrates.

In another embodiment, the pattern with regularity is formed on the photomask, and the pattern covers 30% or more of at least each pixel.

In another embodiment, the pattern with regularity is formed on the photomask, a minimum repeating unit of the pattern has a size within a circle having a diameter in the range of 1 μm to 50 μm, and an interval between a center of one unit and a center of an adjacent unit is in the range of 1 μm to 50 μm.

In another embodiment, the photomask having a pattern with regularity is placed inside one of the substrates, and light is irradiated through the photomask to the mixture provided between the substrates.

In another embodiment, the pattern with regularity is formed on the photomask, and the pattern covers 30% or more of at least each pixel.

In another embodiment, the pattern with regularity is formed on the photomask, a minimum repeating unit of the pattern has a size within a circle having a diameter in the range of 1 μm to 50 μm, and an interval between a center of one unit and a center of an adjacent unit is in the range of 1 μm to 50 μm.

In another aspect of the present invention, a liquid crystal display device includes:

two substrates facing each other, at least one of the substrates being transparent, electrodes disposed on inside surfaces of the respective substrates; and a display medium which is provided between the two substrates and formed of polymer walls containing a polymer as their main component and liquid crystal regions containing liquid crystal as their main component;

wherein the liquid crystal regions are partitioned by the polymer walls and are close to the substrates, portions of the liquid crystal regions close to the substrates being in parallel with the substrates.

In one embodiment, an orientation direction of a plurality of liquid crystal molecules contained in each of the liquid crystal regions is concentric along the polymer walls within a plane which is in parallel with the substrates.

In another embodiment, each of the liquid crystal regions has a plurality of liquid crystal domains and an orientation direction of each of the liquid crystal domains is concentric along the polymer walls within a plane which is in parallel with the substrates.

In another embodiment, each of the liquid crystal regions has an inside liquid crystal domain situated in a center thereof, a polymer region surrounding an outside of the inside liquid crystal domain, and a plurality of outside liquid crystal domains surrounding an outside of the polymer region; and the respective outside liquid crystal domains are aligned in a radial manner within a plane which is in parallel with the substrates.

In another embodiment, the liquid crystal regions have a plurality of liquid crystal domains, and an orientation direction of each of the liquid crystal domains is different within a plane which is in parallel with the substrates.

In another embodiment, the liquid crystal regions have a polymer region positioned in the center thereof and a plurality of liquid crystal domains surrounding an outside of the polymer region, and the respective liquid crystal domains are aligned in a radial manner within a plane which is in parallel with the substrates.

In another embodiment, the liquid crystal display device of the present invention includes a plurality of pixels, and the liquid crystal regions are provided in at least one pixel.

In another embodiment, at least one liquid crystal region contained in the pixel has a size of 30% or more of the pixel size.

In another embodiment, an orientation direction of a plurality of liquid crystal molecules contained in each of the liquid crystal regions is concentric along the polymer walls within a plane which is in parallel with the substrates.

In another embodiment, each of the liquid crystal regions has a plurality of liquid crystal domains, and an orientation direction of each of the liquid crystal domains is concentric along the polymer walls within a plane which is in parallel with the substrates.

In another embodiment, the liquid crystal regions have an inside liquid crystal domain positioned in a center thereof, a polymer region surrounding an outside of the inside liquid crystal domain, and a plurality of outside liquid crystal domains surrounding an outside of the polymer region; and the respective outside liquid crystal domains are aligned in a radial manner within a plane which is in parallel with the substrates.

In another embodiment, the liquid crystal regions have a plurality of liquid crystal domains, and an orientation direction of each of the liquid crystal domains is different within a plane which is in parallel with the substrates.

In another embodiment, the liquid crystal regions have a polymer region positioned in a center thereof and a plurality of liquid crystal domains surrounding an outside of the polymer region; and the respective liquid crystal domains are aligned in a radial manner within a plane which is in parallel with the substrates.

In another embodiment, a liquid crystal display device of the present invention includes a plurality of pixels, and two or more of the liquid crystal regions are entirely or partially provided in one pixel.

In another embodiment, the pixel has a longitudinal side of 200 μm or more.

In another embodiment, an orientation direction of a plurality of liquid crystal molecules contained in the liquid crystal regions are concentric along the polymer walls within a plane which is in parallel with the substrates.

In another embodiment, each of the liquid crystal regions has a plurality of liquid crystal domains, and an orientation direction of each of the liquid crystal domains is concentric along the polymer walls within a plane which is in parallel with the substrates.

In another embodiment, each of the liquid crystal domains has an inside liquid crystal domain positioned in a center thereof, a polymer region surrounding an outside of the inside liquid crystal domain, and a plurality of liquid crystal domains surrounding an outside of the polymer region; and the respective outside liquid crystal domains are aligned in a radial manner within a plane which is in parallel with the substrates.

In another embodiment, the liquid crystal region has a plurality of liquid crystal domains, and an orientation direction of each of the liquid crystal domains is different within a plane which is in parallel with the substrates.

In another embodiment, each of the liquid crystal regions has a polymer region positioned in a center thereof and a plurality of liquid crystal domains surrounding an outside of the polymer region, and the respective liquid crystal domains are aligned in a radial manner within a plane which is in parallel with the substrates.

In another embodiment, a plurality of liquid crystal molecules contained in each of the liquid crystal regions are aligned in a helical manner along a helical axis which is vertical with respect to the substrates.

In another embodiment, the plurality of liquid crystal molecules contained in each of the liquid crystal regions are provided with a helical pitch of 15 μm to 100 μm.

In another embodiment, d×Δn is in the range of 0.4 μm to 1.1 μm; and a distance between the substrates is in the range of 3 μm to 10 μm, where d is a thickness between horizontal portions in each of the liquid crystal regions and Δn is anisotropy of refractive index thereof.

In another embodiment, the display medium has a structure in which a liquid crystalline compound is fixed in the vicinity of an interface between the liquid crystal region and the polymer wall.

In another embodiment, anisotropy of dielectric constant $\Delta\epsilon_L$ of the liquid crystal region and anisotropy of dielectric constant $\Delta\epsilon_p$ of the liquid crystalline compound have a relationship of $\Delta\epsilon_L \times \Delta\epsilon_p < 0$.

In another embodiment, the liquid crystalline compound has at least one of a fluorine atom and a chlorine atom and the liquid crystal region is formed from a liquid crystal material having at least one of fluorine atom and a chlorine atom in its molecule.

In another embodiment, the liquid crystalline compound has an optically active group in its molecule and the liquid crystal region is formed from ferroelectric liquid crystal.

In another embodiment, the polymer walls are formed in a liquid crystal state.

In another embodiment, the liquid crystal regions and the polymer walls contain a dichroic dye.

In another embodiment, the polymer walls are formed in a liquid crystal state, and the polymer walls and the liquid crystal regions are in the same orientation when no voltage is applied to the display medium.

In another embodiment, at least one of the substrates has an orientation film in contact with the display medium, and the polymer walls and the liquid crystal regions are in the same orientation, based on the orientation film.

In another embodiment, the liquid crystal regions and the polymer walls contain a dichroic dye.

In another embodiment, anisotropy of dielectric constant $\Delta\epsilon_L$ of the liquid crystal region and anisotropy of dielectric constant $\Delta\epsilon_p$ of the liquid crystalline compound have a relationship of $\Delta\epsilon_L \times \Delta\epsilon_p < 0$.

In another embodiment, a remaining monomer ratio obtained from infrared absorption caused by a double bond between carbons in the polymer wall and infrared absorption caused by a carbonyl group of an ester in the polymer wall is 10% or less.

In another embodiment, a light-intercepting mask is placed on one of the substrates so that light-intercepting portions of the mask cover portions where the substrate and the polymer walls are in contact with each other.

In another embodiment, the light-intercepting mask is placed so that the light-intercepting portions thereof cover 50% or more of the respective portions where the substrate and the polymer walls are in contact with each other.

In another embodiment, orientation films are respectively formed on the electrodes mounted on the substrates.

In another embodiment, the orientation films are uniaxially aligned by an orientation treatment.

In another embodiment, at least one of the orientation films contain a photopolymerization initiator.

In another embodiment, a polarizing plate is provided outside of at least one of the substrates.

In another aspect of the present invention, a method for manufacturing a liquid crystal display device having a plurality of pixels, includes the steps of:

providing a mixture containing a photopolymerizable compound and a liquid crystal material between a pair of substrates, two substrates facing each other, at least one of the substrates being transparent, and electrodes being disposed on inside surfaces of the respective substrates, thereby forming a cell; and irradiating the mixture with light under the condition that intensity of light is reduced in predetermined portions of the mixture, thereby forming a display medium between the substrates, the display medium having polymer walls containing a polymer as their main component and liquid crystal regions containing liquid crystal as their main component.

In one embodiment, the predetermined portions correspond to at least one pixel, whereby the liquid crystal regions are provided in at least one pixel.

In another embodiment, an area of each of the predetermined portions corresponds to 30% or more of each pixel area, whereby at least one liquid crystal region contained in the pixel is made 30% or more of the pixel area.

In another embodiment, intensity of light is reduced by using a photomask, and the photomask is placed on the side of the display medium of one of the substrates.

In another embodiment, the mixture is irradiated with light through a photomask, the photomask having a plurality of masking portions for forming the liquid crystal regions and each of the masking portion having at least one light transmission hole at least in a center thereof, whereby liquid crystal domains are formed in a radial manner in each of the liquid crystal regions.

In another embodiment, the method for manufacturing a liquid crystal display device of the present invention uses a photomask having masking portions for forming the liquid crystal regions, each of the masking portions having a light transmission hole in a center thereof and light transmission slits disposed in a radial manner around the transmission hole.

In another embodiment, the mixture is irradiated with light while alternating a light-irradiating period and a non light-irradiating period.

In another embodiment, the mixture further contains a compound having effects for suppressing photopolymerization.

In another embodiment, the display medium having walls containing a polymer as their main component and liquid crystal regions containing liquid crystal as their main component is formed between the substrates by irradiating light to all of the portions or part thereof excluding the pixels.

In another embodiment, light which is irradiated to all of the portions or part thereof excluding the pixels is linear light.

In another embodiment, light irradiation to all of the portions or part thereof excluding the pixels is conducted while spot light in a dot shape is moved.

In another embodiment, intensity of light is reduced by using an insulating film formed on the electrode of one of the substrates, and the display medium having walls containing a polymer as its main component and liquid crystal regions containing liquid crystal as its main component is formed between the substrates by irradiating light to the mixture from the side of the substrate on which the insulating film is formed.

In another embodiment, the step of forming a cell is conducted by attaching the two substrates after providing the mixture on one of the substrates.

In another embodiment, polarizing plates are formed on external surfaces of the two substrates.

In another aspect of the present invention, a method for manufacturing a liquid crystal display device having a plurality of pixels, includes the steps of:

forming an orientation film containing a photopolymerization initiator on at least one of a pair of substrates, two substrates facing each other, at least one of the substrates being transparent, and electrodes being disposed on inside surfaces of the respective substrates;

subjecting the substrate on which the orientation film is formed to a rubbing treatment in one direction;

providing a mixture containing a photopolymerizable compound and a liquid crystal material between the pair of substrates after the rubbing treatment; and forming a display medium having polymer walls containing a polymer as their main component and liquid crystal regions containing liquid crystal as their main component by curing the photopolymerizable compound.

In one embodiment, the photopolymerizable compound contained in the mixture contains a liquid crystalline compound having at least one polymerizable functional group in its molecule.

In another embodiment, a compound having a polymerizable functional group, at least one of a fluorine atom and a chlorine atom in its molecule is used as the liquid crystalline compound, and a liquid crystal material having at least one of a fluorine and a chlorine atom in its molecule is used for the liquid crystal regions.

In another embodiment, a compound having a polymerizable functional group and an optically active group in its molecule is used as the liquid crystalline compound, and ferroelectric liquid crystal is used for the liquid crystal regions.

In another embodiment, UV-rays are irradiated to the mixture so that portions where the liquid crystal regions are to be formed become weak light-irradiated regions, thereby optically polymerizing the photopolymerizable compound.

In another embodiment, weak light-irradiated regions are formed by using a photomask, and the photomask is placed on the side of the display medium of one of the substrates.

In another embodiment, the step of forming a cell is conducted by attaching the two substrates after providing the mixture on one of the substrates.

In another embodiment, polarizing plates are formed on external surfaces of the two substrates.

In another aspect of the present invention, a method for manufacturing a liquid crystal display device having a plurality of pixels, includes the steps of:

forming a thin film pattern containing a photopolymerization initiator on one surface of at least one of a pair of substrates, the substrates respectively having electrodes and at least one of the substrates being transparent;

providing a mixture containing a polymerizable compound and a liquid crystal material between the pair of substrates, at least one of the substrates having the thin film pattern, thereby forming a cell; and forming a display medium between the substrates by curing the polymerizable compound, the display medium having polymer walls containing a polymer as their main component and liquid crystal regions containing liquid crystal as their main component.

In one embodiment, the polymerization initiator is a photopolymerization initiator, the polymerizable compound is a photopolymerizable compound, a photomask allowing 50% or more of the thin film pattern to be exposed is placed outside of one of the substrates, and light is irradiated to the photopolymerizable initiator and the photopolymerizable compound through the photomask to cure the photopolymerizable compound.

In another embodiment, the photopolymerizable compound contained in the mixture contains a liquid crystalline compound having at least one kind of polymerizable functional group at its molecule.

In another embodiment, a compound having a polymerizable functional group, and at least one of a fluorine atom and a chlorine atom in its molecule is used as the liquid crystalline compound; and a liquid crystal material having at least one of a fluorine atom and a chlorine atom in its molecule is used for the liquid crystal regions.

In another embodiment, a compound having a polymerizable functional group and an optically active group in its molecule is used as the liquid crystalline compound and ferroelectric liquid crystal is used for the liquid crystal regions.

In another embodiment, UV-rays are irradiated to the mixture so that portions where the liquid crystal regions are to be formed become weak light-irradiated regions, thereby optically polymerizing the polymerizable compound.

In another embodiment, the polymerization initiator is a heat polymerization initiator, the polymerizable compound is a heat polymerizable compound, and the heat polymerization initiator and the mixture are heated to cure the heat polymerizable compound.

In another embodiment, the step of forming a cell is conducted by attaching the two substrates after providing the mixture on one of the substrates.

In another embodiment, polarizing plates are formed on external surfaces of the two substrates.

In another aspect of the present invention, a method for manufacturing a liquid crystal display device having a plurality of pixels, includes the steps of:

providing a mixture between a pair of substrates facing each other, thereby forming a cell, at least one of the substrates being transparent, electrodes being disposed on inside surfaces on the respective substrates, the mixture containing a liquid crystal material, a polymerizable liquid crystalline material having a liquid crystalline functional group in its molecule, a polymerizable compound, and a polymerization initiator, anisotropy of dielectric constant $\Delta\epsilon_L$ of the liquid crystal material and anisotropy of dielectric constant $\Delta\epsilon_p$ of the polymerizable liquid crystalline material having a relationship of $\Delta\epsilon_L \times \Delta\epsilon_p < 0$, and forming a display medium between the substrates by polymerizing the polymerizable compound, the display medium having polymer walls containing a polymer as their main component and liquid crystal regions containing liquid crystal as their main component, providing the liquid crystalline functional groups in the liquid crystal regions to fix a liquid crystalline polymer on the polymer walls.

In one embodiment, the polymerizable compound is a photopolymerizable compound, the polymerization initiator is a photopolymerization initiator, and the polymerizable compound is optically polymerized.

In another embodiment, UV-rays are irradiated to the mixture so that portions where the liquid crystal regions are to be formed become weak light-irradiated regions, thereby optically polymerizing the mixture.

In another embodiment, the weak light-irradiated regions are formed by using a photomask, and the photomask is placed on the side of the display medium of one of the substrates.

In another embodiment, the polymerizable compound is a heat polymerizable compound, the polymerization initiator is a heat polymerization initiator, and the polymerizable compound is polymerized by heating.

In anther embodiment, a compound having at least one of a fluorine atom and a chlorine atom in its molecule is used as the liquid crystal material and the polymerizable liquid crystalline material.

In another embodiment, the step of forming a cell is conducted by attaching the two substrates after providing the mixture on one of the substrates.

In another embodiment, the step of forming a cell includes the steps of:

coating the mixture onto one of the substrates, the mixture further containing a solvent capable of homogeneously dissolving the liquid crystal material and the polymerizable liquid crystalline material;

removing the solvent from the mixture coated onto one of the substrates by evaporation to provide the liquid crystalline functional groups in the liquid crystal regions, thereby fixing a liquid crystalline compound on the polymer walls; and placing the other substrate on the substrate on which the mixture is coated.

In another embodiment, polarizing plates are formed on external surfaces of the two substrates.

In another aspect of the present invention, a method for manufacturing a liquid crystal display device having a plurality of pixels, includes the steps of:

providing a mixture between a pair of substrates facing each other, thereby forming a cell, at least one of the substrates being transparent, electrodes being disposed on inside surfaces of the respective substrates, the mixture containing a liquid crystal material, a photopolymerizable compound, photopolymerization initiator, and a radical generating agent;

irradiating light to the mixture to cause a phase separation, thereby obtaining a state in which liquid crystal regions are dispersed in the polymer walls; and thermally decomposing the radical generating agent by heating the display medium.

In another embodiment, UV-rays are irradiated to the mixture so that portions where the liquid crystal regions are to be formed become weak light-irradiated regions, thereby optically polymerizing the polymerizable compound.

In another embodiment, the weak light-irradiated regions are formed by a photomask, and the photomask is placed on the side of the display medium of one of the substrates.

In another embodiment, a liquid crystal material of at least one of a fluorine type and chlorine type is used as the liquid crystal material.

In another embodiment, the photopolymerizable compound contains a photopolymerizable liquid crystal compound.

In another embodiment, the step of forming a cell is conducted by attaching the two substrates after providing the mixture on one of the substrates.

In another embodiment, polarizing plates are formed on external surfaces of the two substrates.

Thus, the invention described herein makes possible the advantages of (1) providing a light scattering type liquid crystal display device in which liquid crystal regions in a drop shape, each having the same diameter, are formed with regularity in a direction along a surface of a substrate and which has a steep threshold characteristic curve and excellent contrast, and a method for manufacturing the same; (2)

providing a non light scattering type liquid crystal display device in which liquid crystal regions are formed under the condition that the size of liquid crystal regions is adjusted with respect to pixels, and a method for manufacturing the same; (3) providing a liquid crystal display device in which the response speed is sufficiently improved and a high electrical holding ratio is maintained, and a method for producing the same; (4) providing a liquid crystal display device in which unreacted substances such as an unreacted monomer remaining in a display medium is reduced so as not to cause peeling between the substrate and the display medium, and a method for manufacturing the same; (5) providing a liquid crystal display device in which each liquid crystal region can be provided with respect to pixels without a photomask by causing a phase separation between the liquid crystal and the polymer without allowing the liquid crystal and the polymer to be mixed with each other; and (6) providing a liquid crystal display device which can greatly contribute to the improvement of shock resistance of the liquid crystal display device using ferroelectric liquid crystal, and a method for manufacturing the same.

These and other advantages of the present invention will become apparent to those skilled in the art upon reading and understanding the following detailed description with reference to the accompanying figures.

BRIEF DESCRIPTION OF THE DRAWINGS

FIG. 1 is a cross-sectional view showing a liquid crystal display device of Example 1.

DESCRIPTION OF THE PREFERRED EMBODIMENTS

According to the present invention, a mixture containing, at least, a light-curable material and a liquid crystal material is inserted between two substrates, each substrate having electrodes. The inserted mixture is then irradiated with light under the condition that the intensity of light is reduced in places where liquid crystal regions of the mixture are to be formed.

The light-curable material which is present in regions to which light is irradiated, reacts to form a core for a polymer wall. After that, a concentration gradient of the material is formed due to the decrease in the concentration of the material in the light-irradiated regions. Along this concentration gradient, an unreacted material in regions, to which light having low intensity is irradiated masking portions (the masking portions do not intercept light completely, but weaken the intensity of light) of a photomask, gathers in the light-irradiated regions and is polymerized to form polymer walls. In regions where the polymer walls are not formed, liquid crystal regions are formed.

Figure 22:
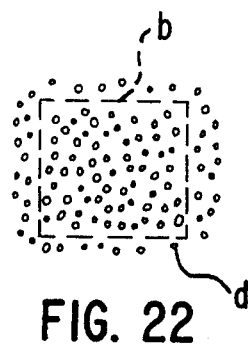
FIG. 22 is a view showing a liquid crystal region of a light scattering type.

In this case, the position of the weak light-irradiated regions is set in accordance with the position of the liquid crystal regions to be formed in the display medium. When the mixture is irradiated with light, liquid crystal regions are formed in the weak light-irradiated regions. At this time, if light is irradiated to the mixture by using a photomask having relatively small masking portions, nearly spherical liquid crystal regions are formed in the weak light-irradiated regions. Thus, the resulting liquid crystal display device becomes a light scattering type. FIG. 22 shows liquid crystal regions of a light scattering type. A number of liquid crystal regions d are formed in one pixel b and the diameter of each liquid crystal region d is very small.

A light scattering type refers to a system in which light scattering and transparent states of a liquid crystal display device in which liquid crystal molecules are dispersed in a polymer are electrically regulated. A principle thereof is that the refractive index of liquid crystal molecules is set so as to almost coincide with that of a polymer during the application of a voltage. In this case, while a voltage is applied, the liquid crystal display device is in a transparent state. In contrast, when no voltage is applied, the liquid crystal molecules are in a random orientation due to interaction with the polymer walls, whereby the apparent refractive index of the liquid crystal molecules is increased to cause mismatching with the refractive index of the polymer walls. Thus, the liquid crystal molecules take a light scattering state.

The mixture of light-curable material and liquid crystal material is inserted between two substrates, each having electrodes with at least one of the substrates being transparent. The mixture is irradiated with light under the condition that the intensity of light is reduced in portions of the mixture which correspond to at least 30% of the size of each pixel. As a means for reducing the intensity of light, a photomask or the like is used. The mixture is irradiated with light through the photomask or the like.

In portions of the mixture to which light with higher intensity is irradiated, the polymer material is cured to form walls reaching the inside surfaces of both substrates. Liquid crystal regions are formed in portions partitioned by the walls. That is, the liquid crystal regions are formed in a dispersed state.

When the mixture is irradiated with light by using a photomask or the like having relatively large masking portions, liquid crystal regions are widened and have portions which are in parallel with the surface of the substrates. The parallel portions are formed in the vicinity of both substrates. The resulting liquid crystal display device is a non light scattering type. A non light scattering type refers to a system in which light scattering caused by the above-mentioned difference in refractive index between the liquid crystal region and the polymer wall is reduced as much as possible and a display is performed only by the change of the orientation of liquid crystal molecules. Examples of a method for taking advantage of the change of the orientation of liquid crystal molecules include a mode in which the change of the refractive index is taken by using polarizing plates (e.g., a TN mode and an ECB mode); and a guest-host (GH) mode in which a dichroic dye is added to liquid crystal without using a polarizing plate.

In the non light scattering type liquid crystal display device, each liquid crystal region can be provided in one pixel, each liquid crystal region can be provided in two or more pixels, or a plurality of liquid crystal regions can be provided in one pixel by appropriately regulating means for reducing the intensity of light such as a photomask. In addition, even though the size of a pixel may be large, one or more liquid crystal region(s) can entirely be provided in one pixel; some parts of the liquid crystal regions are provided in one pixel; or one or more entire liquid crystal regions and some parts thereof are provided in one pixel.

Moreover, it is also possible that a homogeneous mixture of a light-curable material and a liquid crystal material is dropped or coated onto one substrate, then two substrates are attached to each other, and the light-curable material is cured.

In particular, in the case where a photomask is used, portions to which light is irradiated are clearly limited. Thus, even in the case where a plurality of liquid crystal regions are formed in one pixel, the polymer can be provided in a large amount outside the pixel, so that contrast can be improved, which is preferred.

In the production of the non light scattering type liquid crystal display device, the photopolymerization rate is changed by varying materials of the mixture and conditions of light irradiation, whereby a phase separation rate of a polymer and liquid crystal can be regulated.

Figure 23:
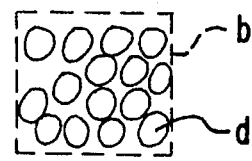
FIG. 23 is a view showing a liquid crystal region of a non light scattering type obtained in the case where the photopolymerization speed is high.
Figure 24A:
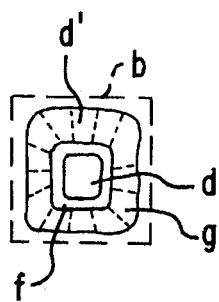
FIG. 24A is a view showing a liquid crystal region of a non light scattering type obtained in the case where the photopolymerization speed is low.
Figure 24C:
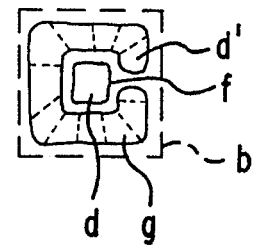
FIG. 24C is a view showing another liquid crystal region of a non light scattering type obtained in the case where the photopolymerization speed is low.
Figure 24B:
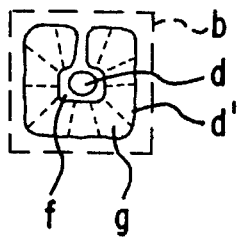
FIG. 24B is a view showing another liquid crystal regions of a non light scattering type obtained in the case where the photopolymerization speed is low.
Figure 24D:
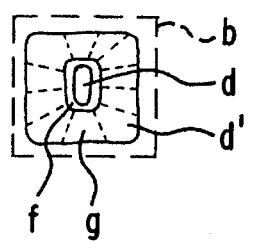
FIG. 24D is a view showing another liquid crystal region of a non light scattering type obtained in the case where the photopolymerization speed is low.

(1) The Case Where the Phase Separation Rate (i.e., Photopolymerization Rate) is High Due to light leaked from the light-irradiated regions, photopolymerization of a polymerizable material is also conducted in the weak light-irradiated regions, and thus, a plurality of liquid crystal regions are formed therein. In this case, as shown in FIG. 23, each liquid crystal region d present in a pixel b is in the form of a circle, when seen from the upper side of the substrate, the orientation direction of the liquid crystal molecules in the crystal regions d is in the form of concentric circles along the polymer walls and is nearly in parallel with the surface of the substrate. When an electrical field is applied to this display medium so that a half tone is obtained, the liquid crystal molecules stand omnidirectionally, so that the apparent refractive index becomes almost the same, even when seen from any directions, and viewing angle characteristics are improved, resulting in satisfactory contrast.

(2) The Case Where the Phase Separation Rate, (i.e., Photopolymerization Rate) is Low A photopolymerization reaction is decreased in the weak light-irradiated regions and the shape of each liquid crystal region becomes almost the shape of the masking portions of a photomask. However, light-curable materials present in the weak light-irradiated regions cannot completely reach the portions where the polymerization of the polymerizable material (i.e., light-irradiated regions) is conducted. As shown in FIG. 24A, 24B, 24C, or 24D, an inside liquid crystal region d is formed almost in the center of each pixel b (the weak light-irradiated region, in this case), and a polymer region f and an outside liquid crystal region d' are formed so as to surround the inside liquid crystal region d. Thus, the outside liquid crystal region d' is formed, for example, in a donut shape or in a C shape.

Liquid crystal in the inside liquid crystal region d formed almost in the center of the pixel b has the same orientation as that described in the above-mentioned case (1). The liquid crystal region in a donut shape or the C-shaped liquid crystal region contains a plurality of liquid crystal domains g, and the plurality of liquid crystal domains g are formed almost in a radial manner with respect to the center of each pixel. Here, the respective liquid crystal domains g have different orientations from each other even though a polymer in a wall shape is not present between the liquid crystal domains g, and disclination lines (actually, interfaces) are present between the liquid crystal domains g.

This phenomenon is caused as follows:

Since a polymerization reaction is conducted while light-curable polymers move, the liquid crystal molecules are oriented in a vertical direction with respect to the polymer walls. Moreover, in the case where the liquid crystal regions become large, the same phenomenon can be seen.

Figure 25:
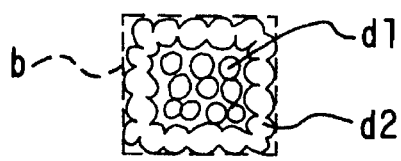
FIG. 25 is a view showing a liquid crystal region of a non light scattering type obtained in the case where the photopolymerization speed is higher than that of FIGS. 24A to 24D and lower than that of FIG. 23.
Figure 26A:
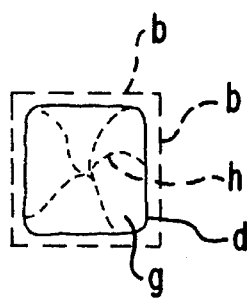
FIG. 26A is a view showing a liquid crystal region of a non light scattering type obtained in the case where the photopolymerization speed is still lower.
Figure 26C:
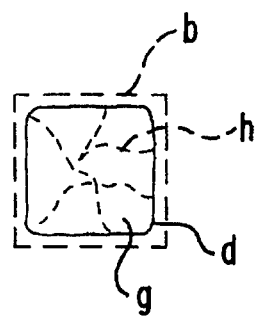
FIG. 26C is a view showing another liquid crystal region of a non light scattering type obtained in the case where the photopolymerization speed is still lower.
Figure 26B:
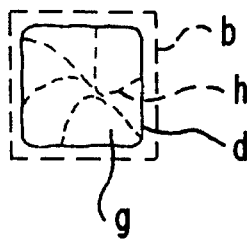
FIG. 26B is a view showing another liquid crystal region of a non light scattering type obtained in the case where the photopolymerization speed is still lower.
Figure 26D:
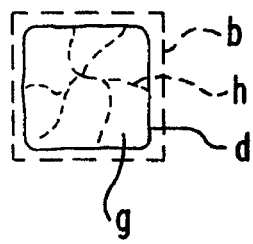
FIG. 26D is a view showing another liquid crystal region of a non light scattering type obtained in the case where the photopolymerization speed is still lower.

When an electrical field is applied to a display medium which has the above-mentioned orientation state, the inside liquid crystal region d almost in the center of the pixel b has the same orientation as that of the above-mentioned case (1). In contrast, in the outside liquid crystal region d' in a donut shape or in a C shape, the direction in which the liquid crystal molecules stand is different in each domain, so that the characteristics of the angle of visibility, i.e., viewing angle characteristics are remarkably improved in the same principle as that described in the above-mentioned case (1). If a photopolymerization rate is slightly higher than this case, liquid crystal regions as shown in FIG. 25 are obtained. As is understood in FIG. 25, a plurality of circular liquid crystal regions d2 are formed so as to be in contact with each other on the edges of pixel b and a plurality of circular liquid crystal regions d1 are formed so as to be surrounded by the liquid crystal regions d2.

Figure 27:
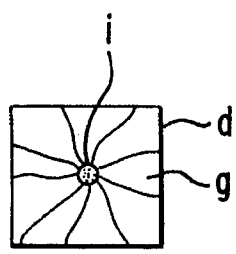
FIG. 27 is a view showing a liquid crystal region of a non light scattering type obtained in the case where a light transmission hole is provided in the center of a masking portion of a photomask.

(3) The Case Where the Phase Separation Rate (i.e., Photopolymerization Rate) is Further Lowered The polymers remaining in the weak light-irradiated regions are further decreased, and the liquid crystal regions which have almost the same shape as that of the masking portions of a photomask are formed. In this case, as shown in FIG. 26A, 26B, 26C, or 26D, each liquid crystal region d contains a plurality of liquid crystal domains g and the discrimination lines h between the liquid crystal domains g become vertical with respect to the polymer walls. The orientation of the liquid crystal molecules in the liquid crystal region d become random since an island portion is not present in the center of the liquid crystal region d. At this time, if a hole for allowing light to pass through is provided in the center of the masking region (corresponding to the pixel b) of a photomask, an island i made of a polymer can be formed in the center of the liquid crystal region d as shown in FIG. 27, whereby the liquid crystal domains g are formed in a radial manner with respect to the island i.

When an electrical field is applied to this display medium, the liquid crystal molecules move in the same way as in the above-mentioned case (2). The refractive index of the liquid crystal molecules is almost the same when seen from an omnidirection with a predetermined angle from a vertical direction to the substrate surface. Thus, the viewing angle characteristics can be improved. This case is preferred since the ratio of the liquid crystal regions with respect to pixel(s) is increased and contrast is improved.

Figure 28A:
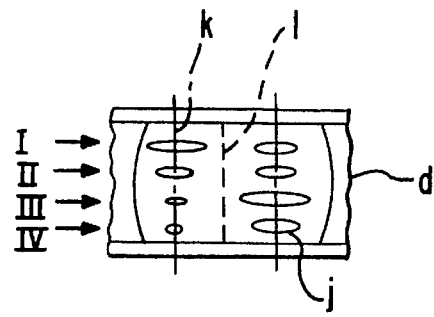
FIG. 28A is a front cross-sectional view of a liquid crystal region of a liquid crystal display device of Example 4, where the helical pitch is in the range of 15 μm to 100 μm.
Figure 28B:
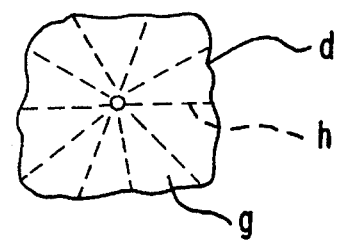
FIG. 28B is a plan view showing the liquid crystal region shown in FIG. 28A.
Figure 28C:
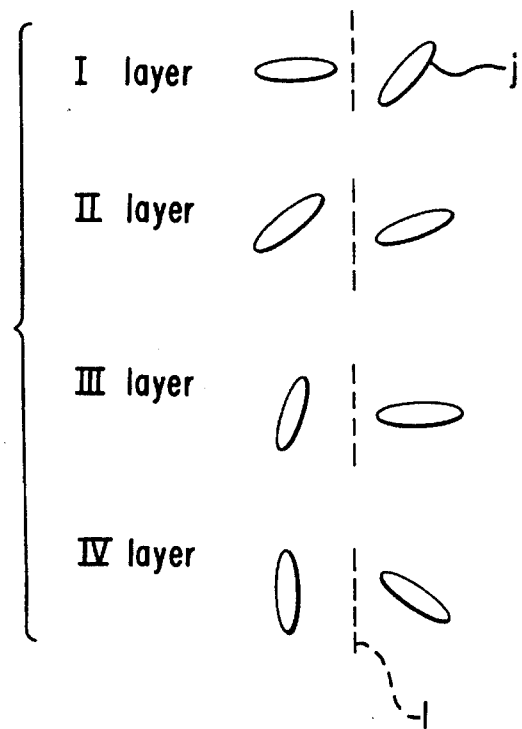
FIG. 28C is a plan view for each of the layers I, II, III, and IV of the liquid crystal region shown in FIG. 28A.

In the above-mentioned cases (2) and (3), if a chiral agent is added to the mixture, a plurality of liquid crystal molecules contained in a liquid crystal region are as shown in FIGS. 28A, 28B, and 28C. That is, when the liquid crystal region d is seen through the substrate, a plurality of domains g are formed in a radial manner as shown in FIG. 28B; however, as shown in FIG. 28A, the respective liquid crystal molecules ]are aligned in a helical manner around the helical axis k which is almost vertical with respect to the surface of the substrate. More specifically, when the I layer of FIG. 28A is seen through the substrate, the I layer is disposed as shown in FIG. 28C. When the II, III, and IV layers of FIG. 28A are seen through the substrate, the II, III, and IV layers are disposed as shown in FIG. 28C.

Figure 29A:
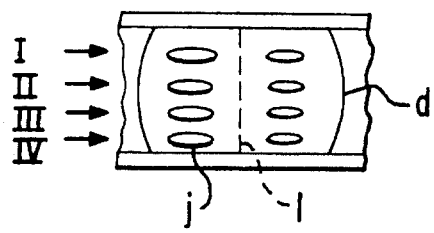
FIG. 29A is a front cross-sectional view of a liquid crystal region of a liquid crystal display device of Example 4, where the helical pitch is more than 100 μm.
Figure 29B:
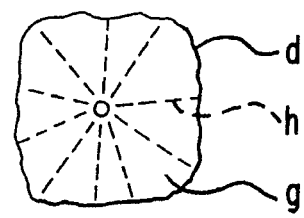
FIG. 29B is a plan view showing the liquid crystal region shown in FIG. 29A.
Figure 29C:
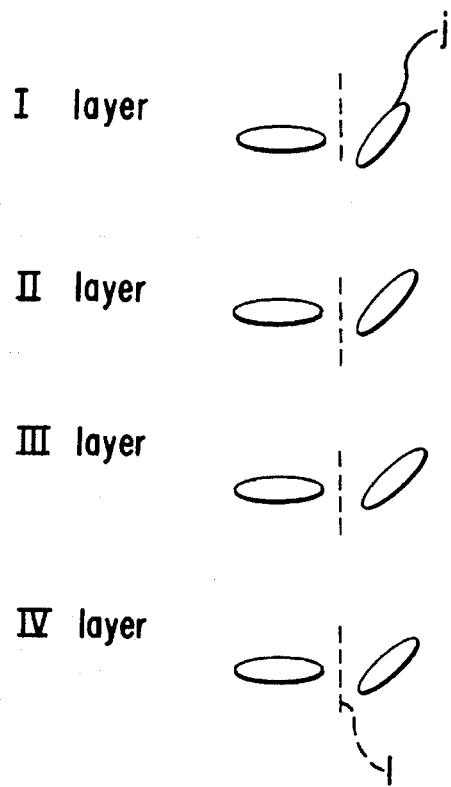
FIG. 29C is a plan view for each of the layers I, II, III, IV layers of the liquid crystal region shown in FIG. 29A.

On the other hand, when a chiral agent is not added to the mixture, a plurality of liquid crystal molecules are aligned as shown in FIGS. 29A, 29B, and 29C. When the liquid crystal region d is seen through the substrate, a plurality of domains g are disposed in a radial manner as shown in FIG. 29B; however, as shown in FIG. 29A, the respective liquid crystal molecules are aligned in a predetermined direction around the axis 1 which is almost vertical with respect to the surface of the substrate. More specifically, when the I layer of FIG. 29A is seen through the substrate, the I layer is disposed as shown in FIG. 29C, and when the II, III, and IV layers of FIG. 29A are seen through the substrate, the II, III, and IV layers are disposed as shown in FIG. 29C.

Figure 30A:
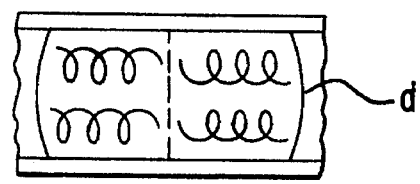
FIG. 30A is a front cross-sectional view of a liquid crystal region of a liquid crystal display device of Example 4, where the helical pitch is smaller than 15 μm.
Figure 30B:
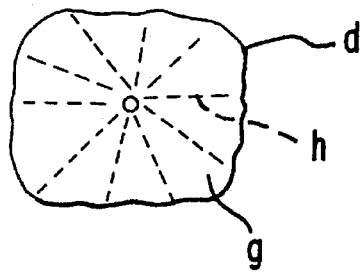
FIG. 30B is a plan view showing the liquid crystal region shown in FIG. 30A.

When an excess amount of a chiral agent is added to the mixture, as shown in FIG. 30B, when the liquid crystal region d is seen through the substrate, a plurality of domains g are disposed in a radial manner; however, as shown in FIG. 30A, the helical axis becomes parallel with the surface of the substrate even though the liquid crystal molecules are aligned in a helical manner. This phenomenon is caused even in the case where cholesteric liquid crystal is added to nematic liquid crystal, in addition to the case where a chiral agent is added to the mixture.

Furthermore, the liquid crystal regions are formed in each pixel, and a light-intercepting mask is provided on one side of a liquid crystal layer (containing the liquid crystal regions and the polymer walls). At least 50% or more of the area of each polymer wall is covered with the light-intercepting mask, whereby light which is scattered at an interface between the polymer wall and the liquid crystal region can be prevented from being leaked outside. In particular, in the case where the light-intercepting mask is provided closer to the light incident side than the liquid crystal region, the incident light can be prevented from being scattered at an interface between the liquid crystal region and the polymer wall.

In a method for manufacturing a liquid crystal display device according to the present invention, an orientation film is formed on at least one of the substrates for the purpose of improving the regularity of the orientation of liquid crystal regions. The orientation film contains a photopolymerization initiator. Moreover, the substrate on which the orientation film is formed is subjected to a rubbing treatment. When a cell is irradiated with light by using a photomask, a photopolymerizable compound material starts being cured due to the photopolymerization initiator contained in the orientation film. In this case, the curing speed of the photopolymerizable compound material is higher in regions to which strong light is irradiated than in regions to which weak light is irradiated. Moreover, in the regions to which strong light is irradiated, the phase separation speed between the liquid crystal and the cured polymer is higher. Thus, in the strong light-irradiated regions, the polymer is more rapidly deposited to push the liquid crystal into the weak light-irradiated regions. As a result, in the strong light-irradiated regions, polymer walls are formed, and in the weak light-irradiated regions, liquid crystal regions are formed, being in contact with the orientation film to be subjected to an orientation treatment. In this way, the liquid crystal regions are disposed with regularity in a planar manner.

There is another method for improving the regularity of the orientation of the liquid crystal regions. That is, a thin film pattern containing a photopolymerization initiator is formed on portions, where polymer walls are to be formed, of at least one of the substrates. After that, the polymerizable compound material in the mixture is cured by the irradiation of UV-rays or by heating. When the mixture is irradiated with UV-rays or heated, the polymerizable compound material starts being cured due to the polymerization initiator contained in the thin film pattern, whereby the polymer walls start being formed in contact with the thin film pattern. Because of this, the polymer walls are formed on the portions where the thin film pattern is formed, and the liquid crystal regions subjected to an orientation treatment are formed in one or a plurality of adjacent pixels.

In another example of the present invention, the liquid crystal material and a polymerizable compound material containing a liquid crystalline compound having at least one kind of polymerizable functional group in its molecule are polymerized. Due to this polymerization, a phase separation is caused, whereby a display medium in which the liquid crystal regions are partitioned by the polymer walls can be formed. Each liquid crystal region has a structure in which the liquid crystalline compound is fixed in the vicinity of the interface between the polymer wall and the liquid crystal region. Under this condition, the interfaces between the liquid crystal regions and the polymer walls are driven under an applied voltage; and the driving force is increased under no applied voltage since the liquid crystal molecules are bonded to the polymer walls. Thus, the response speed $\tau_r$ under an applied voltage and a response speed $\tau_d$ under no applied voltage can be improved. Moreover, since the liquid crystalline compound is fixed on the interfaces between the polymer walls and the liquid crystal regions, a phase separation is clearly conducted.

In the case where a liquid crystal material of a fluorine type and/or a chlorine type which is chemically stable is used as the liquid crystal material, the liquid crystal molecules will have chemical stability by using a polymerizable liquid crystalline compound having fluorine atom(s) and/or chlorine atom(s) in its molecule.

Moreover, in the case where ferroelectric liquid crystal is used as the liquid crystal material, it is possible to allow liquid crystal molecules having an optically active functional group to be present on the interfaces between the polymer walls and the liquid crystal regions by using a liquid crystalline compound having a polymerizable functional group and an optically active group in its molecule. Due to the presence of the liquid crystal molecules, the liquid crystal regions are influenced by the orientation regulating ability of the polymer walls having a component with a direction orthogonal with respect to the surface of the substrate as well as the orientation regulating ability of the substrate subjected to orientation treatment.

Furthermore, in the case where the polymer is cured in a liquid crystal state, the polymer as well as the liquid crystal regions are aligned in an orientation direction of the substrate. Thus, the orientation of the cell can be determined artificially by taking advantage of the orientation regulating ability of the substrate. In the case where a dichroic dye is contained in the liquid crystal regions and the polymer walls, when the liquid crystal regions and the polymer walls are aligned in the same direction, both of the liquid crystal regions and the polymer walls can be used as light transmission regions.

In another method for manufacturing a liquid crystal display device of the present invention, a liquid crystal material, a photopolymerizable liquid crystalline material having a liquid crystalline functional group in its molecules, a photopolymerizable compound material, and a photopolymerization initiator are polymerized; or a liquid crystal material, a heat polymerizable liquid crystalline material having a liquid crystalline functional group in its molecule, a heat polymerizable compound material, and a heat polymerization initiator are polymerized. Due to this polymerization, the polymerizable liquid crystalline material becomes a liquid crystalline polymer, and the liquid crystalline functional groups of the liquid crystalline polymer are provided in the liquid crystal regions, whereby a phase separation between the polymer and the liquid crystal is clearly conducted. When a voltage is applied from outside to the liquid crystal display device thus obtained the liquid crystalline polymer can easily be moved in response to the application of a voltage. Namely, when a voltage is applied, the liquid crystal regions and the polymer walls are driven; and when no voltage is applied, the orientation of the liquid crystal molecules between the polymer walls and th liquid crystal regions is disturbed, whereby the molecules can rapidly move.

It is also possible that a mixture containing a liquid crystal material, a polymerizable liquid crystalline polymer having a liquid crystalline functional group in its molecule, and a solvent capable of homogeneously dissolving the liquid crystal material and the liquid crystalline polymer is coated onto one of the substrates and then the solvent is removed by evaporation. In this case, the liquid crystalline functional groups in the liquid crystalline polymer are provided in the liquid crystal regions in the same way as the above, whereby a phase separation between the polymer and the liquid crystal is clearly conducted.

In another method for manufacturing a liquid crystal display device of the present invention, a mixture inserted between facing substrates is irradiated with light, the mixture containing a liquid crystal material, a photosetting material, a photopolymerization initiator, and radial generating agent. Due to the light irradiation, a display medium in which the liquid crystal regions are dispersed in the polymer walls can be obtained. After that, the display medium is heated to thermally decompose the radical generating agent. As a result, a radical is generated from the radical generating agent, and the remaining monomer before heating is polymerized with the radical, decreasing the remaining monomer.

In still another method for manufacturing a liquid crystal display device of the present invention, all of the portions or part thereof excluding the pixels are irradiated with linear light to cure the photopolymerizable compound material contained in the mixture injected between the substrates. Due to this, a phase separation is easily conducted between the polymer and the liquid crystal under the condition that the polymer and the liquid crystal are not mixed with each other, the polymer walls are formed with regularity, and each liquid crystal region is regularly disposed in one or a plurality of pixels. According to the present invention, as other methods for curing the photopolymerizable compound material, the following two methods are used:

(1) Light in a spot shape is irradiated to all of the portions or part thereof excluding the pixels while the spot-shaped light is moved.

(2) An insulating film is formed on linear electrodes formed on one transparent substrate and light is irradiated to the substrate from the side thereof on which the insulating film is formed, whereby the polymerizable compound material of the mixture in the non-pixel portions which are not covered with the insulating film is cured.

In any of these methods, a phase separation between the polymer and the liquid crystal is easily conducted.

EXAMPLES

Hereinafter, the present invention will be described by way of illustrating examples with reference to the drawings.

EXAMPLE 1

The present invention will be described in the case where it is applied to a light scattering type liquid crystal display device.

FIG. 1 is a cross-sectional view showing a liquid crystal display device of the present example. In the present example, two substrates 12 and 13 are provided so as to face each other with spacers (not shown) sandwiched therebetween. The substrate 12 is made of glass, and electrodes 11 made of ITO (indium tin oxide) are formed thereon. The substrate 13 is also made of glass; and a photomask 14 is provided on one surface of the substrate 13 and a counter electrode 15 made of ITO is formed on the other surface thereof.

A mixture containing a liquid crystal material and a light-curable material is sealed between the substrates 12 and 13. This mixture is irradiated with UV-rays 20 to cure the light-curable material. Consequently, a polymer dispersed liquid crystal layer in which liquid crystal regions 16 are partitioned by polymer walls 17 is obtained between the substrates 12 and 13.

The polymer dispersed liquid crystal display device thus obtained is observed as follows:

The polymer dispersed liquid crystal display device thus produced is cut and one substrate is peeled off from the other substrate in liquid nitrogen. The liquid crystal material is washed away with acetone, and a horizontal section of the polymer walls 17 is observed by a scanning electron microscope (SEM), revealing that the liquid crystal regions 16 which have the same regularity as that of a dot pattern of the photomask 14 and have a nearly uniform spherical shape with almost the same size are formed.

The present example has one characteristic: each interval a between the center of one liquid crystal region and the center of the adjacent liquid crystal region along the direction of a surface of the substrate is within a width of one pixel along this direction; and 80% or more of the intervals a satisfy a relationship: $3b/2>a>b/2$, where b is an average of the intervals a.

The structure of each component applied to the present example and modified examples thereof will be described below.

A Light Regulating Means Such as a Photomask

The study of the inventors of the present invention revealed the following:

Among portions of a photomask for forming light-irradiated regions and weak light-irradiated regions, in the case where the masking portions for forming the weak light-irradiated regions have a period of less than 2 μm, the liquid crystal regions also have a diameter of less than 2 μm. As a result, a number of liquid crystal regions on which visible light is not likely to be reflected are formed and light scattering under no voltage is decreased. In addition, the thickness between the substrates also influences the light scattering. That is, when the diameter of the masking portions of the photomask is smaller than the thickness between the substrates, liquid crystal regions to be formed have a honeycomb structure in the form of a circle, which causes the decrease in light scattering. Moreover, in this structure, when a voltage is applied, the liquid crystal display device cannot be in a sufficiently transparent state.

In the case where the period of the masking portions is more than 50 μm, the diameter of liquid crystal regions to be formed has a period of more than 50 μm. The liquid crystal regions occupy most of the part between the substrates, so that among light scattering characteristics, the masking characteristic is decreased. Thus, this structure is not preferred.

Accordingly, in view of the above-mentioned results, in the present example, the average range of a period of the masking portions is preferably in the range of 2 μm to 50 μm; and more preferably in the range of 3 μm to 20 μm. When the period is taken as 20 μm or less, intensity of light scattering can be increased as the size of a light scattering source (in this case, the liquid crystal regions) becomes closer to a wavelength of light, whereby a masking characteristic among the light scattering characteristics can be improved.

Under the above-mentioned limitations, the interval a between the center of one liquid crystal region and the center of the adjacent liquid crystal region along the direction of the surface of the substrate is within a width of one pixel along this direction; and 80% or more of the intervals a along this direction satisfies the relationship: $3b/2>a>b/2$, where b is an average of the intervals a. More specifically, the regularity of the liquid crystal regions is increased.

Any shape of masking portions can be used as long as the intensity of UV-rays is controlled. In the present example, a masking portion corresponding to a circle, a square, a trapezoid, a hexagon, a rectangle, a diamond shape, a letter shape, a shape surrounded by a curved line(s) and/or a straight line(s) can be used, although it is not limited to these shapes. A configuration obtained by cutting a part of these shapes; a configuration obtained by the combination of the different shapes; a configuration obtained by the combination of the same shapes; and the like can be used. In the case where the configuration obtained by the combination of the same shapes is used, the average diameter of each masking portion is taken as a distance from a center of the configuration to an outermost portion thereof. In addition, when the present invention is put into practical use, one or more of these shapes are selected. In order to improve uniformity of the liquid crystal regions, it is preferred to limit the configuration to one shape with the same size.

Another characteristic of the present example is in that the liquid crystal regions are regularly aligned in a horizontal direction along the surface of the substrate. In this case, the position of the weak light-irradiated regions is important. When the interval between the respective weak light-irradiated regions is less than 1 μm, the weak light-irradiated regions are in a continuous shape and irradiated portions are in a dot shape; and thus, advantages of regulating the liquid crystal regions of the present invention will be lost.

In contrast, when the interval between the respective weak light-irradiated regions is more than 50 μm, portions where the intensity of UV-rays cannot be intercepted so as to regulate the liquid crystal regions are increased in number, and the number of liquid crystal regions with a random diameter as in the conventional example are formed, decreasing the advantages of the present example.

Thus, in the present example, the interval between the respective liquid crystal regions is in the range of 1 μm to 50 μm, and more preferably in the range of 5 μm to 20 μm.

A respective weak light-irradiated regions are not necessarily independent. The weak light-irradiated regions can be connected to each other at ends thereof. Any photomask with masking portions for decreasing the intensity of UV-rays which have the above-mentioned shape and orientation can be used.

A similar regularity is required for the photomask. In Example 1, a photomask satisfying the following conditions can be used:

Patterns are formed continuously or independently in a regular manner, and minimum repeating units of the patterns are within a circle having a diameter in the range of 1 µm to 50 µm. An interval from the center of one unit pattern to that of the adjacent unit pattern is in the range of 1 µm to 50 µm.

The photomask can be positioned either inside or outside the substrate. When the photomask is positioned inside the substrate, a reflective mode (e.g., GH mode), etc. can be used. In this case, light is irradiated from the side of the substrate on which the photomask is not formed, and the photomask is used as a reflecting plate.

Irradiation Light

It is preferred that the irradiation of light to the mixture is conducted by using light having the following light intensity distribution:

The light intensity of at least one portion of each pixel is 90% or less of the maximum illuminance in a circular area which corresponds to 10 times the pixel area and whose center is situated in the center of the pixel.

A Liquid Crystal Material

Examples of the liquid crystal used in the present invention include organic substances or organic mixtures which are in a liquid crystal state in the vicinity of an ordinary temperature, such as nematic liquid crystal (including liquid crystal for a dual frequency drive and liquid crystal with the anisotropy of dielectric constant $\Delta\epsilon<0$), cholesteric liquid crystal (in particular, liquid crystal having a selective reflection characteristic with respect to visible light), smectic liquid crystal, ferroelectric liquid crystal (e.g., SmC*), and discotic liquid crystal. These liquid crystals can be mixed. In particular, nematic liquid crystal or nematic liquid crystal to which cholesteric liquid crystal is added is preferred in view of the properties thereof. More preferably, liquid crystal which is excellent in resistance to chemical combination reactivity due to the photopolymerization during the manufacturing is used. An example thereof includes liquid crystal having an inactive functional group such as an fluorine atom in its compound, e.g., ZLI-4801-000, ZLI-4801-001, and ZLI-4792 which are available from Merck & Co., Inc.

A Polymerizable Material

A polymerizable material is mixed with a liquid crystal material to form a mixture. Finally, the polymer thus obtained functions as a wall supporting two substrates and the liquid crystal regions. Thus, the selection thereof is important. The polymerizable material useful for the present example is a light-curable monomer. In addition, other polymerizable materials can be used. Examples of the light-curable monomer include acrylic acids and acrylic esters having a long chain alkyl group containing three or more carbons or an aromatic ring. Moreover, examples thereof include isobutyl acrylate, stearyl acrylate, lauryl acrylate, isoamyl acrylate, n-butylmethacrylate, n-lauryl methacrylate, tridecyl methacrylate, 2-ethylhexyl acrylate, n-stearyl methacrylate, cyclohexyl methacrylate, benzyl methacrylate, and 2-phenoxyethyl methacrylate.

In order to increase the physical strength of the polymer, multi-functional material with two or more functional groups, such as bisphenol A dimethacrylate, bisphenol A diacrylate, 1,4-butanediol dimethacrylate, 1,6-hexanediol dimethacrylate, trimethylol propane triacrylate, and tetramethylolmethane tetraacrylate can be used.

Moreover, a polymerizable material obtained by halogenating, in particular, by chlorinating or fluorinating the above-mentioned monomer can be used. Examples of this polymerizable material include 2,2,3,4,4,4-hexaphlorobutyl methacrylate, 2,2,3,4,4,4-hexachlorobutyl methacrylate, 2,2,3,3-tetraphloropropyl methacrylate, 2,2,3,3-tetraphloropropyl methacrylate, perphlorooctyl methacrylate, perchlorooctylethyl methacrylate, perphlorooctylethyl acrylate, and perchlorooctylethyl acrylate.

The above-mentioned polymerizable material can be used alone or in combination of two or more kinds thereof. If required, chlorinated or fluorinated polymers or oligomers can be mixed with the abovementioned monomer.

In the case where a thin film transistor (TFT) is used as a switching element, an electrical insulation property is required for a polymer as well as a liquid crystal material. Thus, a polymer which has a specific resistance of $1\times10^{12}$ $\Omega$.cm or more even in an uncured state is preferred.

In the production of a polymer dispersed liquid crystal display device by the conventional photopolymerization phase separation method, it is preferred that the liquid crystal material and the polymerizable material are combined so that a diameter of liquid crystal regions is larger than a dot diameter of a photomask used. In the case where the combination of the polymerizable material and the liquid crystal material causes the diameter of the liquid crystal regions to be smaller than the dot diameter, this combination can be used by weakening the intensity of UV-rays or reducing the added amount of a photopolymerization initiator.

Hereinafter, applications for Example 1 will be described.

APPLICATION 1

Two substrates 12 and 13 were used. The substrate 12 was made of flint glass with ITO (a mixture containing indium oxide and tin oxide) with a thickness of 500 Angstroms (manufactured by Nippon Sheet Glass Co., Ltd.) functioning as the pixel electrodes 11. The substrate 13 was also made of glass; and the photomask 14 with a dot pattern made of aluminum (having circles with a diameter of 10 µm, the interval between the centers of adjacent circles being 15 µm and circles being positioned in a matrix) was provided on one surface of the substrate 13 and the counter electrode 15 was formed on the other surface thereof by vapor-deposited ITO to a thickness of 500 Angstroms. The two substrates 12 and 13 faced each other with spacers having a diameter of 12 µm sandwiched therebetween, whereby a cell was formed.

Then, 0.1 g of trimethylol propane trimethacrylate and 0.9 g of 2-ethylhexyl acrylate; and 4.0 g of a mixture in which ZLI-4792 (manufactured by Merck & Co., Inc.) was mixed with 0.03 g of a photopolymerization initiator Irgacure 184 (manufactured by CIBA-GEIGY Corporation) were homogeneously mixed. After that, the resulting mixture was inserted into the cell thus obtained. Then, the UV-rays 20 were irradiated through the photomask 14 to the cell by using a high-pressure mercury lamp (which can provide parallel rays) at an illuminance of 20 mW/cm² for two minutes to cure the polymerizable material, whereby a polymer dispersed liquid crystal display device was obtained. In the cell, the polymer walls 17 and the liquid crystal regions 16 regulated by the photomask 14 were formed in a regular manner.

The polymer dispersed liquid crystal display device was observed, revealing that the condition of uniformity was satisfied. More specifically, the interval a between the center of one liquid crystal region and the center of the adjacent liquid crystal region in a direction along the surface of the substrate was within a width of one pixel along this direction; and 95% of the intervals a satisfied the relationship: $3b/2>a>b/2$, where b is an average of the intervals a.

The electro-optic characteristics of this polymer dispersed liquid crystal display device were as follows:

When light transmittance was increased by 10% of a value obtained by subtracting transmittance $T_0$ under no voltage from the saturation transmittance $T_{sat}$ under an excess voltage applied, an applied voltage $V_{10}$ was 4.3 V. When light transmittance was increased by 90% of a value obtained by subtracting transmittance $T_0$ under no voltage from a saturation transmittance $T_{sat}$ under an excess voltage applied, an applied voltage $V_{90}$ was 5.1 V. Thus, the drive voltage of Application 1 was lower than that of the conventional polymer dispersed liquid crystal display device, and had excellent agility ($\alpha=V_{90}/V_{10}=1.18$). Moreover, polarizing plates were provided on the upper and lower sides of the polymer dispersed liquid crystal display device so that each polarizing direction crossed each other at right angles (crossed Nicols). Because of this, when a voltage was applied, the liquid crystal display device was in a black state, and when a voltage was not applied, it was in a white state. Thus, a satisfactory black and white display was achieved.

COMPARATIVE EXAMPLE 1

A polymer dispersed liquid crystal display device was manufactured in the same way as in Application 1 except that a glass substrate with ITO (flint glass with ITO having a thickness of 500 Angstroms, manufactured by Nippon Sheet Glass Co., Ltd.) was used in place of the substrate 13 with the photomask 14.

The liquid crystal display device thus obtained was observed by using the SEM, revealing that the diameter and shape of the liquid crystal regions were not uniform. In this device, the interval a between the center of one liquid crystal region and the center of the adjacent liquid crystal region in a direction along the surface of the substrate was within a width of one pixel along this direction; and 65% of the intervals a satisfied the relationship: $3b/2>a>b/2$, where b is an average of the intervals a. As to the electro-optic characteristics, $V_{10}$ and $V_{90}$ were 7.5 V and 13.7 V, respectively and $\alpha=1.83$.

APPLICATION 2

In place of the glass substrates 12 and 13 used in Application 1, PET films with ITO having a thickness of 125 μm were used. Spacers with a diameter of 12 μm were dispersed on one PET film, and the other PET film was placed thereon to form a cell. The same material as that of Application 1 was injected into the cell. Then, a photomask 14 having the same dot pattern as that of Application 1 was placed so that a mask image was in contact with the PET film, and UV-rays were irradiated to the cell through the photomask 14 in the same way as in Application 1, whereby a polymer dispersed liquid crystal display device was obtained.

The polymer dispersed liquid crystal display device thus obtained was cut, and one substrate was peeled off from the other substrate in liquid nitrogen. After, the liquid crystal material was washed away with acetone, and a horizontal section of the polymer walls was observed by the SEM. As a result, it was revealed that uniformly aligned liquid crystal regions with almost the same size were formed having the same regularly as that of the dot pattern of the photomask 14. The interval a between the center of one liquid crystal region and the center of the adjacent liquid crystal region in a direction along the surface of the substrate was within a width of one pixel along this direction; and 97% of the intervals a satisfied the relationship: $3b/2>a>b/2$, where b is an average of the intervals a. Moreover, as to the electro-optic characteristics, $V_{10}$ and $V_{90}$ were 4.6 V and 5.8 V, respectively. Thus, the liquid crystal display device having a lower drive voltage, compared with the conventional polymer dispersed liquid crystal display device and having excellent agility ($\alpha=V_{90}/V_{10}=1.26$) was obtained.

COMPARATIVE EXAMPLE 2

A polymer dispersed liquid crystal display device was manufactured in the same way as in Application 2, except that UV-rays were irradiated without using the photomask 14. The shape of the polymer regions in the polymer dispersed liquid crystal display device thus obtained was not uniform. The interval a between the center of one liquid crystal region and the center of the adjacent liquid crystal region in a direction along the surface of the substrate was within a width of one pixel along this direction; and 67% of the intervals a satisfied the relationship: $3b/2>a>b/2$, where b is an average of the intervals a. Moreover, as to the electro-optic characteristics, $V_{10}$ and $V_{90}$ were 7.7 V and 14.3 V, respectively and $\alpha=1.85$.

As described above, in the case of Example 1, a polymer dispersed liquid crystal display device in which liquid crystal regions each having a uniform diameter are regularly aligned along a surface of a substrate can be manufactured with a good yield in a smaller number of steps.

In addition, a liquid crystal display device obtained by using the method of Example 1 has a performance comparable to the conventional liquid crystal display device (which is not polymer dispersed). Moreover, the number of liquid crystal regions in one pixel and the shape thereof can be freely varied, so that the regulation of the intensity of light scattering which occurs on the interfaces between the liquid crystal regions and the polymer walls, the adjustment of a drive voltage, the high precision of a screen, and the like are made possible, all of which cannot be achieved by the conventional polymer dispersed liquid crystal display device. Furthermore, since the diameter of the liquid crystal regions is uniform, the threshold value characteristic curve becomes steep, and a display with high precision and high contrast is made possible. In the case where a light-intercepting mask is provided as described above, the light scattering which occurs on the interfaces between the liquid crystal regions and the polymer walls can be prevented and contrast characteristics can be further improved. The liquid crystal display device obtained in Example 1 can be used in a simple matrix drive with high duty ratio. The liquid crystal display device obtained in Example 1 can be used, for example, in a surface display device of a projection TV, a personal computer, etc., a display plate, a window, a door, a wall, and the like utilizing shutter effects. In particular, the liquid crystal display device obtained in Example 1 can be used as a polymer dispersed liquid crystal display device of a direct viewing type.

EXAMPLE 2

Example 2 is the case where the present invention is applied to a non light scattering type liquid crystal display device.

A method for manufacturing a liquid crystal display device according to Example 2 will be described with reference to FIGS. 2A and 2B.

Figure 2A:
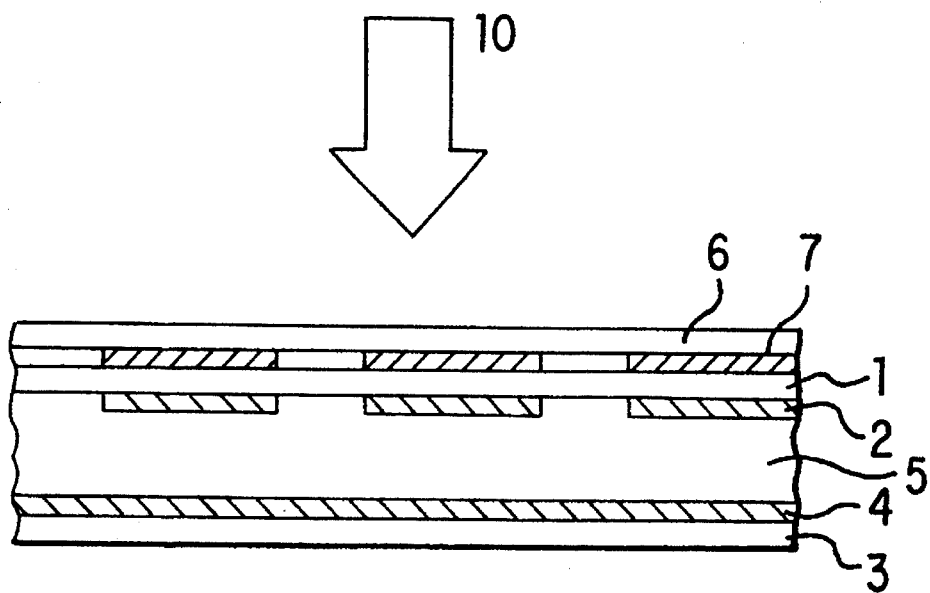
FIG. 2A is a cross-sectional view showing the state of the liquid crystal display device of Example 1 before being irradiated with light.

First, as shown in FIG. 2A, a substrate 1 and a counter substrate 3 face each other. A mixture 5 containing a liquid crystal material and a light-curable material is sealed between the two facing substrates 1 and 3. The substrate 1 is transparent, and pixel electrodes 2 are formed on the underside of the substrate 1. A counter electrode 4 is formed over the entire inner surface of the counter substrate 3.

On the substrate 1, a glass plate 6 on which a photomask 7 is formed is placed. The mixture 5 is irradiated with UV-rays 10 through the photomask 7. Consequently, as shown in FIG. 2B, walls 8 formed of a polymer resin and liquid crystal regions 9 partitioned by the walls 8 are formed. In stronger UV-rays irradiated regions, a polymer is rapidly deposited due to the high polymerization rate, and liquid crystal molecules which are present together with the polymer are pushed out to weaker UV-rays irradiated regions. As a result, the liquid crystal regions 9 are formed in the weaker UV-rays irradiated regions. The liquid crystal regions 9 have flat portions in the vicinity of the substrates 1 and 3, the flat portions being parallel with the surfaces of the substrates 1 and 3.

In the liquid crystal display device of the present invention thus manufactured, the liquid crystal regions 9 are formed in regions which are covered with masking portions of the photomask 7; and the polymer walls 8 are formed in regions which are not covered with the masking portions of the photomask 7. That is to say, the liquid crystal regions 9 and the polymer walls 8 are formed under the condition that they are clearly separated from each other.

The reason for providing the horizontal portions in the liquid crystal regions 9 is that boundaries between the liquid crystal regions 9 and the polymer walls 8 are positioned outside a pixel and incident light is allowed to pass through only the liquid crystal regions 9 which have less variation of refractive index in each portion thereof, thereby decreasing their light scattering ability. In this case, as the horizontal portions become larger, more effective results can be obtained.

Since the polymer walls 8 reach both of the substrates 1 and 3 (strictly speaking, the polymer walls 8 do not reach the surfaces of the substrates, since electrodes etc. are formed on the substrates) the substrates 1 and 3 are securely supported by the polymer walls 8, whereby shock resistance can be improved. Moreover, even though the liquid crystal display device is used under the condition that the device stands on end, a lower gap between the substrates 1 and 3 is prevented from being wider than an upper gap therebetween. In particular, the liquid crystal display device of the present example is effective in the case where film-shaped substrates are used.

The real shape of the liquid crystal regions formed in Example 2 can be observed and confirmed by peeling one of the two substrates from the other substrate, removing the liquid crystal molecules with a solvent, and by analyzing the polymer walls 8 with the SEM. Since some portions of the liquid crystal display device are likely to be damaged while samples for the SEM observation are formed, it is preferred that 20 liquid crystal regions which are most excellent in regularity among samples are selected to observe the polymer matrix.

Figure 3:
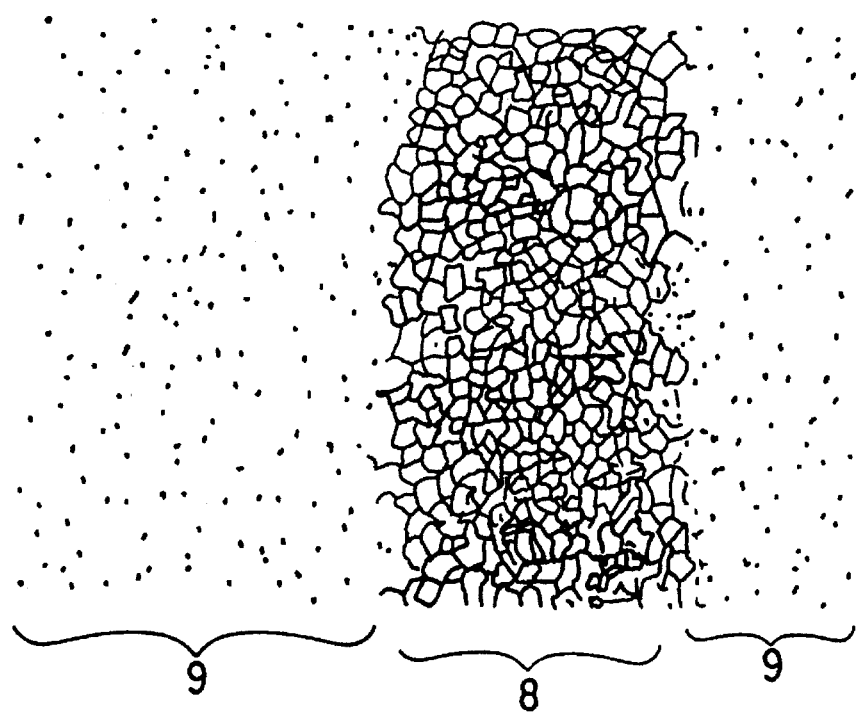
FIG. 3 is a view showing boundary regions between polymer walls cured by being irradiated with light and liquid crystal according to Example 1.

FIG. 3 shows a view obtained by observing the state, in which the polymer wall 8 and the liquid crystal regions 9 are divided by phase separation, by using a microscope. As is understood from this figure, the polymer wall 8 is not formed in a region to which UV-rays weakened by the photomask 7 is irradiated; and the polymer wall 8 is formed in a region to which UV-rays are irradiated and in the vicinity thereof. It is noted that in some cases, small liquid crystal regions are formed in the polymer walls 8.

Hereinafter, the structure of each component applied to the present example and modified examples thereof will be described.

A Light Regulating Means Such as a Photomask

The study of the inventors of the present invention revealed the following:

Among portions of a photomask for forming light-irradiated regions and weak light-irradiated regions, in the case where the masking portions for forming the weak light-irradiated regions respectively have an area of 30% or less of each pixel area, the liquid crystal regions also respectively have an area of 30% or less of each pixel area. This case is not practical since a number of interfaces between the liquid crystal regions and the polymer walls are 10 present in one pixel, greatly decreasing contrast because of light scattering. Thus, in the present example, at least one liquid crystal region contained in one pixel has an area of 30% or more of each pixel area.

Figure 2B:
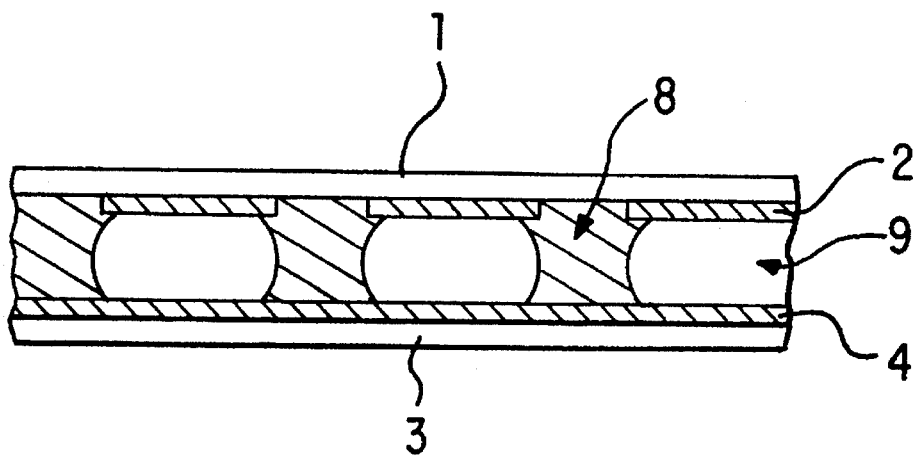
FIG. 2B is a cross-sectional view showing the state of the liquid crystal display device of Example 1 after being irradiated with light.

More specifically, in the present example, as shown in FIG. 2B, the size of each liquid crystal region 9 is made almost the same size as that of the pixel electrode 2. In this structure, only one liquid crystal region 9 can be formed within one pixel, and the orientation direction of the liquid crystal regions 9 can be set by providing orientation films on the substrates 1 and 3. This structure is preferred in view of the ratio of aperture (i.e., a ratio of the total effective area of all the pixels to the area of the display area).

Figure 4:
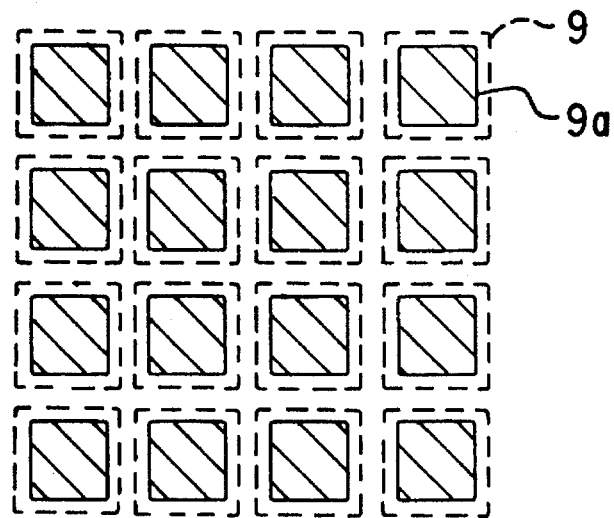
FIG. 4 is a plan view of a photomask used in the case where one liquid crystal region is provided for one pixel electrode.
Figure 5A:
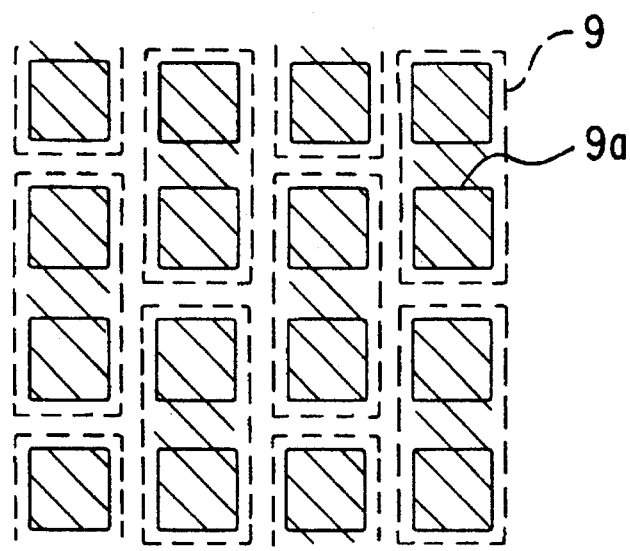
FIG. 5A is a plan view of a photomask used in the case where one liquid crystal region is provided for two pixel electrodes.
Figure 5B:
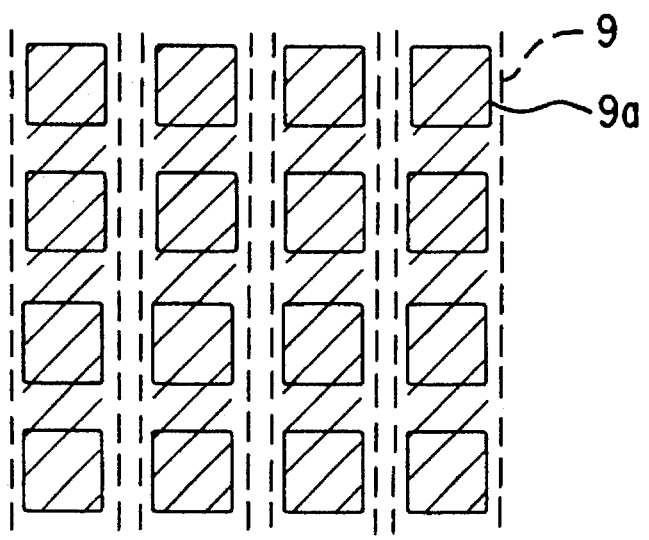
FIG. 5B is a plan view of a photomask used in the case where one liquid crystal region is provided for one row of pixel electrodes.

In the present example, it is preferred that the liquid crystal display regions 9 are regularly aligned along a surface of the substrate, i.e., with respect to each pixel. In this case, as shown in FIG. 4, it is preferred that the position of each weak light-irradiated region for forming each liquid crystal region 9 is adjusted to an orientation pitch of pixels 9a, and one weak light-irradiated region is positioned in one pixel. Alternatively, as shown in FIG. 5A, one weak light-irradiated region is positioned over two pixels 9a or over three or more pixels 9a. As shown in FIG. 5B, it is possible that weak light-irradiated regions are formed over each column of the pixels 9a. In addition, the masking portions of the photomask for forming the weak light-irradiated regions are not necessarily separated from each other completely, and can be connected to each other at the ends thereof, as long as the masking portions have the shape and orientation (described later) for effectively intercepting UV-rays (but not completely intercepting UV-rays).

Figure 6:
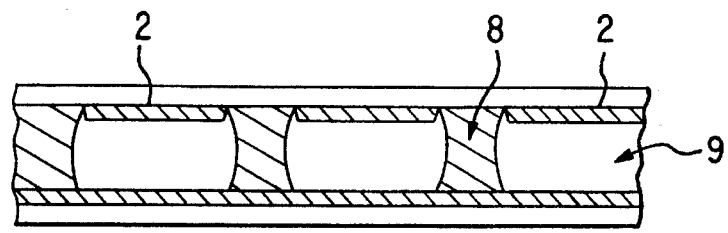
FIG. 6 is a cross-sectional view of a liquid crystal display device in which liquid crystal regions are made larger than those of FIG. 2B, whereby the liquid crystal regions are formed closer to the pixel electrodes.

Furthermore, as shown in FIG. 6, in order to decrease the number of the interfaces in a pixel between the liquid crystal regions 9 and the polymer walls 8 which cause the light scattering, it is preferred that the weak light-irradiated regions larger than the pixel electrodes 2 are formed. In this case, a light regulating means which allows UV-rays to radiate to only the portions other than the pixels can be used. In particular, as the light regulating means, a photomask can be used, whereby the intensity of light scattering in the pixels is decreased and contrast of the liquid crystal display device can be improved.

Any shape of the masking portions can be used as long as the intensity of UV-rays in 30% or more of all of the pixels is decreased. In the present example, a masking portion corresponding to a circle, a square, a trapezoid, a hexagon, a rectangle, a diamond shape, a letter shape, a shape surrounded by a curved line(s) and/or a straight line(s) can be used, although it is not limited to these shapes. A configuration obtained by cutting a part of these shapes; a configuration obtained by the combination of the different shapes; a configuration obtained by the combination of the same shapes; and the like can be used. When the present invention is put into practical use, one or more of these shapes are selected. In order to improve uniformity of the liquid crystal regions, it is preferred to limit the configuration to one shape with the same size.

In the present example, another light regulating means can be used in place of a photomask. For example, a microlens, an interfering plate, etc. capable of forming a regular distribution of the intensity of UV-rays can be used. Such light regulating means can be provided inside or outside the liquid crystal display device, as long as strong UV-rays and weak UV-rays can be irradiated in a regular manner. In the case where a photomask is used, if a distance between the liquid crystal layer and the photomask is made large, an image is blurred due to the light passed through the photomask and weak light-irradiated regions become unclear, resulting in decreased advantages of the present invention. Thus, it is preferred that the photomask is placed as close as possible to the liquid crystal layer.

Irradiation Light

UV-rays used in the present example are desirably parallel rays, although a light beam and line light can be used. In the case of a liquid crystal display device using ferroelectric liquid crystal, light with a slightly poorer degree of parallelization can be used. More specifically, in the case of the liquid crystal display device using ferroelectric liquid crystal, it is required to improve shock resistance. For that purpose, it is effective to provide smaller liquid crystal regions at the periphery of the liquid crystal regions as a buffer substance. Instead of using light with a slightly poorer degree of parallelization, a light regulating means such as a photomask having end portions which allow more light to pass therethrough toward the outside thereof can be used, or the photomask can be placed at a distance from a cell body. In the present example, ordinary light including UV-rays can be used.

According to the present example, the weak light-irradiated regions almost corresponding to required liquid crystal regions in terms of position are formed, whereby a polymerizable material can regularly be optically polymerized and uniform liquid crystal regions can regularly be positioned in a direction along the surface of the substrate.

An Optimum Thickness of a Liquid Crystal Layer

An optimum thickness of a liquid crystal layer is varied depending upon the display mode.

A Method For Injecting a Mixture Between Substrates

In the present example, two substrates are attached to each other by the conventional general method, and after that a mixture containing the liquid crystal material and the light-curable material is injected between the substrates. Alternatively, before the two substrates are attached to each other, the mixture is dropped or coated onto one substrate, and under this condition, UV-rays are irradiated to the substrate to cure the light-curable material. Then, the two substrates are attached to each other. The latter method has the advantage in that spacers and the like are not required for regulating the thickness of the liquid crystal layer.

Figure 7:
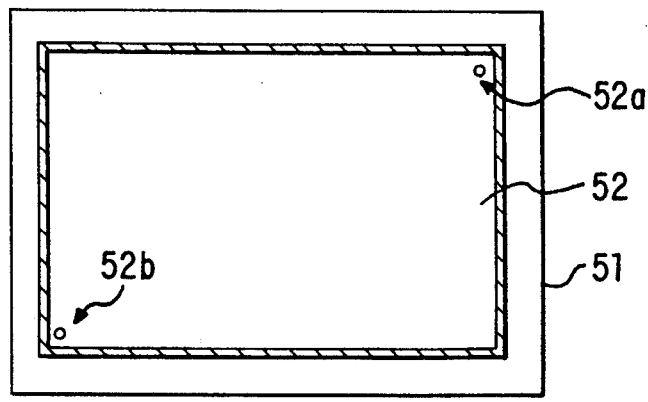
FIG. 7 is a plan view of a cell, illustrating a method for injecting a mixture into the cell by vacuum injection.
Figure 8:
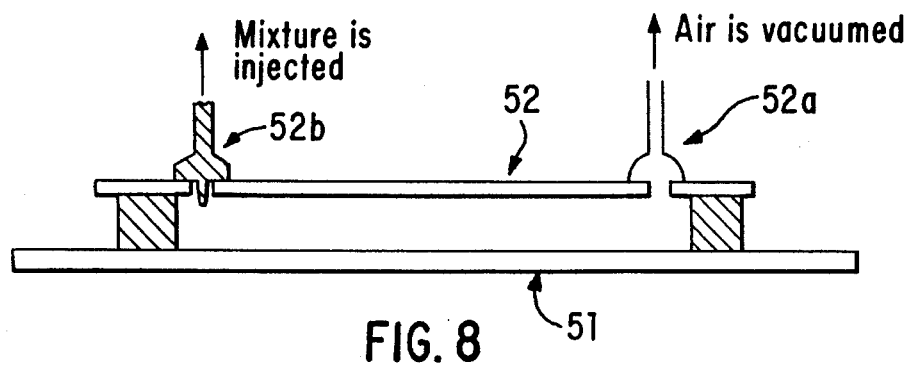
FIG. 8 is a cross-sectional side view of the cell shown in FIG. 7.
Figure 9:
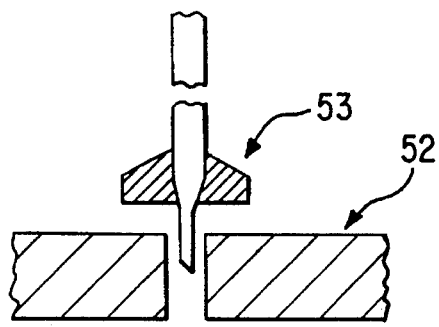
FIG. 9 is a front view showing an injector.

Alternatively, an injection method shown in FIG. 7 (a front view) and FIG. 8 (a cross-sectional view) can be used. According to this method, in a cell in which two substrates 51 and 52 facing each other are sealed, at least two openings 52a and 52b are formed in the substrate 52. While air is taken out of one opening 52a, a mixture is injected though the other opening 52b into the cell by using a injector 53 shown in FIG. 9. As to the position of the openings, one or more opening can be provided in one substrate and the remaining openings can be provided in a sealed portion. The air in the cell can be vacuumed through an opening from outside thereof. In this case, it is preferred that the degree of decompression be in the range of 200 Pa to atmospheric pressure in the opening to which a vacuum is applied. Moreover, it is also possible that while pressure is applied from one opening, a mixture is injected from that opening to which pressure is applied. In this case, it is preferred that the degree of pressure be in the range of atmospheric pressure to $10^6$ Pa.

This injection method can be applied to Example 1.

A Method For an Orientation Treatment

Examples of a method for an orientation treatment include a rubbing method in which after a polymer material such as polyimide and an inorganic material are coated onto a surface of a substrate, the resulting substrate is rubbed by using a cloth; a homeotropic method in which a surfactant compound with low surface tension is coated onto a substrate; and a diagonal orientation method in which $SiO_2$ is vapor-deposited onto a substrate.

An Orientation Film

Figure 10A:
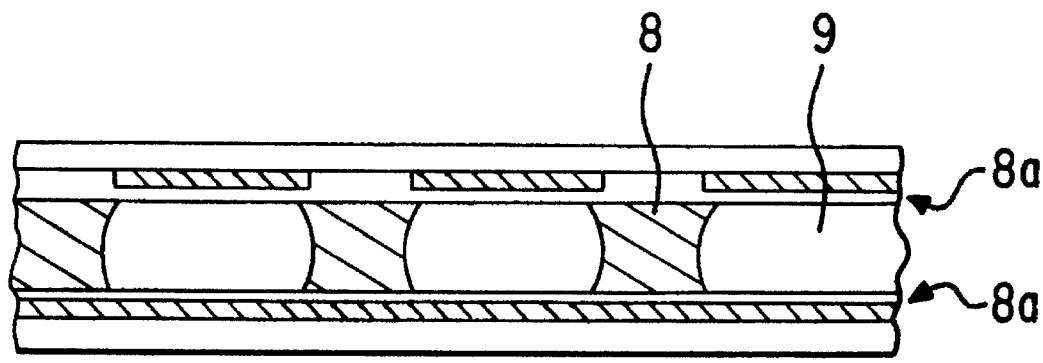
FIG. 10A is a cross-sectional view showing a liquid crystal display device with an orientation film applicable to the present invention, where the size of liquid crystal regions is slightly smaller than that of pixel electrodes.
Figure 10B:
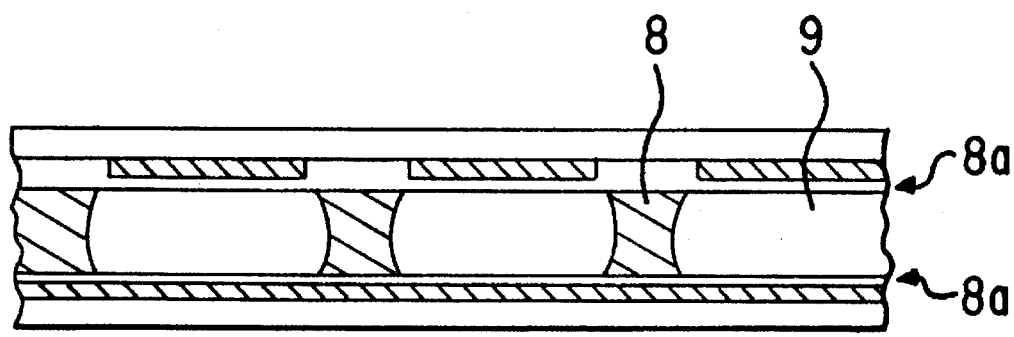
FIG. 10B is a cross-sectional view showing a liquid crystal display device with an orientation film applicable to the present invention, where the size of liquid crystal regions is larger than that of the pixels.

In the present example, substrates with orientation films can be used. In this case, as shown in FIGS. 10A and 10B, orientation films 8a and liquid crystal molecules in the liquid crystal regions 9 are in direct contact with each other, whereby the liquid crystal molecules can be oriented.

A preferred orientation film will be described in detail in Example 9.

A Polymerizable Material

A polymerizable material is mixed with a liquid crystal material to form a mixture. Finally, the polymer thus obtained functions as a wall supporting two substrates and the liquid crystal regions. Thus, the selection thereof is important. The polymerizable material useful for the present example is a light-curable monomer. In addition, other polymerizable materials can be used. Examples of the light-curable monomer include acrylic acids and acrylic esters having a long chain alkyl group containing three or more carbons or an aromatic ring. Moreover, examples thereof include isobutyl acrylate, stearyl acrylate, lauryl acrylate, isoamyl acrylate, n-butylmethacrylate, n-lauryl methacrylate, tridecyl methacrylate, 2-ethylhexyl acrylate, n-stearyl methacrylate, cyclohexyl methacrylate, benzyl methacrylate, and 2-phenoxyethyl methacrylate.

In order to increase the physical strength of the polymer, multi-functional materials with two or more functional groups, such as bisphenol A dimethacrylate, bisphenol A diacrylate, 1,4-butanediol dimethacrylate, 1,6-hexanediol dimethacrylate, trimethylol propane triacrylate, and tetramethylolmethane tetra acrylate can be used.

Moreover, a polymerizable material obtained by halogenating, in particular, by chlorinating or fluorinating the above-mentioned monomer can be used. Examples of this polymerizable material include 2,2,3,4,4,4-hexaphlorobutyl methacrylate, 2,2,3,4,4,4-hexachlorobutyl methacrylate, 2,2,3,3-tetraphloropropyl methacrylate, 2,2,3,3-tetraphloropropyl methacrylate, perphlorooctyl methacrylate, perchlorooctylethyl methacrylate, perphlorooctylethyl acrylate, and perchlorooctylethyl acrylate.

The above-mentioned polymerizable material can be used alone or in a combination of two or more kinds thereof. If required, chlorinated and/or fluorinated polymers or oligomers can be mixed with the above-mentioned monomer.

In the case where a thin film transistor (TFT) is used as a switching element, an electrical insulation property is required for a polymer as well as a liquid crystal material. Thus, a polymerizable material which has a specific resistance of $1 \times 10^{12}$ Ω.cm or more even in an uncured state is preferred.

A Liquid Crystal Material

Examples of the liquid crystal used in the present invention include organic substances or organic mixtures which are in a liquid crystal state in the vicinity of an ordinary temperature, such as nematic liquid crystal (including liquid crystal for a dual frequency drive and liquid crystal with anisotropy of dielectric constant $\Delta\epsilon<0$), cholesteric liquid crystal (in particular, liquid crystal having a selective reflection characteristic with respect to visible light), smectic liquid crystal, ferroelectric liquid crystal (e.g., SmC*), and discotic liquid crystal.

As the ferroelectric liquid crystal, linear molecules having a hard core portion and an optically active portion in the molecules can be used. Moreover, it is also possible that a guest-host mode liquid crystal display device using the ferroelectric liquid crystal material to which a multi-color dye is added is manufactured, and this device is combined with one polarizing plate to form a liquid crystal display device. As a ferroelectric liquid crystal prepolymer, a compound obtained by binding one part of the abovementioned ferroelectric liquid crystal with a polymerizable functional group can be used. Examples of the polymerizable functional group include an acrylate group, a methacrylate group, an epoxy group, etc. Examples of the ferroelectric liquid crystal prepolymer include compounds disclosed in Japanese Laid-Open Patent Publication Nos. 62-277412, 63-264629, and 63-280742. Moreover, a curable resin which is not liquid crystal Can be added to liquid crystal to such a degree that the response speed of the liquid crystal display device is not deteriorated.

Two or more liquid crystal materials can be mixed. In particular, nematic liquid crystal or nematic liquid crystal to which cholesteric liquid crystal or a chiral agent is added is preferred in view of the properties thereof. Moreover, photopolymerization is involved during the manufacturing of liquid crystal regions, so that a liquid crystal material excellent in resistance to chemical combination reactivity without being modified during the polymerization is preferably used. An example thereof includes liquid crystal having an inactive functional group such as a fluorine atom in its compound, e.g., ZLI-4801-000, ZLI-4801-001, and ZLI-4792 which are available from Merck & Co., Inc.

Conditions For Forming Liquid Crystal Regions

It is difficult to separately form light scattering type and non light scattering type liquid crystal regions. In general, liquid crystal regions which have a diameter of less than 20 μm in a cell and are uniformly formed in a pixel can be used in a liquid crystal display device suitable for a light scattering type. In contrast, liquid crystal regions which have large horizontal portions which are parallel with the substrates can be used in a liquid crystal display device suitable for a non light scattering type.

The size of liquid crystal regions depends upon the shape of the masking portions of a photomask, a degree of parallelization of light of a light irradiation device, and a photopolymerization rate, respectively. The shape of the masking portions is an important factor for determining the size of the liquid crystal regions. When the shape of the masking portions is determined, an outline of the liquid crystal regions is almost determined.

The degree of parallelization of light is a factor for determining whether light can exactly be irradiated to a mixture containing liquid crystal, a light-curable material, and a photopolymerization initiator, as in the form of the shape of the masking portions of the photomask. The degree of parallelization of light also influences the amount of light leaked from light-irradiated regions to weak light-irradiated regions. Because of such leaked light, the light-curable material present in the weak light-irradiated regions is cured before moving into the light-irradiated regions; as a result, small liquid crystal regions which are suitable for a light scattering type liquid crystal display device are formed in the weak light-irradiated regions.

In the case of a high photopolymerization rate, the light-curable material is cured even due to slightly leaked light, and consequently, polymer walls are formed in the weak light-irradiated regions. Examples of a factor for determining the photopolymerization rate include added amounts of the photopolymerization initiator, the intensity of light irradiation, the kind of the polymerizable material, and the like.

A Display Mode

The liquid crystal display device manufactured in the present example is sandwiched by two polarizing plates, whereby a liquid crystal display device of a TN mode, an STN mode, an ECB mode, and a guest-host mode (in which the drive voltage characteristic curve is steep); and a ferroelectric liquid crystal display device can be manufactured. One polarizing plate can be provided only on the side of one substrate. Namely, when a polarizing plane of light is changed by electrically regulating the orientation direction in liquid crystal which is obtained by adding a dichroic dye to ferroelectric liquid crystal, only one polarizing plate can be used.

Ability For Regulating the Orientation Of Liquid Crystal Molecules

In the case where light is irradiated to the mixture containing the liquid crystal molecules and the light-curable material under the condition that weak light is irradiated to some parts of the mixture as in the present invention, a thin polymer film is sometimes retained on the surface of the substrate even in the liquid crystal regions. Thus, the ability of the orientation films on the substrates is sometimes decreased. The liquid crystal molecules can be aligned depending upon the light irradiation conditions as in applications described later by completely removing the ability of the orientation films. More specifically, domains in the liquid crystal regions are aligned in a radial manner or a random manner, and when a voltage is applied, the liquid crystal molecules stand in almost the same way when seen from any direction. Thus, the refractive index no longer depends upon the direction in which the liquid crystal display device is seen, and the characteristics of the viewing angle can be improved. In this case, orientation films are not required, so that the number of manufacturing steps (coating of orientation films, rubbing treatment, washing, etc.) can greatly be reduced, which is industrially advantageous.

Liquid crystal molecules can be in homeotropic orientation in which the liquid crystal molecules stand on end with respect to the cell by using a homeotropic orientation film with a strong ability for regulating the orientation. When a voltage is applied to the liquid crystal display device using homeotropic orientation films, the liquid crystal molecules tilt toward each polymer wall at a certain angle due to the interaction between the liquid crystal molecules and the polymer material. Thus, the same refractive index is obtained when seen from any direction, improving the characteristics of the viewing angle.

The following is also confirmed in the present example:

In the case where a liquid crystal material with a strong orientation ability, such as ferroelectric liquid crystal is used, the liquid crystal molecules in the material can be aligned along the orientation state of the substrate even in the present invention in which the ability for regulating the orientation of substrates is decreased.

Others

In the present example, a simple matrix drive system, an active drive system using a TFT, an MIM, etc. can be applied; however, the drive system is not limited thereto.

Moreover, in the liquid crystal display device of the present example, a color display can be performed by providing a color filter on a pixel.

Hereinafter, applications for Example 2 will be described.

APPLICATION 3

A plurality of electrode lines formed of ITO with a thickness of 50 nm were formed on a PET film with a thickness of 0.25 mm. Substrates were formed, two PET films thus obtained being counted as one set. The width of the electrode line, the gap between the adjacent electrode lines, and the number of the electrode lines were 200 μm, 50 μm, and 20, respectively. Polyimide (SE150: manufactured by Nissan Chemical Industries Ltd.) was coated onto one set of substrates by a spin coating method, and the substrates were subjected to rubbing in one direction with a nylon cloth, whereby orientation films were formed.

The resulting two substrates were combined so that the electrode lines on each substrate crossed each other at right angles. A gap between the substrates were kept at a predetermined size by inserting spacers with a diameter of 6 μm between the substrates, whereby a cell was formed.

A photomask was placed on the cell under the condition that masking portions of the photomask cover each pixel 9a as shown in FIG. 4. A homogeneous mixture containing 0.1 g of trimethylol propane trimethacrylate, 0.9 g of 2-ethylhexyl acrylate, 4 g of a mixture in which 0.3% cholesteric nanonate (CN) was added to a ferroelectric liquid crystal material (ZLI-3700-000, manufactured by Merck & Co., Inc.), and 0.03 g of a photopolymerization initiator (Irgacure 184, manufactured by CIBA-GEIGY Corporation) was injected into the cell.

Next, the mixture was irradiated with UV-rays through the photomask at an illuminance of 10 mW/cm$^2$ for 2 minutes by using a high-pressure mercury lamp which can provide parallel rays, whereby the polymerizable material in the mixture was cured.

The liquid crystal display device manufactured as described above was cut, and one substrate was peeled off from the other substrate. The liquid crystal material was washed away with acetone, and after that, the liquid crystal layer was observed by an SEM. As a result, it was confirmed that uniformly aligned liquid crystal regions having the same regularity as those of a dot pattern of the photomask and a pixel pattern and having almost the same size as that of the dot pattern were formed.

Moreover, polarizing plates were attached to another liquid crystal display device manufactured in the same way as the above so that the polarizing direction of the polarizing plates coincides with the orientation direction of the substrates, thereby obtaining a polymer matrix TN liquid crystal display device.

COMPARATIVE EXAMPLE 3

As a comparative example with respect to Application 3, a TN liquid crystal display device with a conventional structure was manufactured as follows:

Two glass plates with ITO (flint glass with ITO having a thickness of 500 Angstroms, manufactured by Nippon Sheet Glass Co., LTd.) were used in place of the substrates of Application 3. A cell was formed in the same way as in Application 3, only the same liquid crystal material as that of Application 3 was injected into the cell, and polarizing plates were attached to the cell so that the polarizing direction of the polarizing plates coincided with the orientation direction of the substrate, whereby a liquid crystal display device was manufactured.

COMPARATIVE EXAMPLE 4

In addition, as a comparative example with respect to Application 3, a liquid crystal display device with a conventional structure was manufactured as follows:

A cell was formed in the same way as in Application 3. The same mixture containing the liquid crystal and the light-curable material as that of Application 3 was injected into the cell, and after that, the cell was irradiated with UV-rays without a photomask, whereby a polymer dispersed TN liquid crystal display device was produced.

Table 1 shows contrast characteristics of the liquid crystal display device of Application 3 and of the liquid crystal display devices of Comparative Examples 3 and 4.

TABLE 1

| | Comparison of contrast characteristics | | |
|---|---|---|---|
| | Application 3 | Comparative Example 3 | Comparative Example 4 |
| Contrast | 38 | 41 | 9 |

It is understood from Table 1 that the liquid crystal display device of Application 3 has an electro-optic characteristic comparable to that of Comparative Example 3. Compared with the conventional polymer dispersed TN liquid crystal display device of Comparative Example 4, the liquid crystal display device of Application 3 has higher contrast due to less light scattering in the pixels. Moreover, in the liquid crystal display device of Application 3, two substrates are securely supported by the polymer walls as described above, so that substrates formed of a PET film can be used. When other plastic films or Glass substrates were used instead of the PET film, the same advantages were obtained.

APPLICATION 4

Cytop (manufactured by Asahi Glass Co., Ltd.) was coated onto the same substrate as that of Application 3 so that the Cytop had a thickness of 0.2 μm. Next, spacers were dispersed on one substrate, and the other substrate was placed thereon to form a cell in the same way as in Application 3. Then, the same photomask as that of Application 3 was placed in the same way as in Application 3. A homogeneous mixture containing 0.1 g of trimethylol propane trimethacrylate, 0.9 g of lauryl acrylate, 4 g of a liquid crystal material (ZLI-4788-000, manufactured by Merck & Co., Inc.), and 0.03 g of a photopolymerization initiator (Irgacure 184, manufactured by CIBA-GEIGY Corporation) was injected into the cell.

Next, the cell was irradiated with UV-rays through the photomask at an illuminance of 10 mW/cm$^2$ for 2 minutes by using a high-pressure mercury lamp which can provide parallel rays, whereby the polymerizable material in the mixture was cured.

The liquid crystal display device manufactured as described above was cut, and one substrate was peeled off from the other substrate. The liquid crystal material was washed away with acetone, and after that, the liquid crystal layer was observed by an SEM. As a result, it was confirmed that uniformly aligned liquid crystal regions having the same regularity as those of a dot pattern of the photomask and a pixel pattern and having almost the same size as that of the dot pattern were formed.

Moreover, polarizing plates were attached to another liquid crystal display device manufactured in the same way as the above so that each polarizing direction thereof crossed each other at right angles, whereby a polymer dispersed ECB liquid crystal display device was manufactured.

Figures 11A, 11B:
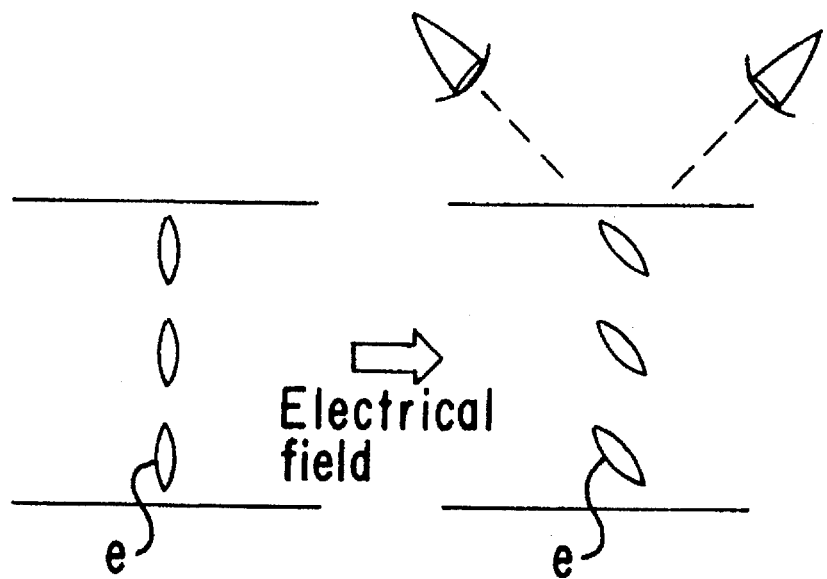
FIG. 11A is a view showing an orientation state of liquid crystal molecules in a conventional ECB liquid crystal display device under no applied voltage.
FIG. 11B is a view showing an orientation state of liquid crystal molecules in a conventional ECB liquid crystal display device under an applied voltage.
Figures 12A, 12B:
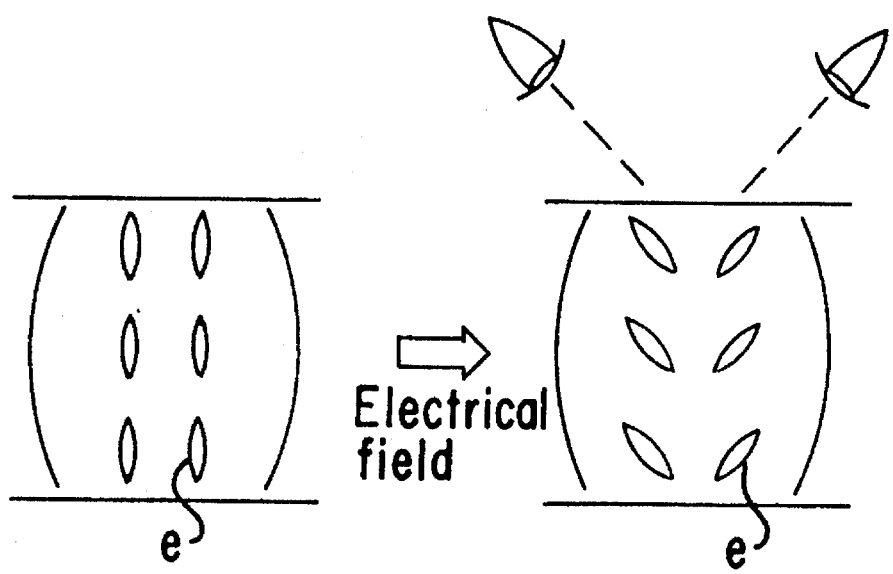
FIG. 12A is a view showing an orientation state of liquid crystal molecules in an ECB liquid crystal display device according to the present invention under no applied voltage.
FIG. 12B is a view showing an orientation state of liquid crystal molecules in the ECB liquid crystal display device according to the present invention under an applied voltage.

As shown in FIG. 11A, in an ordinary ECB liquid crystal display device, liquid crystal molecules e are in a homeotropic orientation having a tilt angle of several degrees when no voltage is applied. Therefore, as shown in FIG. 11B, when a voltage is applied, the liquid crystal molecules e tilt in the same direction. As a result, the apparent refractive index is different depending upon direction of observation, and retardation ($\Delta n \cdot d$, where $\Delta n$ is a birefringence of liquid crystal molecules and d is a thickness of a liquid crystal cell) is changed, causing an inversion phenomenon in which black and white are inverted depending upon the position of observation and nonuniform contrast. In contrast, in the case where the mixture containing the liquid crystal and the light-curable material is irradiated with light having an illuminance distribution, a thin polymer layer is formed between the substrate and the liquid crystal to decrease the ability of the orientation film on the substrate for regulating the orientation. However, it was confirmed that when a homeotropic orientation film with a strong ability for regulating the orientation was used as in Application 4, the liquid crystal molecules were in a homeotropic orientation. More specifically, it was observed that the liquid crystal molecules e stood on end with respect to the cell as shown in FIG. 12A. When a voltage is applied to the cell, as shown in FIG. 12B, the liquid crystal molecules e tilt toward each polymer wall due to the interaction between the liquid crystal and the polymer walls. Thus, the refractive index becomes almost the same, when seen from any direction with a certain angle from a vertical direction of the cell, greatly improving the characteristics of the viewing angle.

COMPARATIVE EXAMPLE 5

As a comparative example with respect to Application 4, an ECB liquid crystal display device with a conventional structure was manufactured as follows:

Two glass plates with ITO (flint glass with ITO having a thickness of 500 Angstroms, manufactured by Nippon Sheet Glass Co., Ltd.) were used instead of the substrates of Application 4. A cell was formed in the same way as in Application 4. The liquid crystal material (ZLI-4788-000) which was the same as that used in Application 4 was injected into the cell. Two polarizing plates were attached to the cell so that each polarizing direction thereof crossed each other at right angles, whereby a conventional liquid crystal display device was manufactured.

COMPARATIVE EXAMPLE 6

As a comparative example with respect to Application 4, a liquid crystal display device was manufactured as follows:

A cell was formed in the same way as in Application 4. The same mixture containing the liquid crystal and the light-curable material as that of Application 4 was injected into the cell. Then, the cell was irradiated with UV-rays without a photomask in the same way as in Application 4, whereby a polymer dispersed ECB liquid crystal display device was manufactured.

Table 2 shows the contrast characteristic of the liquid crystal display device of Application 4 together with those of Comparative Examples 5 and 6.

TABLE 2

| | Comparison of contrast characteristics | | |
|---|---|---|---|
| | Application 4 | Comparative Example 5 | Comparative Example 6 |
| Contrast | 32 | 35 | 8 |

It is understood from Table 2 that the liquid crystal display device of Application 4 has an electro-optic characteristic comparable to that of Comparative Example 5. Compared with the conventional polymer dispersed liquid crystal display device of Comparative Example 6, the liquid crystal display device of Application 4 has higher contrast due to less light scattering in pixels. As to the characteristics of the viewing angle, in Comparative Example 5, inversion phenomenon was caused when seen from various directions, and in Application 4, such phenomenon was not caused and a large viewing angle was obtained. Moreover, in the liquid crystal display device of Application 4, substrates formed of PET films can be used. When other plastic films or glass substrates were used instead of the PET film, the same advantages were obtained.

APPLICATION 5

ITO films with a thickness of about 1000 Angstroms were formed on two glass substrates by a vapor deposition method, and a plurality of electrode lines were provided in parallel on the substrates by a wet etching method. Polyimide orientation films with a thickness of about 500 Angstroms were coated onto surfaces of the substrates, on which the electrode lines were formed, by a spin coating method. The resulting substrates were baked at 190° C. for one hour and subjected to a uniaxial rubbing treatment, whereby orientation films were formed thereon. In order to regulate cell thickness, silica beads with a diameter of 2 µm were dispersed on the substrate as spacers, and two substrates were attached to each other, whereby a cell was formed.

It is noted that the rubbing treatment was conducted so as to obtain the same rubbing treated directions of the substrates, when the two surfaces of the substrates having the electrode lines faced each other so that the electrode lines crossed at right angles.

Next, a homogeneous mixture containing 0.80 g of ferroelectric liquid crystal composition (ZLI-4003, manufactured by Merck & Co., Inc.), 0.02 g of polyethylene glycol diacrylate (NK ESTER A-200, manufactured by Shin Nakamura Chemical Industrial Co., Ltd.) as a polymerizable material, and 0.18 g of lauryl acrylate (NK ESTER LA, Shin Nakamura Chemical Industrial Co., Ltd.) was injected between the substrates. This mixture is in a nematic phase state or an isotropic liquid phase state at an ordinary temperature. The phase transition temperature of this mixture is shown below:

$SmC^* \leftarrow -25° C. \rightarrow SmA \leftarrow -31° C. \rightarrow$ cholesteric phase $\leftarrow 35° C. \rightarrow$ isotropic phase Next, a photomask was placed on the cell in the same way as in Application 3. The mixture was irradiated with UV-rays through the photomask at an illuminance of 10 mW/cm² for 2 minutes by using a high-pressure mercury lamp which can provide parallel rays, under the condition that the mixture was in a nematic phase or an isotropic liquid phase. The polymerizable material was cured by this irradiation, and a phase separation occurred in the mixture.

The phase separation was observed by a microscope, revealing that the polymer walls 8 were not formed in regions which were not covered with masking portions of the photomask, and the polymer walls 8 were formed in regions to which the UV-rays were irradiated and in the vicinity thereof as shown in FIG. 3.

Moreover, the observation of the cell by a polarizing microscope having crossed Nicols revealed the following:

Center portions of the liquid crystal regions were in an ordinary surface stabilized ferroelectric (SSF) type orientation in the rubbed direction of the substrate. The orientation was rapidly changed in the vicinity of the polymer walls to be in a homeotropic orientation. On the other hand, in the regions to which the UV-rays were irradiated, light scattering occurred.

In the case where the mixture containing the liquid crystal and the light-curable material was irradiated with light having an illuminance distribution as in Application 5, even though a horizontal orientation film with weak ability for regulating the orientation is used, the liquid crystal molecules can be aligned in the orientation direction of the substrate by using a liquid crystal material such as ferroelectric liquid crystal (FCL) excellent in regulating ability.

Furthermore, the ferroelectric liquid crystal cell thus manufactured was placed under a microscope having crossed Nicols and applied with a memory pulse. It was confirmed that in the liquid crystal regions to which weak light was irradiated, the same switching as that obtained in an ordinary SSF type cell was obtained. In addition, when quenching phases of the cell and a polarizing plate were aligned so that switching occurred between a complete quenching state and a light transmission state, it was observed that the light irradiated regions have brightness between on and off states due to the leakage of light caused by disturbance of the orientation of the liquid crystal molecules and due to light scattering, even under the condition that an electrical field was not applied.

When other plastic films or the like were used instead of the glass substrate, the same results as the above were obtained.

COMPARATIVE EXAMPLE 7

As a comparative example with respect to Application 5, a liquid crystal display device was manufactured as follows:

A cell was formed in the same way as in Application 5. A liquid crystal material (ZLI-4003) was injected into the cell, followed by being sealed, whereby a liquid crystal display device was manufactured.

COMPARATIVE EXAMPLE 8

A liquid crystal display device was manufactured in the same way as in Application 5 and by using the same materials as those of Application 5, except that a photomask was not used during the light irradiation step.

Table 3 shows the contrast characteristic of the liquid crystal display device of Application 5 together with those of the liquid crystal display devices of Comparative Examples 7 and 8.

TABLE 3

|  | Application 5 | Comparative Example 7 | Comparative Example 8 |
|---|---|---|---|
| Contrast | 35 | 40 | 8 |

It is understood from Table 3 that the liquid crystal display device of Application 5 has an electro-optic characteristic comparable to that of Comparative Example 7. Compared with the conventional liquid crystal display device of Comparative Example 8, the liquid crystal display device of Application 5 has higher contrast due to less light scattering in the pixels. Moreover, in the liquid crystal display device of Application 5, even when plastic films or the like were used, the same advantages were obtained.

Figure 13:
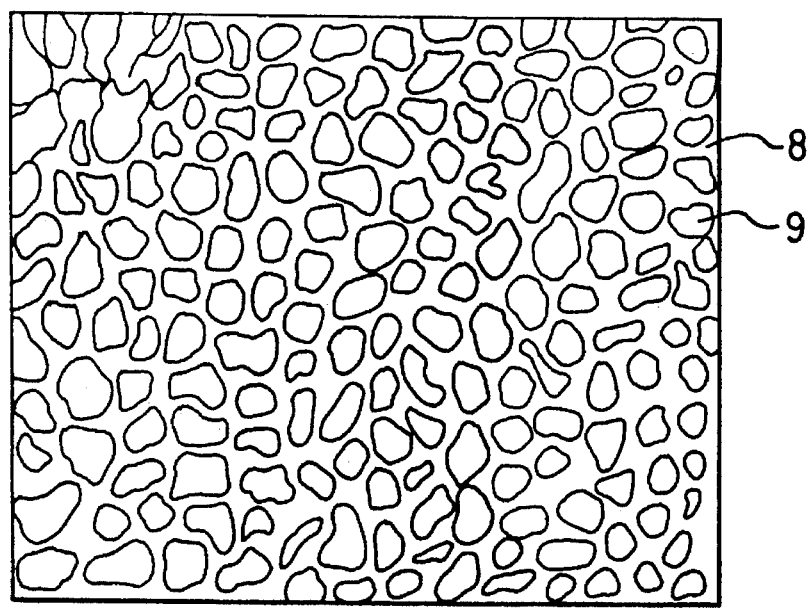
FIG. 13 is a view showing boundary regions between polymer walls and liquid crystal in a liquid crystal display device of Comparative Example 6.

In the liquid crystal display device of Comparative Example 8, when the mixture of the liquid crystal and the polymerizable material was irradiated with UV-rays, the polymerizable material was almost uniformly cured, whereby a phase separation was caused between the liquid crystal and the polymerizable material. When the portion where the phase separation occurred was observed by a microscope, it was revealed that the liquid crystal regions 9 were randomly dispersed in the polymer walls 8 almost over that portion as shown in FIG. 13. Moreover, when this cell was observed by using a polarizing microscope having crossed Nicols, it was confirmed that light scattering occurred in the polymer walls 8 and center portions of the liquid crystal regions 9 were in nearly an SSF type orientation along the rubbed direction of the substrate, and the orientation of the liquid crystal molecules became more random toward the polymer walls 8.

The ferroelectric liquid crystal cell thus obtained was sandwiched by polarizing plates so that the polarizing directions thereof crossed each other at right angles and applied with a memory pulse, confirming that the same switching as that of an ordinary SSF type cell was conducted. However, in the case of a reverse switching, complete quenching was not obtained and the orientation seemed to be partially nonuniform. The inspection of this nonuniform portion by the polarizing microscope revealed that light scattered in the polymer walls 8, and light was leaked due to the disturbance of the orientation of the liquid crystal molecules in the vicinity of the polymer walls.

Table 4 shows the shock resistance of the liquid crystal display devices of Application 5, Comparative Examples 7 and 8. These results were obtained by applying a pressure of 5 kg/cm$^2$ to the respective liquid crystal display devices and observing the change in the orientation of the liquid crystal molecules thereof.

TABLE 4

Results of pressure test

| | |
|---|---|
| Application 5 | The orientation of the liquid crystal molecules were slightly disturbed only in a pixel present in a boundary portion between the pressurized region and the non-pressurized region. No problem was caused in terms of practical use. |
| Comparative Example 7 | The orientation of the liquid crystal molecules was disturbed from the pressured point up to the periphery thereof. A problem was caused in terms of practical use. |
| Comparative Example 8 | The orientation was disturbed in a pixel in a boundary portion between the pressurized region and the non-pressurized region. A problem was caused in terms of practical use. |

Table 5 shows the change of the orientation in the case where the above-mentioned three liquid crystal display devices were dropped from a height of 30 cm.

TABLE 5

Results of drop test

| | |
|---|---|
| Application 5 | Distinct disturbance of the orientation was not acknowledged. |
| Comparative Example 7 | The orientation was disturbed over the entire region. |
| Comparative Example 8 | Distinct disturbance of the orientation was not acknowledged. |

As is understood from these tables, in the case of Application 5, there are no problems in the pressure test and in the drop test. In the case of both of Comparative Examples 7 and 8, there are problems in the pressure test and/or in the drop test.

APPLICATION 6

Two substrates on which a plurality of electrode lines were formed and which were subjected to a rubbing treatment in the same way as in Application 5 were prepared. A homogeneous mixture containing 0.80 g of ferroelectric liquid crystal composition (ZLI-4003, manufactured by Merck & Co., Inc.), 0.02 g of polyethylene glycol acrylate as a polymerizable material (NK ESTER A-200, manufactured by Shin Nakamura Chemical Industrial Co., Ltd.), 0.18 g of lauryl acrylate as a polymerizable material (NK ESTER LA, manufactured by Shin Nakamura Chemical Industrial Co., Ltd.) and silica beads with a diameter of 2 μm was coated onto one of the substrates under the condition that the mixture was in a nematic phase state or in an isotropic liquid phase state at an ordinary temperature. Then, the two substrates were attached to each other in the same way as in Application 5, whereby a cell was formed. A phase transition temperature of the mixture is shown below:

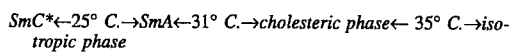

Next, a photomask was placed on the cell in the same way as in Application 5. The mixture was irradiated with UV-rays through the photomask under the same condition as that of Application 5, whereby the polymerizable material in the mixture was cured. As a result a phase separation occurred between the liquid crystal and the polymer.

The observation of the cured portion of the mixture revealed that the polymer walls were not formed in the regions which were not covered with the masking portions of the photomask and the polymer walls were formed in the light irradiated regions and in the vicinity thereof.

As described above, the liquid crystal display device of Application 6 was obtained by coating the mixture onto one of the glass substrates on which the electrodes and orientation films were formed under the condition that the mixture was in a nematic phase state or an isotropic liquid phase state and attaching both of the glass substrates. There was no disturbed orientation in the liquid crystal display device thus obtained. However, in the case where the two glass substrates having the electrodes and the orientation films were attached to each other, and then the mixture containing the liquid crystal and the polymerizable material was injected between the substrates under the condition that liquid crystal molecules were in a nematic state or an isotropic state, as described in Application 5, distinct disturbance of the orientation was observed by a microscope in the vicinity of the hole for injection and in the vicinity of the sealing.

In Example 2, one liquid crystal region was provided in one pixel or one liquid crystal region was formed in two or more pixels. The present invention is not limited thereto. For example, it is also possible in the present invention that at least one liquid crystal region is provided in one pixel and another one or more liquid crystal region or a part thereof is provided in the same pixel. This structure is effective for enlarging a screen by increasing the size of each pixel for the following reasons:

When a photomask which completely covers a large pixel, an unreacted polymerizable material present in a center of the pixel is polymerized due to the leaked light during the irradiation of light; as a result, a number of liquid crystal regions or polymer islands are formed (which become a source for light scattering). Thus, contrast is remarkably decreased. On the other hand, a plurality of weak light-irradiated regions are formed in a pixel so that the above-mentioned structure is obtained. In this case, masking portions of a photomask to be used become small and an unreacted polymerizable material does not remain in the center of the pixel, so that a number of liquid crystal regions or polymer islands are not formed. Thus, satisfactory contrast can be obtained. In particular, in the case where a longitudinal side of the pixel exceeds 200 μm, this structure is effective. In the case where a longitudinal side of the pixel exceeds 200 μm, the maximum diameter of each weak light-irradiated region is preferably in the range of 20 to 500 μm, and more preferably in the range of 50 to 200 μm. In the case where the maximum diameter is less than 20 μm, contrast is remarkably decreased due to a number of polymer walls in the pixel. In the case where the maximum diameter is more than 500 μm, a light-curable material present in the center of the pixel is not likely to move to the end of the pixel. Thus, the liquid crystal regions cannot be formed substantially corresponding to the shape of the masking portions of the photomask. As to the position of the weak light-irradiated regions, it is preferred that the weak light-irradiated regions are provided so as to make the maximum diameter thereof as small as possible.

EXAMPLE 3

Example 3 is a non light scattering type liquid crystal display device in which characteristics of the viewing angle and contrast are improved. The non light scattering type liquid crystal display device will be described by way of illustrating Applications.

APPLICATION 7

ITO (mixture of indium oxide and tin oxide) with a thickness of 500 Angstroms was provided on a glass substrate (flint glass: 1.1 mm thickness). Then, polyimide (SE150, manufactured by Nissan Chemical Industries Ltd.) was coated onto the substrate by a spin coating method, whereby an orientation film was formed thereon. In this way, two substrates were formed.

Spacers with a diameter of 5 μm were dispersed on one substrate, and the other substrate was placed thereon so that the gap therebetween was kept at a predetermined size, whereby a cell was formed.

Figure 14:
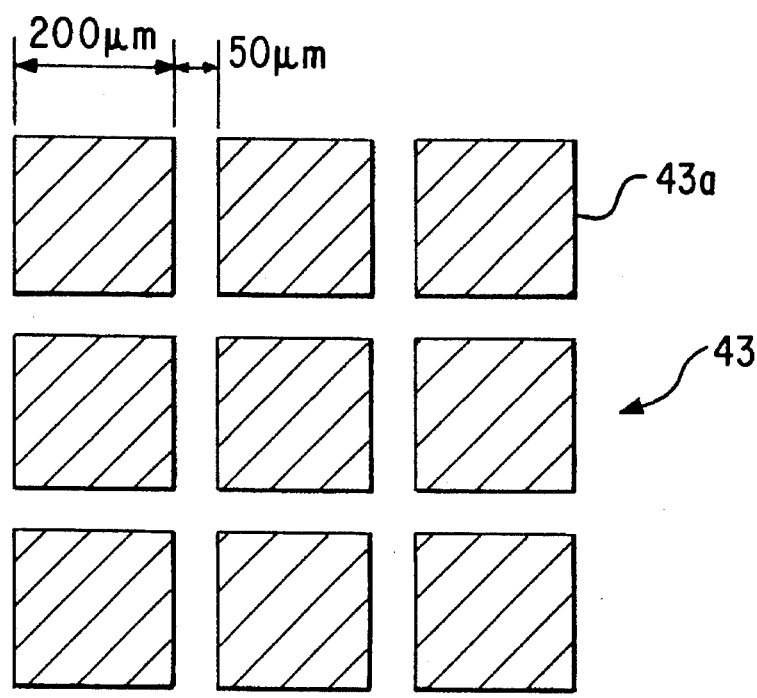
FIG. 14 is a plan view showing another photomask used in the present invention.

A photomask 43 shown in FIG. 14 having square masking portions 43a, each side being 200 μm was placed on the cell thus formed. Each square masking portion 43a was provided with an interval of 50 μm. In the cell, a homogeneous mixture containing 0.9 g of isobornyl methacrylate, 0.1 g of acrylate with two functional groups, i.e., a photopolymerizable compound (R-684, manufactured by Nippon Kayaku K.K.), 4 g of a mixture in which 0.3% by weight of a chiral agent (S-811, manufactured by Merck & Co., Inc.) was added to liquid crystal material (ZLI-4792, manufactured by Merck & Co., Inc.), and 0.02 g of a photopolymerization initiator (Irgacure 184, manufactured by CIBA-GEIGY Corporation) was injected.

The cell was irradiated with UV-rays by using a high-pressure mercury lamp which can provide parallel rays. This irradiation was conducted under the condition that one cycle (including one second irradiation at an illuminance of 15 mW/cm$^2$ and 30 seconds non-irradiation) was repeated 20 times and then the irradiation was continuously conducted for 5 minutes. Thus, the polymerizable material was cured.

The resulting cell was observed by a polarizing microscope, which revealed the followings:

As shown in FIG. 24A, 24B, 24C or 24D, an outside liquid crystal region d' was formed. The respective outside liquid crystal regions d' were formed with the same regularity as that of a dot pattern of the photomask 43 (or a pixel), each region d' having almost the same size. Moreover, liquid crystal domains g in each outside liquid crystal region d' were oriented in an omnidirection on a surface parallel with the surface of the substrate, and an inside liquid crystal region d was formed being surrounded by each outside liquid crystal region d'.

Polarizing plates were attached to the resulting cell, thereby manufacturing a liquid crystal display device.

COMPARATIVE EXAMPLE 9

As a comparative example with respect to Application 7, a cell was formed in the same way as in Application 7. Then, the same liquid crystal material (in which 0.3% of S-811 was added) was injected into the cell thus formed. Polarizing plates were attached to the cell so that each polarizing direction thereof was aligned with the orientation direction of the cell, whereby a conventional TN liquid crystal display device was manufactured.

COMPARATIVE EXAMPLE 10

Moreover, as a comparative example with respect to Application 7, a cell was formed in the same way as in Application 7. In the cell thus formed, a mixture containing liquid crystal, a light-curable material, and a photopolymerization initiator was injected in the same way as in Application 7. Then, the cell was irradiated with UV-rays in the same way as in Application 7, except that a photomask was not used. The resulting cell was sandwiched by polarizing plates so that the polarizing directions of each polarizing plate crossed each other at right angles, whereby a conventional polymer dispersed liquid crystal display device was manufactured.

Table 6 shows the electro-optic characteristics of the cell of Application 7 together with those of the cells of Comparative Examples 9 and 10.

TABLE 6

| | Comparison of electro-optic characteristics | | |
|---|---|---|---|
| | Application 7 | Comparative Example 9 | Comparative Example 10 |
| Contrast | 30 | 41 | 9 |
| Inversion phenomenon in half tone | ○ | X | Δ |

For the purpose of measuring contrast, a cell and polarizing plates were combined so as to obtain a normally white state, and contrast of the cell thus obtained was measured by a liquid crystal evaluation device (LC-5000, manufactured by Ohtsuka Denshi Co., Ltd.). It is noted that a measurement value was taken as a ratio of light transmittance $T_0$ with respect to light transmittance $T_{sat.}$ ($T_0/T_{sat.}$), where the light transmittance $T_0$ was obtained when a lens with a collecting angle of 24° from the vertical direction of the cell was used under no voltage applied, and the light transmittance $T_{sat.}$ was obtained when the above lens was used with a saturation voltage applied. In Table 6, a mark ○ shows a state in which inversion phenomenon hardly occurs; a mark × shows a state in which inversion phenomenon is easily observed; and a mark Δ shows a state in which inversion phenomenon is barely observed.

As is understood from Table 6, the liquid crystal display device of Application 7 has electrooptic characteristics comparable to those of the conventional TN liquid crystal display device of Comparative Example 9. In particular, in Application 7, the inversion phenomenon caused by changing the viewing angle as seen in the TN liquid crystal display device in a half tone is not observed, and contrast obtained by observing in a direction with an angle of 40° from the vertical direction of the cell is hardly changed. Moreover, compared with the conventional polymer dispersed liquid crystal display device (Comparative Example 10), less light scattering occurs, increasing contrast. In Comparative Example 10, as shown in FIG. 22 a great number of liquid crystal regions d were dispersed in one pixel and the diameter of each region is very small. Thus, the liquid crystal display device thus obtained was a light scattering type.

APPLICATION 8

A homogeneous mixture containing 0.9 g of isobornyl methacrylate, 0.1 g of acrylate with two functional Groups, i.e., a photopolymerizable compound (R-684, manufactured by Nippon Kayaku K.K.), 4 g of a mixture in which 0.3% by weight of a chiral agent (S-811, manufactured by Merck & Co., Inc.) was added to a liquid crystal material (ZLI-4792, manufactured by Merck & Co., Inc.), and 0.02 g of a photopolymerization initiator (Irgacure 184, manufactured by CIBA-GEIGY Corporation) was injected into a cell manufactured in the same way as in Application 7.

The cell was covered with the photomask shown in FIG. 14 and irradiated with UV-rays by using a high-pressure mercury lamp which can provide parallel rays at an illuminance of 15 mW/cm$^2$ for 5 minutes, whereby a polymerizable material was cured.

The cell thus obtained was observed by a polarizing microscope, which revealed the following:

As shown in FIG. 25, a plurality of circular liquid crystal regions d2 were formed at the end portions of a weak light-irradiated region b and a plurality of circular liquid crystal regions d1 were formed surrounded by the liquid crystal regions d2. Each liquid crystal region d2 was divided into one to several circular liquid crystal domains, and the respective domains were formed in a radial manner. Each liquid crystal region d1 was also divided into one to several circular domains, and each domain was randomly oriented.

When a voltage is applied under this condition, the direction in which liquid crystal molecules stand is different depending upon each liquid crystal domain. Therefore, when the weak light-irradiated region is seen from an omnidirection with a predetermined angle from the vertical direction of the weak light-irradiated region, an apparent refractive index becomes almost constant. Thus, characteristics of the viewing angle in a half tone can be improved.

Polarizing plates were attached to both sides of the cell thus manufactured so that each polarizing angle of the polarizing plates crossed each other at right angles. The electro-optic characteristic of the cell is shown in Table 7.

TABLE 7

| Comparison of electro-optic characteristics | | |
| --- | --- | --- |
|  | Application 8 | Application 9 |
| Contrast | 25 | 19 |
| Inversion phenomenon in half tone | ○ | △ |

APPLICATION 9

A homogeneous mixture containing 0.9 g of isobornyl methacrylate, 0.1 g of acrylate with two functional groups, i.e., a photopolymerizable compound (R-684, manufactured by Nippon Kayaku K.K.), 4 g of a mixture in which 0.3% by weight of a chiral agent (S-811, manufactured by Merck & Co., Inc.) was added to a liquid crystal material (ZLI-4792, manufactured by Merck & Co., Inc.), and 0.12 g of a photopolymerization initiator (Irgacure 184, manufactured by CIBA-GEIGY Corporation) was injected into a cell manufactured in the same way as in Application 7.

The cell was covered with the photomask shown in FIG. 14 and irradiated with UV-rays by using a high-pressure mercury lamp which can provide parallel rays at an illuminance of 45 mW/cm$^2$ for 5 minutes, whereby a polymerizable material was cured.

The cell thus obtained was observed by a polarizing microscope, which revealed the following:

As shown in FIG. 23, a plurality of circular liquid crystal regions d were formed in a weak light-irradiated region b. Polarizing plates were attached to both sides of the cell thus manufactured so that each polarizing angle of the polarizing plates crossed each other at right angles. The electro-optic characteristic of the cell is shown in Table 7.

It is understood from the comparison of Applications 7, 8, and 9 based on Tables 6 and 7 that the inversion phenomenon in a half tone in the liquid crystal regions shown in FIG. 25 of Application 8 is satisfactory to the same degree as that of Application 7, where the liquid crystal domains of the outside liquid crystal region are formed in a radial manner so as to surround another liquid crystal region; however, contrast is slightly less satisfactory than that of Application 7. Application 9 has a structure as shown in FIG. 23, so that the inversion phenomenon occurs in a half tone and contrast is decreased.

In Applications 7 to 9, UV-rays were irradiated at an illuminance in the range of 15 mW/cm$^2$ of 45 mW/cm$^2$ by using a high-pressure mercury lamp. The conditions for irradiation of UV-rays are different depending upon the composition of a mixture of liquid crystal and a polymerizable material and are not particularly limited. However, in order to allow liquid crystal regions to sufficiently grow and to prevent damage to a liquid crystal material by UV-rays, the illuminance is preferably 60 mW/cm$^2$ (measured at 365 nm) or less.

The reason why a pulse irradiation is conducted at a cycle including one second irradiation and 30 seconds non-irradiation in Application 7 is as follows:

In the case where a mixture containing liquid crystal and a light-curable material is irradiated with light having an illuminance distribution, the light-curable material in light-irradiated regions reacts to form the cores of the polymer walls. Then, the concentration of the light-curable material in the light-irradiated region is decreased and the concentration gradient of the light-curable material is formed. As a result, an unreacted light-curable material in weak light-irradiated regions move to gather in the light-irradiated regions along the concentration gradient, whereby the unreacted light-curable material moved into the light-irradiated regions are polymerized to form polymer walls. At this time, in the case where the light-curable material has a high polymerization rate, the light-curable material in the weak light-irradiated regions is polymerized due to light leaked from the light-irradiated regions, before the light-curable material reaches the light-irradiated regions. Therefore, even in the weak light-irradiated regions, a plurality of liquid crystal regions are formed. If these liquid crystal regions are extremely small (e.g., 20 µm or less), light is scattered at interfaces between the polymer walls and the liquid crystal regions, resulting in decreased contrast. For this reason, the extremely small liquid crystal regions are not preferred. In order to avoid this, the polymerization rate is made low, whereby the light-curable material in the weak light-irradiated regions can reach the light-irradiated regions completely, and a phase separation between the liquid crystal regions and the polymer walls can be made clear. This means that each pixel in the liquid crystal display device is almost covered with the liquid crystal regions to improve contrast.

In addition, as a method for making the phase separation clear, the light-curable material in the weak light-irradiated regions is allowed to be sufficiently moved into the light-irradiated regions under a non-irradiation condition by using light in a pulse state, whereby liquid crystal regions can be formed without forming small liquid crystal regions in the weak light-irradiated regions.

It is preferred to conduct a pulse irradiation for 5 seconds or less during which the polymerizable material is not sufficiently cured, with an interval of 30 seconds or more. In this pulse irradiation, liquid crystal domains can be in a random orientation instead of an omnidirectional orientation by regulating the polymerizable material and irradiation conditions.

APPLICATION 10

Application 10 is the case where a photopolymerization reaction is suppressed, a phase separation between liquid crystal molecules and a polymerizable material is made clear, and liquid crystal regions are formed so as to correspond to the shape of the masking portions of a photomask. In order to suppress a photopolymerization reaction, it is preferred that a photopolymerization suppressor be added.

ITO (mixture of indium oxide and tin oxide) with a thickness of 500 Angstroms was provided on a glass substrate (flint glass: 1.1 mm thickness). Spacers (micropearl, manufactured by Sekisui Fine Chemical Co., Ltd.) with a diameter of 5 μm were dispersed on one substrate, and the other substrate was placed thereon so as to keep a gap therebetween, whereby a cell was formed.

The photomask 43 shown in FIG. 14 having squares, each side being 200 μm and each square being formed in a pitch of 250 μm was placed on the cell thus formed. In the cell, a homogeneous mixture containing 0.85 g of isobornyl methacrylate, 0.1 g of acrylate with two functinal groups, i.e., a photopolymerizable compound (R-684, manufactured by Nippon Kayaku K.K.), 0.05 g of styrene as a photopolymerization suppressor, 4 g of a mixture in which 0.3% by weight of a chiral agent (S-811, manufactured by Merck & Co., Inc.) was added to a liquid crystal material (ZLI-4792, manufactured by Merck & Co., Inc.), and 0.02 g of a photopolymerization initiator (Irgacure 651, manufactured by CIBA-GEIGY Corporation) was injected.

The cell was continuously irradiated with UV-rays from the side of a dot pattern of the photomask 43 by using a high-pressure mercury lamp which can provide parallel rays at an illuminance of 15 mW/cm² (measured at 356 nm) for 5 minutes.

The cell thus formed was observed by a polarizing microscope, which revealed the following:

Liquid crystal regions were uniformly formed with the same regularity as that of the dot pattern (or a pixel), each region having almost the same size. Moreover, liquid crystal domains in the liquid crystal regions were oriented in an omnidirection. Polarizing plates were attached to the upper and lower sides of the cell to manufacture a liquid crystal display device.

COMPARATIVE EXAMPLE 11

As a comparative example with respect to Application 10, a liquid crystal display device was manufactured as follows:

A cell was formed in the same way as in Application 10, and a mixture containing liquid crystal, a light-curable material, a photopolymerization initiator, which was the same as that of Application 10, was injected into the cell. The resulting cell was irradiated with light under the same conditions as those of Application 10. Polarizing plates were attached to the cell thus formed so that each polarizing angle crossed each other at right angles, whereby a conventional polymer dispersed liquid crystal display device in which the cell was sandwiched by the polarizing plates was manufactured.

COMPARATIVE EXAMPLE 12

Moreover, as a comparative example with respect to Application 10, a liquid crystal display device was manufactured as follows:

First, polyimide (SE150, manufactured by Nissan Chemical Co., Ltd.) was coated onto a substrate which was the same as that of Application 10 by a spin coating method. The substrate was subjected to a uniaxial rubbing treatment by using a nylon cloth. Two substrates which were treated in this way were attached to each other at right angles so that each rubbing direction crossed the other. Spacers (micropearl, manufactured by Sekisui Fine Chemical Co., Ltd.) with a diameter of 5 μm were dispersed on one substrate, and the other substrate was formed thereon so as to keep a gap therebetween, whereby a cell was formed. Then, a mixture in which 0.3% by weight of a chiral agent (S-811, manufactured by Merck & Co., Inc.) was added to a liquid crystal material (ZLI-4792, manufactured by Merck & Co., Inc.) was injected into the cell. Moreover, polarizing plates were attached to the cell so that the polarizing directions thereof coincided with the orientation direction of liquid crystal molecules in the cell, whereby a conventional TN liquid crystal display device was manufactured.

Table 8 shows the electro-optic characteristic of the display device of Application 10 together with those of the display devices of Comparative Examples 11 and 12.

TABLE 8

| Comparison of electro-optic characteristics | | | |
|---|---|---|---|
| | Application 10 | Comparative Example 11 | Comparative Example 12 |
| Contrast | 35 | 9 | 41 |
| Inversion phenomenon in a half tone | ○ | Δ | X |

For the purpose of measuring contrast, a cell and polarizing plates were combined so as to obtain a normally white state, and contrast of the cell thus obtained was measured by a liquid crystal evaluation device (LC-5000, manufactured by Ohtsuka Denshi Co.,Ltd.). It is noted that the measurement value was taken as a ratio of light transmittance $T_0$ with respect to light transmittance $T_{sat.}$ ($T_0/T_{sat.}$), where the light transmittance $T_0$ was obtained when a lens with a collecting angle of 24° from the vertical direction with respect to the cell was used under no voltage applied, and the light transmittance $T_{sat.}$ was obtained when the above lens was used with a saturation voltage applied. In Table 8, a mark ○ shows a state in which inversion phenomenon hardly occurs; a mark × shows a state in which inversion phenomenon is easily observed; and a mark Δ shows a state in which inversion phenomenon is barely observed.

As is understood from Table 8, the liquid crystal display device of Application 10 has an electro-optic characteristic comparable to that of the conventional TN liquid crystal display device of Comparative Example 12. In particular, in Application 10, the inversion phenomenon caused by changing the viewing angle as seen in the TN liquid crystal display device in a half tone is not observed, and the contrast obtained by observing in a direction with an angle of 40° from the vertical direction with respect to the cell is hardly changed. Moreover, compared with the conventional polymer dispersed liquid crystal display device (Comparative Example 11), less light scattering occurs, increasing contrast.

Moreover, in Application 8, the liquid crystal regions shown in FIG. 25 were obtained without using a photopolymerization suppressor. In Application 10 using a photopolymerization suppressor, the liquid crystal regions as shown in FIG. 26A, 26B, 26C, or 26D were obtained. Thus, the liquid crystal display device in Application 10 is excellent in contrast.

The above-mentioned photopolymerization suppressor is a compound capable of decreasing the photopolymerization rate by being added to the polymerizable material to be used. Examples of the photopolymerization suppressor include polymerizable compounds which have lower reactivity than acrylate and methacrylate and which have a Q valve of 0.8 or more; such as styrene (Q=1), parachlorostyrene (Q=1.03), a-methylstyrene (Q=0.98), and butadiene (Q=2.39), where Q represents the resonance stability of a monomer in a radical polymerization. When a monomer has a larger value of Q, a radical to be generated is likely to be stabilized due to resonance effects, decreasing the radical polymerization rate. In the present invention, when a polymerization reaction is slow, the phase separation rate between the liquid crystal and the polymerizable material becomes lower. As a result, liquid crystal regions to be formed become large and almost the same size as that of masking portions of a photomask. This is preferred since contrast is improved. In addition, it is preferred to use a radical catcher such as a p-quinone derivative (e.g., p-quinone, p-chloroquinone, p-methylquinone), 2,2-diphenyl-1-picrylhydrazyl (DPPH), aromatic nitro compounds, and nitroso compounds (e.g., nitrobenzene, nitrotoluene, aniline, nitrosodimethylaniline).

The added amount of photopolymerization suppressor is varied depending upon its effects, and there is no particular limitation thereto in the present invention. However, it is preferred to add the photopolymerization suppressor in such a manner that when a change of photopolymerization reaction heat of a mixture of a light-curable material, a photopolymerization initiator (Irgacure 651, 0.3% added) and a photopolymerization suppressor is observed at an illuminance of 100 mW/cm$^2$ (measured at 365 nm), 25° C. by a photodifferential scanning calorimeter (photo DSC: PDC121, manufactured by Seiko Instruments & Electronics Ltd.), the peak of the reaction heat lasts for 20 seconds or more. When the peak value is 20 seconds or less, liquid crystal regions do not sufficiently grow and polymer walls are partially formed within weak light-irradiated regions of the photomask, leading to a decrease in contrast.

Examples of the liquid crystal include organic mixtures exhibiting a liquid crystal state in the vicinity of an ordinary temperature, e.g., nematic liquid crystal (including liquid crystal for a dual frequency drive and liquid crystal with dielectric anisotropy of dielectric constant $\Delta\epsilon<0$), cholesteric liquid crystal (in particular, liquid crystal having selective reflection characteristics with respect to visible light), smectic liquid crystal, ferroelectric liquid crystal, and discotic liquid crystal. These liquid crystals can be mixed. In particular, nematic liquid crystal, cholesteric liquid crystal, or nematic liquid crystal to which a chiral agent is added are preferred in terms of the characteristics thereof. Considering problems of coloring caused by hysteresis, uniformity, and d.$\Delta$n (retardation), cholesteric liquid crystal, nematic liquid crystal to which a chiral agent having a helical pitch of 10 μm or more is added is preferred. Moreover, liquid crystal which is excellent in resistance to chemical reaction is preferred since a photopolymerization reaction is involved in manufacturing. More specifically, liquid crystal which has a functional group such as a fluorine atom in a compound is preferred. Examples thereof include ZLI-4801-000, ZLI-4801-001, ZLI-4792 (manufactured by Merck & Co., Inc.).

In the combination of the liquid crystal material and the polymer material, it is preferred that the diameter of a liquid crystal region formed becomes larger than the dot diameter of a photomask to be used in the present invention, when a polymer dispersed liquid crystal display device is manufactured by a conventional photopolymerization phase separation method. Even though the diameter of a liquid crystal region becomes smaller than a dot diameter of a photomask in a certain combination of the liquid crystal material and the polymerizable material, this combination can be used by decreasing the intensity of UV-rays, suppressing the added amount of the photopolymerization initiator, etc.

The mixed ratio of the liquid crystal material and the polymerizable material is preferably in the range of 60:40 to 95:5 by weight. When the polymerizable material exceeds the ratio of 60:40, regions which change with respect to a voltage are decreased, resulting in poor contrast. When the polymerizable material is less than the ratio of 95:5, it becomes difficult to form polymer walls sufficiently, and moreover, the $T_{N-I}$ point of the mixture of the liquid crystal material and the polymerizable material becomes higher, resulting in difficulty for the vacuum injection of the mixture into the cell.

The added amount of the photopolymerization initiator is preferably in the range of 3 to 0.01% by weight based on the weight of the mixture of the liquid crystal material and the polymerizable material. When the added amount exceeds 3% by weight, the photopolymerization rate is too high to make the liquid crystal region large, decreasing an electrical holding ratio required for driving a TFT. When the added amount is less than 0.01% by weight, a sufficient photopolymerization reaction does not occur, and thus, polymer walls cannot be formed.

APPLICATION 11

Figure 15:
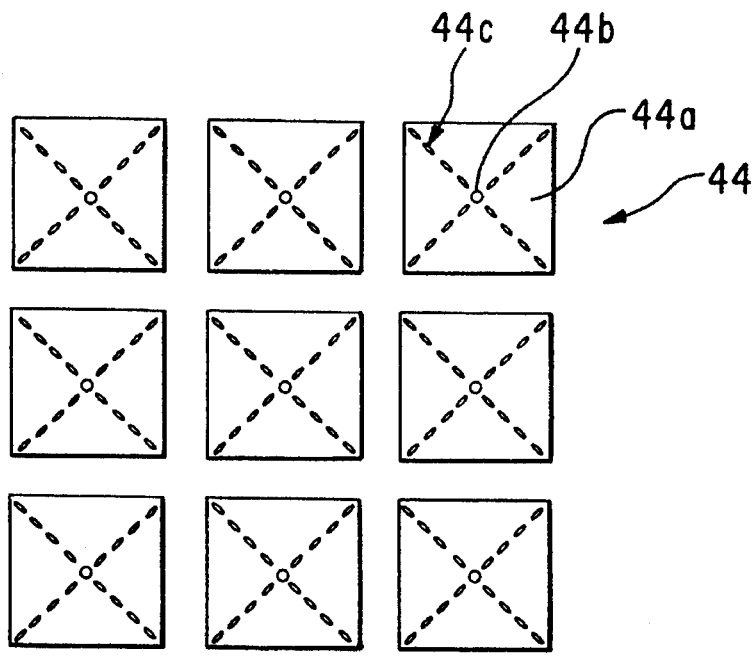
FIG. 15 is a plan view showing another photomask used in the present invention.

As in Application 8, a liquid crystal display device, in which liquid crystal regions were partitioned by polymer walls, was manufactured by using the same substrate and materials as those of Application 10. In Application 11, a photomask 44 as shown in FIG. 15 having a light transmission hole 44b in each masking portion 44a thereof and light transmission slit 44c formed in a broken line shape from the hole 44b toward four corners of the masking portion 44a was used.

The cell obtained was observed by a polarizing microscope, revealing the following:

As shown in FIG. 27, in the center of each liquid crystal region d with regularity, there was a polymer region i in an island shape. In the liquid crystal region d, liquid crystal domains g were formed in a radial manner. The contrast measured in a vertical direction with respect to the cell was 29; and the contrast measured at an angle of 45° from the vertical direction of the cell in an omnidirection was in the range of 21 to 25. In a conventional TN cell, inversion phenomenon was obtained in a direction of a stigmatic angle, remarkably decreasing the display quality.

The liquid crystal display device, in which the liquid crystal regions are partitioned by the polymer walls and quasi-solidified, has the same function as that of a conventionally used liquid crystal display device (TN, STN, ECB, ferroelectric liquid crystal display devices, etc.) which has a high contrast and a steep drive voltage characteristic curve, and in which the cell is sandwiched by two polarizing plates. The liquid crystal display device of the present invention can be driven by a simple matrix drive method, an active drive method using a TFT or an MIM. The present invention is not particularly limited thereto.

APPLICATION 12

Application 12 is the case where a liquid crystal display device with a large screen is provided by aligning liquid crystal molecules in an omnidirection or in a random direction.

Hereinafter a method for manufacturing a liquid crystal display device of Application 12 will be described.

First, ITO (a mixture of indium oxide and tin oxide) with a thickness of 500 Angstroms was provided on a glass substrate (flint glass: 1.1 mm thickness). Then, polyimide (SE150, manufactured by Nissan Chemical Industries Ltd.) was coated onto the glass substrate by a spin coating method, whereby an orientation film was formed thereon. In this way, two substrates were formed.

Spacers with a diameter of 5 μm were dispersed on one substrate, and the other substrate was placed thereon so as to keep a predetermined gap therebetween, whereby a cell was formed.

Figure 16:
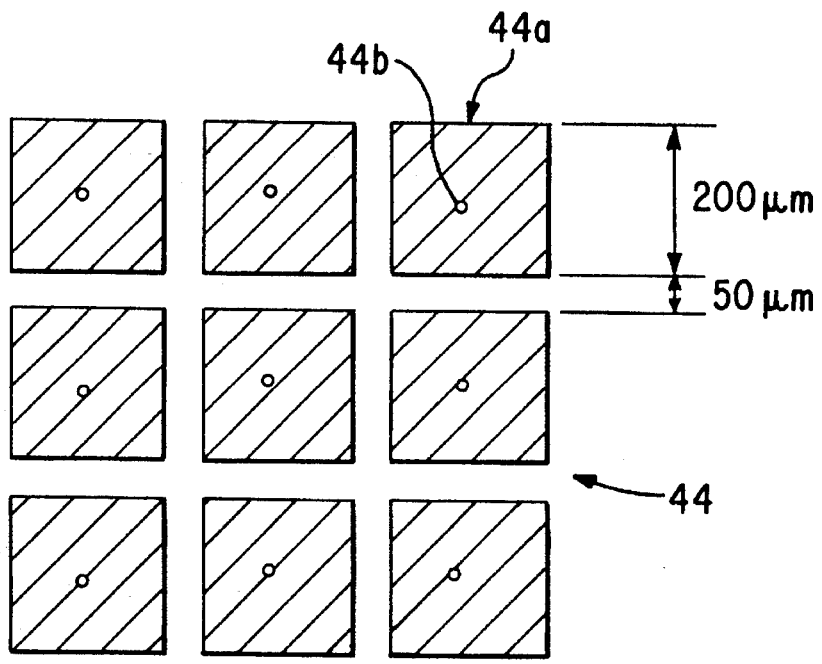
FIG. 16 is a plan view showing still another photomask used in the present invention.

Then, a photomask 44 having a circular light transmission hole 44b with a diameter of 25 μm in the center of each masking portion 44a as shown in FIG. 16 was placed on the cell thus formed. In the cell, a homogeneous mixture containing 0.9 g of isobornyl methacrylate, 0.1 g of acrylate with two functional groups, i.e., a photopolymerizable compound (R-684, manufactured by Nippon Kayaku K.K.), 4 g of a mixture in which 0.3% by weight of a chiral agent (S-811, manufactured by Merck & Co., Inc.) was added to a liquid crystal material (ZLI-4792, manufactured by Merck & Co., Inc.), and 0.02 g of a photopolymerization initiator (Irgacure 184, manufactured by CIBA-GEIGY Corporation) was injected.

Next, the cell was continuously irradiated with UV-rays at an illuminance of 15 mW/cm² for 5 minutes by using a high-pressure mercury lamp which can provide parallel rays, whereby the polymerizable material was cured.

The resulting cell was observed by a polarizing microscope, which revealed the following:

As shown in FIG. 27, in the center of each liquid crystal region d with regularity, there was a polymer region i in an island shape. In the liquid crystal region d, liquid crystal domains g were formed in a radial manner. The contrast measured in a vertical direction with respect to the cell was 28; and the contrast measured at an angle of 45° from the vertical direction of the cell in an omnidirection was in the range of 21 to 25. In a conventional TN cell, inversion phenomenon was obtained in a direction of a stigmatic angle, remarkably decreasing the display quality.

As described in Applications 11 and 12, when light irradiation is conducted by using a photomask having a light transmission hole in the center of each masking portion, a decrease in contrast due to light scattering can be prevented by aligning liquid crystal molecules in liquid crystal regions in an omnidirection, suppressing viewing angle dependency in a half tone, and letting the liquid crystal regions cover almost the entire pixel. Moreover, a liquid crystal display device obtained by using this type of photomask can be utilized for a large screen and used as a liquid crystal display device required to have less viewing angle dependency. Thus, its application range is remarkably wide. Its application range covers a liquid crystal TV, a display device for a video camera (liquid crystal viewcam, manufactured by Sharp K.K.), eyeglasses-type liquid crystal display device for virtual reality, and a liquid crystal display device for vehicles. In the case where an area of a masking portion is very large, a plurality of light transmission holes can be provided, and one of the transmission holes is not necessarily positioned in the center of the masking portion. What is important is that almost all of the weak light-irradiated regions become liquid crystal regions and the liquid crystal molecules therein are aligned in a radial manner.

Figure 17:
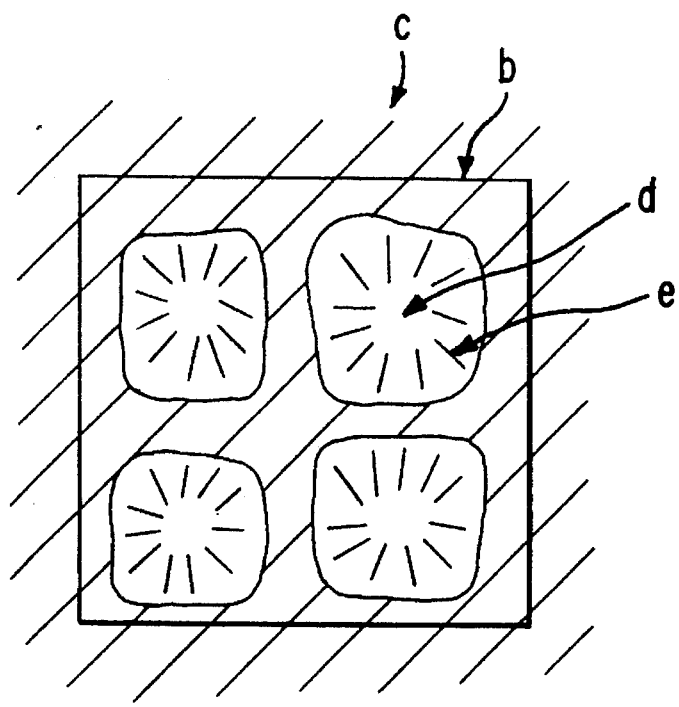
FIG. 17 is a view showing the case where a plurality of liquid crystal regions are formed in one pixel according to the present invention.

The technique of Example 3 can be applied to the case where two or more liquid crystal regions are formed in one pixel. FIG. 17 shows this application. In FIG. 17, the reference mark b denotes a pixel or a masking portion of a photomask, c an open portion of the photomask, d a liquid crystal region, and e liquid crystal molecules.

In Example 3, each item described in Example 2, such as the Light regulating means such as a photomask, Irradiation of light, etc. can be applied in the same way. Example 4

In addition to the structure of Example 3, Example 4 is the case where a plurality of liquid crystal molecules ]in a liquid crystal region d are aligned in a helical manner around a helical axis k which is nearly vertical with respect to a surface of a substrate as shown in FIG. 28A. In this case, a liquid crystal material in which cholesteric liquid crystal, a chiral agent, or the like added to the nematic liquid crystal is used. Examples of the chiral agent include S-811, R-811, and CE12.

For example, when nematic liquid crystal (in particular, liquid crystal having a helical pitch) is used, the characteristics thereof are changed depending upon its helical pitch.

(1) In the case of a helical pitch of more than 100 μm, the observation by a polarizing microscope reveals that as shown in FIGS. 29A and 29B, liquid crystal molecules are aligned in a liquid crystal region d in parallel with the substrate and orientation planes of the liquid crystal are hardly twisted. Namely, the liquid crystal molecules are in a nearly homogeneous orientation. In this case, when the cell is sandwiched by polarizing plates so that each polarizing direction crosses the other at right angles (crossed Nicols), light is transmitted through the cell only influenced by the effects of birefringence of the liquid crystal. Thus, the amount of light transmitted therethrough is small. Moreover, the difference of refractive index at an interface between the polymer wall and the liquid crystal region d becomes large under no applied voltage. Therefore, when seen at a position with an angle from a vertical direction with respect to the cell, the interface between the polymer wall and the liquid crystal region d is revealed, resulting in a rough display.

(2) In the case of a helical pitch of 15 μm to 100 μm, the observation by a polarizing microscope reveals that as shown in FIGS. 28A, 28B, and 28C, liquid crystal molecules are aligned in parallel with the substrate, twisted with each other, and have an orientation state in which the liquid crystal molecules on the upper and lower substrates are twisted (nearly in a TN orientation). In this case, light incident upon the cell is optically rotated by the twisted molecules, so that the incident light passes through the polarizing plates under crossed Nicols. Thus, the amount of light passed through the cell is increased. Moreover, the liquid crystal molecules at the interfaces between the liquid crystal regions and the polymer walls are aligned in parallel with the substrate, but randomly aligned within each interface. Therefore, when seen at a position with an angle from the vertical direction with respect to the cell, the interfaces between the liquid crystal regions and the polymer walls are hardly revealed, resulting in an improved display quality without roughness.

(3) In the case of a helical pitch of less than 15 μm, the observation by a polarizing microscope reveals that as shown in FIGS. 30A and 30B, minute stripe patterns are generated in liquid crystal regions since a helical axis of the liquid crystal molecules is tilted from a vertical plane with respect to the cell. In an orientation state in which the helical axis lies down, only part of the liquid crystal molecules stands in the vertical direction of the cell, decreasing light transmittance.

As described above, in Example 4, the helical pitch is preferably in the range of 15 μm to 100 μm. More preferably, in view of light transmittance and roughness of a display, the helical pitch is in the range of 25 μm to 75 μm.

APPLICATIONS 13, 14, 15 and 16

Two transparent electrode substrates with ITO were attached to each other so as to have a cell thickness of 5.5 μm. A mixture containing 0.1 g of R-684, 0.05 g of styrene, 0.85 g of isobornyl methacrylate, 4 g of a liquid crystal material (ZLI-4792), and 0.02 g of a photopolymerization initiator (Irgacure 651) was injected into the cell thus obtained. In the liquid crystal material, 0.3% by weight of S-811 (Application 13), 0.6% by weight of S-811 (Application 14), 0.9% by weight of S-811 (Application 15), and 1.2% by weight of S-811 (Application 16) were added as a chiral agent, respectively. The mixture was heated to 40° C. so as to obtain a homogeneously mixed state. Then, a photomask having square masking portions each side of which is 200 μm, the masking portions being provided in a matrix with an interval of 50 μm from each other, was placed on the cell. The cell was irradiated with UV-rays through the photomask by using a high-pressure mercury lamp at an illuminance of 14 mW/cm² under the condition that a cycle including one second irradiation and 29 seconds non-irradiation was repeated 20 times and then continuously irradiated for 5 minutes. Moreover, the cell was irradiated for 5 minutes without the photomask. Polarizing plates were attached to the upper and lower sides of the resulting cell so that each polarizing direction crossed the other at right angles.

COMPARATIVE EXAMPLES 13 and 14

As comparative examples with respect to Applications 13, 14, 15 and 16, liquid crystal display devices were manufactured as follows:

Cells were formed in the same way as in Applications 13, 14, 15 and 16. Then, a mixture containing 4 g of a liquid crystal material (ZLI-4792), and 0.02 g of a photopolymerization initiator (Irgacure 651) was injected into each cell. In the liquid crystal material, 0% by weight of S-811 (Comparative Example 13) and 1.5% by weight of S-811 (Comparative Example 14) were added as a chiral agent, respectively.

Table 9 shows electro-optic characteristics of the liquid crystal display devices of Applications 13, 14, 15 and 16; and Comparative Examples 13 and 14. A drive voltage ($V_{th}$) represents a voltage when light transmittance is changed by 10%; and $T_o$ represents light transmittance under no applied voltage, (where light transmittance obtained when two polarizing plates are attached so that each polarizing plate is aligned is taken as 100%). A helical pitch of the liquid crystal material was measured by using a wedge-shaped cell.

TABLE 9

|  | Comparative Example 13 | Application 13 | Application 14 | Application 15 | Application 16 | Comparative Example 14 |
|---|---|---|---|---|---|---|
| Helical pitch (μm) | — | 75 | 38 | 26 | 17 | 13 |
| Drive voltage Vth (V) | 3.2 | 2.7 | 1.9 | 1.1 | 1.3 | 1.8 |
| Light transmittance Tø (%) | 18 | 35 | 40 | 32 | 25 | 12 |

As is understood from Table 9, when the helical pitch of the liquid crystal material is in the range of 15 μm to 100 μm, a bright display with improved light transmittance is made possible. The helical pitch is more preferably in the range of 25 μm to 75 μm. Furthermore, there is a tendency that the addition of a chiral agent decreases the drive voltage.

EXAMPLE 5

Example 5 is the case where light transmittance and contrast can be improved in a liquid crystal display device in which liquid crystal domains are aligned in a radial manner or in a random manner. Hereinafter, Example 5 will be described by way of illustrating applications.

APPLICATIONS 17, 18, 19 and 20

Figure 31:
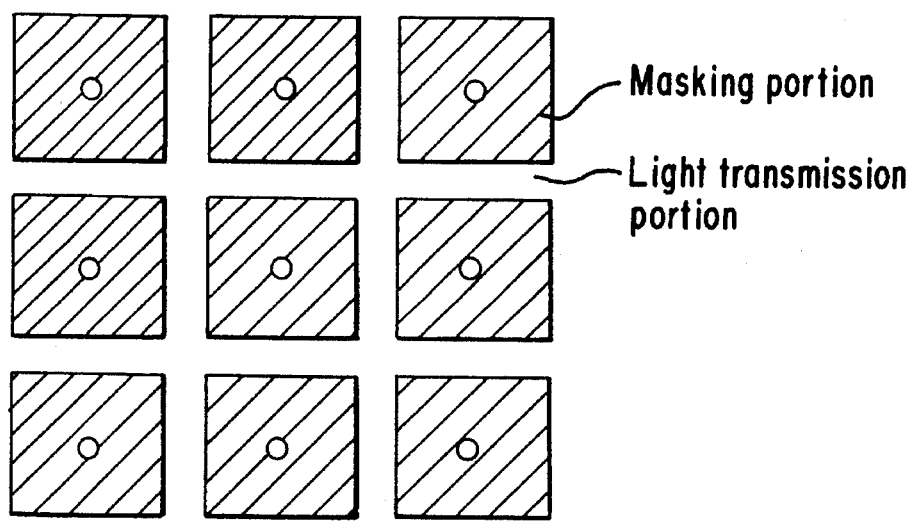
FIG. 31 is a plan view showing an example of a photomask used in Example 5.

Two glass substrates with a thickness of 1.1 mm having ITO (a mixture of indium oxide and tin oxide with a thickness of 500 Angstroms) were used. Spacers with a diameter of 6 μm were dispersed on one substrate, and the other substrate was placed thereon so as to keep a gap therebetween. Then, a photomask as shown in FIG. 31 was placed on the cell thus obtained so that the pixels were covered with masking portions of the photomask. Moreover, in the cell, a homogeneous mixture containing 0.1 g of acrylate with two functional groups, i.e., a photopolymerizable compound (R-684, manufactured by Nippon Kayaku K.K.), 0.05 g of styrene, 0.85 g of isobornyl methacrylate, fluorine and/or chlorine type liquid crystal material shown in Table 10 (in which 0.5% of S-811 was added as a chiral agent), and 0.0025 g of a photopolymerization initiator (Irgacure 651) was injected.

TABLE 10

| Liquid crystal materials used in Application 17 to 20 | | | | |
| --- | --- | --- | --- | --- |
|  | Application 17 | Application 18 | Application 19 | Application 20 |
| Anisotropy of refractive ratio of liquid crystal ($\Delta n$) | 0.09 | 0.13 | 0.17 | 1.18 |
| d · $\Delta n$ (μm) | 0.54 | 0.78 | 1.02 | 1.08 |

Next, the cell was irradiated with UV-rays through the photomask by using a high-pressure mercury lamp (which can provide parallel rays) at an illuminance of 10 mW/cm² under the condition that a cycle including one second irradiation and 30 seconds non-irradiation was repeated 20 times and then continuously irradiated for 10 minutes. Moreover, the cell was irradiated for 10 minutes without the photomask. Polarizing plates were attached to the upper and lower sides of the resulting cell so that each polarizing direction crossed the other at right angles. Thus, a liquid crystal display device in which liquid crystal regions were partitioned by polymer walls.

Table 11 shows light transmittance $T_0$ which is an electro-optic characteristic of the cell thus formed under no applied voltage, where light transmittance obtained when the two polarizing plates are positioned so that each polarizing direction is aligned is taken as 100%.

TABLE 11

|  | Application 17 | Application 18 | Application 19 | Application 20 |
| --- | --- | --- | --- | --- |
| Light transmittance $T_0$ (%) | 33 | 36 | 31 | 29 |

Viewing angle characteristics of the liquid crystal display devices of Applications 17 to 20 were satisfactory without inversion phenomenon.

APPLICATIONS 21 and 22

The same material for a substrate as that of Application 17 was used, and each cell was formed so as to have a cell thickness of 7.2 μm (Application 21) and 9.1 μm (Application 22) by changing the spacers to be provided in each cell.

The same mixture as that of Application 17 was injected into the respective cells, and the cells were irradiated with UV-rays through a photomask in the same way as in Application 17. The cells were observed by a polarizing microscope, which revealed the following:

In Applications 21 and 22, liquid crystal regions each having almost the same shape as that of a masking portion of the photomask were formed.

COMPARATIVE EXAMPLES 15 and 16

Cells were formed in the same way as in Applications 21 and 22, except that the thickness thereof is changed. In Comparative Example 15, the cell thickness was 3.5 μm, and in Comparative Example 16, the cell thickness was 12.0 μm.

Table 12 shows the electro-optic characteristics of the liquid crystal display devices manufactured as described above.

TABLE 12

|  | Application 21 | Application 22 | Comparative Example 15 | Comparative Example 16 |
| --- | --- | --- | --- | --- |
| Cell thickness (μm) | 7.2 | 9.1 | 3.5 | 12.0 |
| d · $\Delta n$ | 0.648 | 0.819 | 0.315 | 1.17 |
| Light transmittance $T_0$ (%) | 38 | 32 | 12 | 20 |

As is understood from Table 12, the viewing angle characteristics of the liquid crystal display devices of Applications 21 and 22 were satisfactory without inversion phenomenon. Moreover, as is understood from Tables 10 to 12, display characteristics of the liquid crystal display devices, particularly, light transmittance $T_0$ under no applied voltage are greatly influenced by a product of $\Delta n$ of the liquid crystal material and the thickness d of the liquid crystal layer ($\Delta n.d$). In the case of the product $\Delta n.d$ of 0.4 to 1.1 μm, higher light transmittance is obtained. In Comparative Example 15, since the cell thickness was too small, the liquid crystal material and the light-curable material do not sufficiently move; as a result, polymer walls were also formed in weak light-irradiated regions. Thus, light transmittance is low under no applied voltage. Moreover, the cell thickness influences the product $\Delta n.d$. When the cell thickness was 3 μm or less, the liquid crystal material and the light-curable material do not sufficiently move; as a result, a great number of liquid crystal regions are formed in the weak light-irradiated regions, decreasing contrast. When the cell thickness is 10 or more, part of the polymer walls is not sufficiently in contact with the upper and lower substrates, decreasing the controllability of the size of liquid crystal regions. Thus, it is preferred that the product $\Delta n.d$ is in the range of 0.4 to 1.1 μm, and the cell thickness is in the range of 3 to 10 μm.

EXAMPLE 6

In the present example, a photomask preferred for manufacturing a liquid crystal display device in which liquid crystal domains are aligned in a radial manner or in a random manner.

Figure 32:
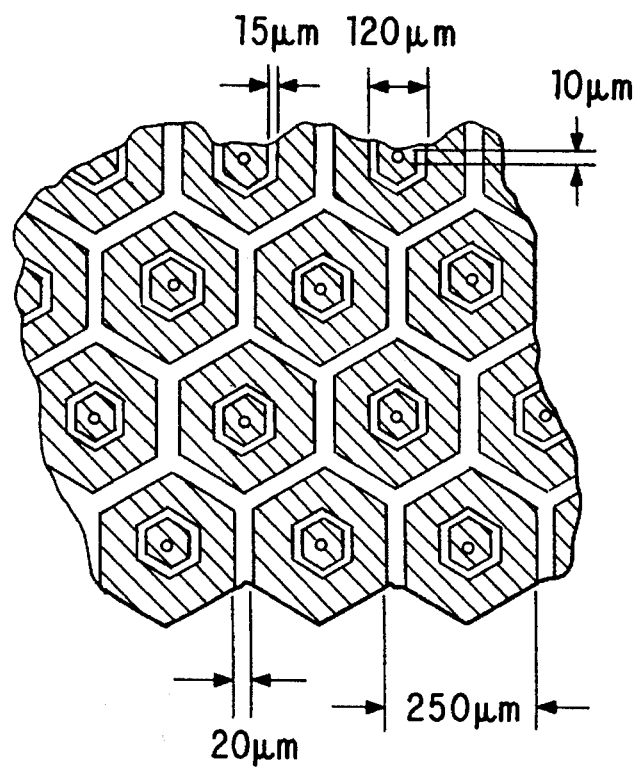
FIG. 32 is a plan view showing an example of a photomask used in Example 6.
Figure 33:
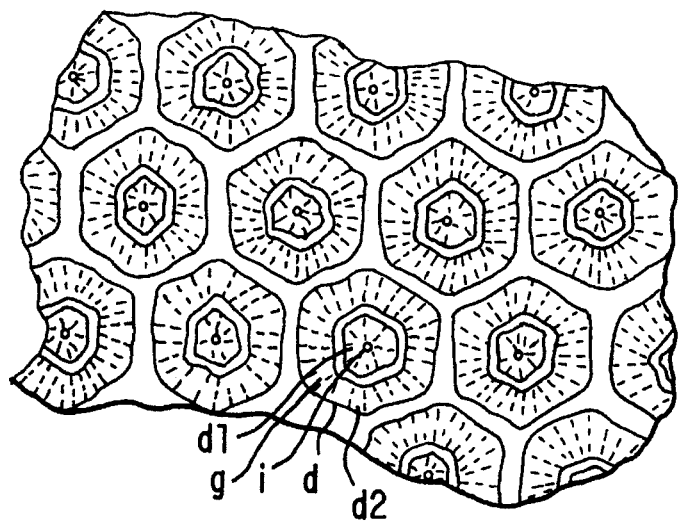
FIG. 33 is a plan view showing liquid crystal regions obtained by using the photomask shown in FIG. 32.

A cell was formed in the same way as in Application 17. Then, the same mixture as that of Application 17 was injected into the cell. A photomask shown in FIG. 32 was placed on the cell and irradiated with UV-rays in the same way as in Application 17. The observation of the cell thus obtained by a polarizing microscope revealed that liquid crystal regions as shown in FIG. 33 were formed. Each liquid crystal region d had a structure in which an inside liquid crystal region d1 and an outside liquid crystal region d2 were separated by a polymer region, and a polymer island i was formed in the vicinity of the center of the inside liquid crystal region d1.

Figure 34A:
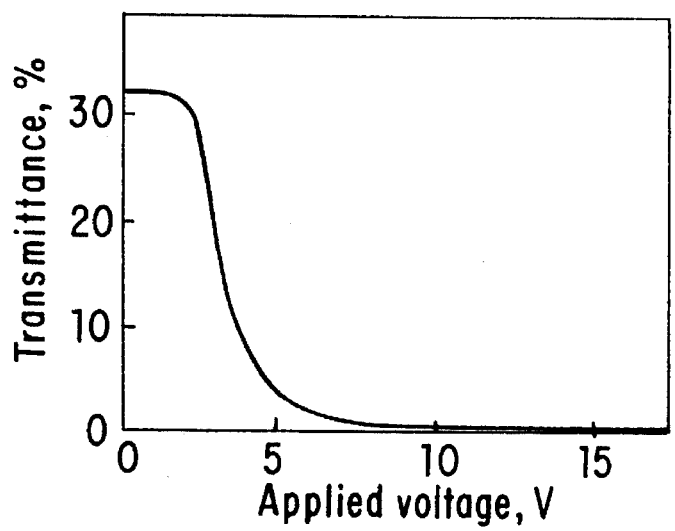
FIG. 34A is a graph showing the viewing angle characteristic in the a direction of a liquid crystal display device of Example 6.
Figure 34B:
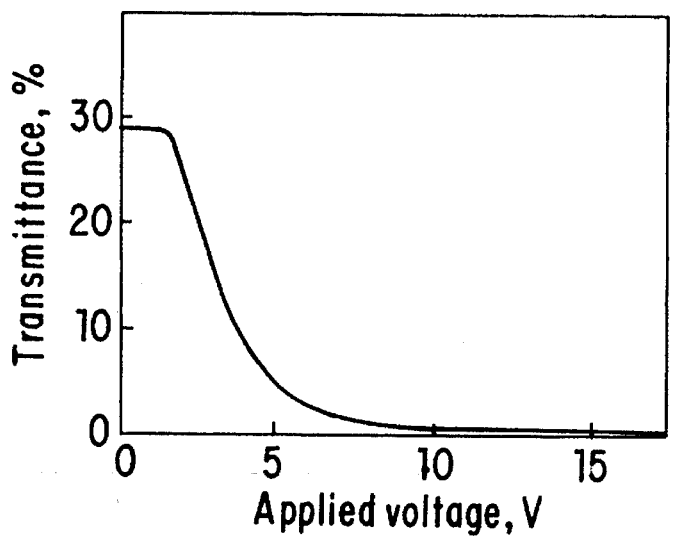
FIG. 34B is a graph showing the viewing angle characteristic in the b direction of a liquid crystal display device of Example 6.
Figure 34C:
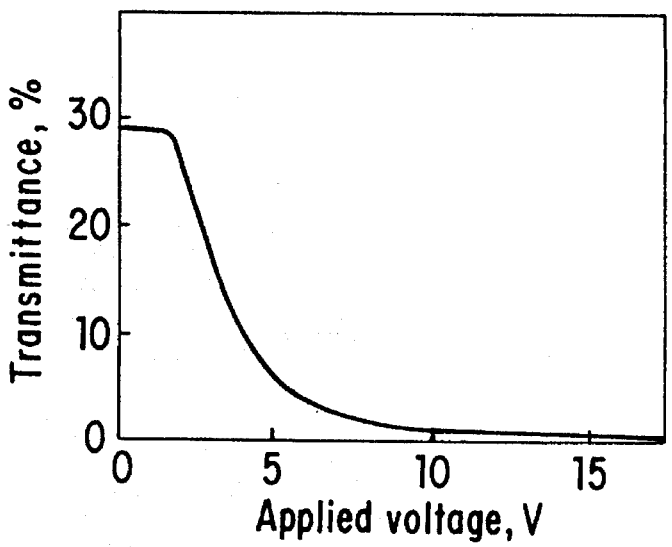
FIG. 34C is a graph showing the viewing angle characteristic in the c direction of a liquid crystal display device of Example 6.
Figure 34D:
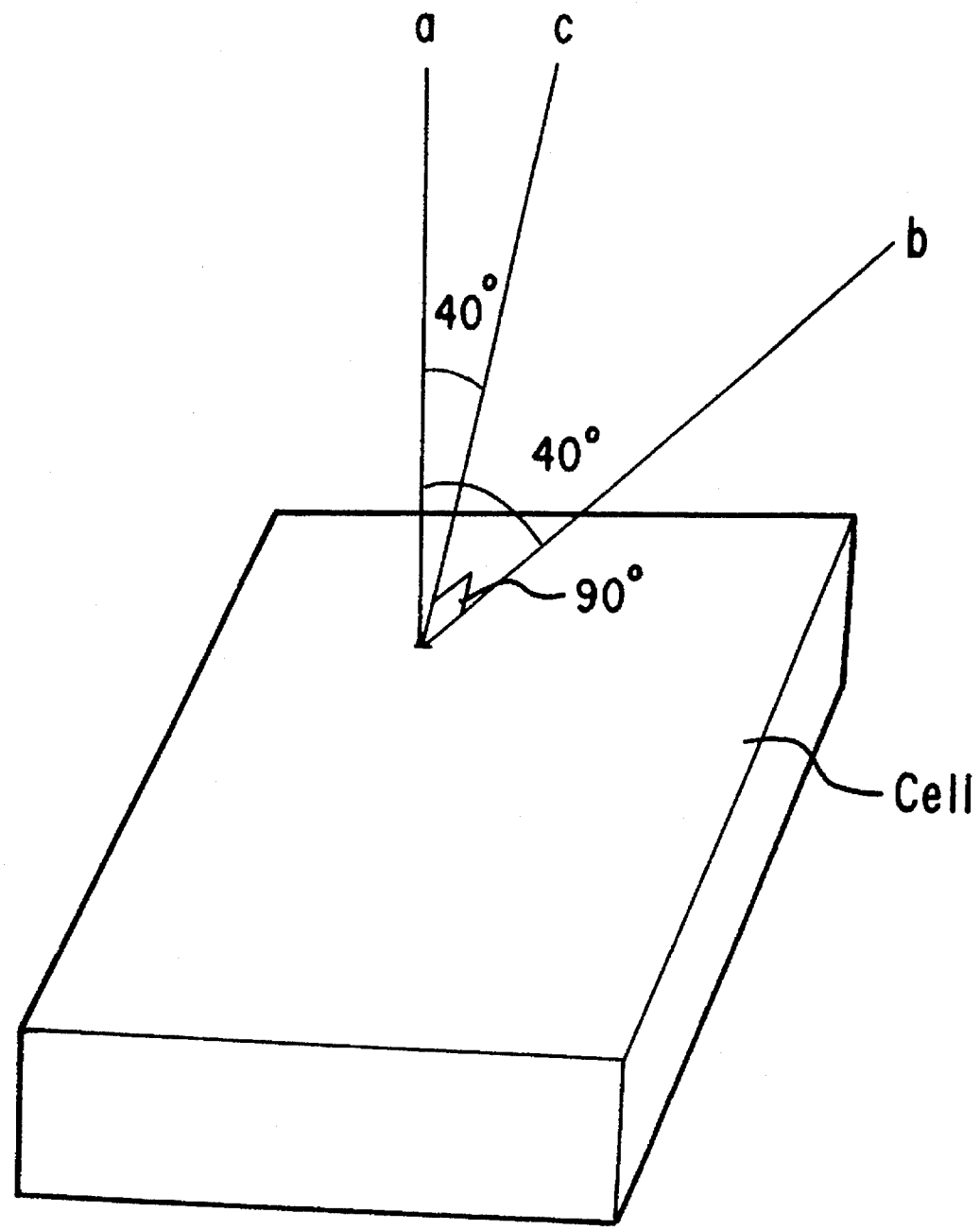
FIG. 34D is a view showing the relationship between the a, b, and c directions.

FIGS. 34A, 34B, and 34C show viewing angle characteristic curves of the liquid crystal display device obtained in the present example. FIGS. 34A and 34B show the relationships between the light transmittance and the applied voltage of the liquid crystal display device in which a cell was sandwiched by polarizing plates so that each polarizing direction crossed the other at right angles. As shown in FIG. 34D, in FIG. 34A, the viewing angle characteristic was measured in a direction a (i.e., in a vertical direction with respect to the cell); in FIG. 34B, the viewing angle characteristic was measured in a direction b (i.e., in a direction with an angle of 40° from the vertical direction with respect to the cell); and in FIG. 34C, the viewing angle characteristic was measured in a direction c (i.e., in a direction with an angle of 90° from the direction b and with an angle of 40° from the direction a). As is understood from those figures, even though the viewing angle is changed, the light transmittance and the applied voltage characteristic curves are hardly changed, showing that the viewing characteristic of the liquid crystal display device of the present example is excellent. In particular, it is hardly seen that the light transmittance is increased under an applied saturation voltage.

As in the present example, when a photomask, in which each masking portion has an opening whose shape is the same as that of a periphery of the masking portion, is used, small liquid crystal domains are formed in a radial manner between the periphery and the opening, thereby greatly improving the viewing angle characteristic. The shape of the periphery and the opening is not necessarily identical. For example, a circular opening, a hexagonal opening, a square opening, etc. with respect to a rectangular periphery can provide the same advantages. In the case where the hexagonal shape is used as in the present example, a flat surface can entirely be covered, and the liquid crystal domains can readily be formed in a nearly circular liquid crystal region.

EXAMPLE 7

Example 7 is the case where viewing angle dependency is further improved in a non light scattering type liquid crystal display device.

Figure 18:
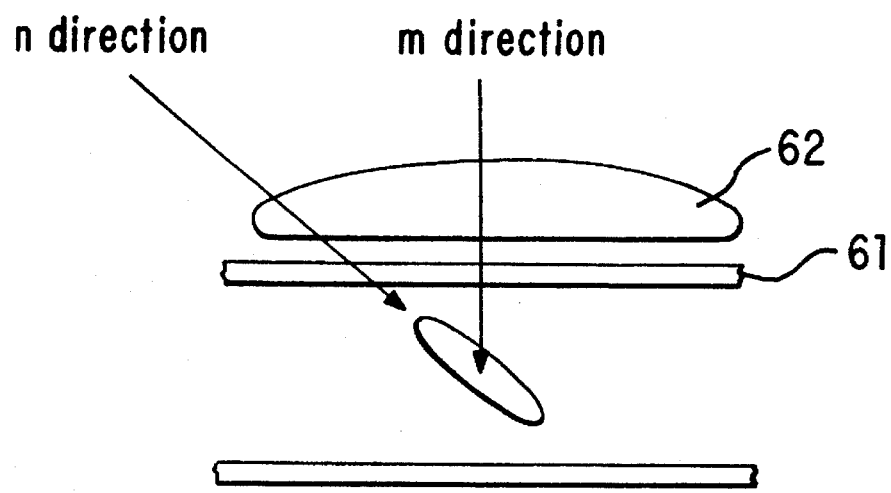
FIG. 18 shows a structure in which the viewing angle dependency is further improved in the liquid crystal display device according to the present invention.

In a non light scattering type liquid crystal display device, a viewing angle characteristic in a half tone is much improved, compared with a conventional liquid crystal display device. However, liquid crystal molecules tilt with respect to a vertical direction of a cell, so that a refractive index of the vertical direction of the cell and that of a diagonal direction of the cell are slightly changed. Due to this phenomenon, apparent contrast is also slightly changed. In order to correct this phenomenon, a disk-shaped refractive index anisotropic film 62 having anisotropy of refractive index can be formed between a polarizing plate (not shown) and a substrate 61, as shown in FIG. 18. Because of this, the refractive index in a vertical direction (m direction) and in a diagonal direction (n direction) become almost the same, thereby remarkably decreasing viewing angle dependency on contrast. This is disclosed in Japanese Patent Application No. 2-400795. This is a general method for canceling birefringence.

The refractive index film 62 is formed of a biaxially oriented film such as polyvinyl alcohol (PVA), in which there is no anisotropy of refractive index in a film surface and the refractive index in a surface direction of the film is made larger than that in a vertical direction thereof.

EXAMPLE 8

Example 8 is the case where a masking property is improved in a non light scattering type liquid crystal display device by placing a light-intercepting mask such as a black mask on a polymer wall.

Figure 19:
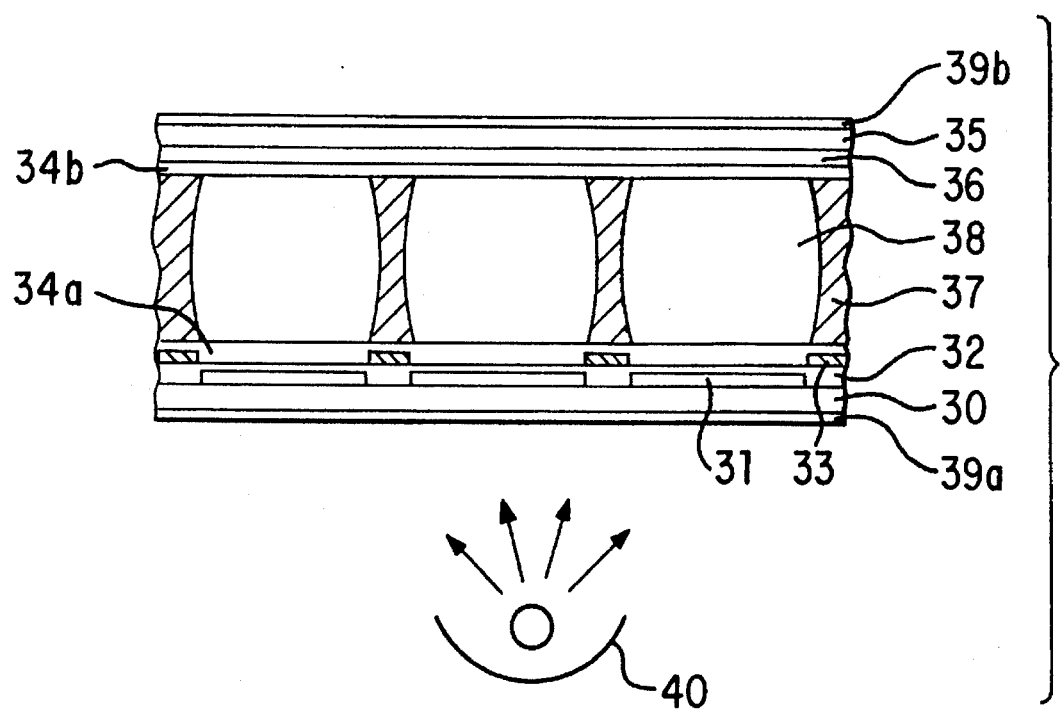
FIG. 19 is a cross-sectional view showing still another example of a liquid crystal display device of the present invention.

FIG. 19 is a cross-sectional view showing a liquid crystal display device according to the present example. This liquid crystal display device includes two transparent substrates 30 and 35 facing each other, polymer walls 37 provided so as to reach inner surfaces (strictly speaking, orientation films 34a and 34b) of the substrates 30 and 35, liquid crystal regions 38 partitioned by the polymer walls 37, polarizing plates 39a and 39b respectively provided on the outer surface of the substrates 30 and 35, and a backlight 40 provided outside of one (lower) substrate 30.

The substrate 30 has pixel electrodes 31 formed on the side of the liquid crystal regions 38. Moreover, on the substrate 30 having the pixel electrodes 31, a flat film 32 for flattening, a light-intercepting mask 33, and the orientation film 34a are formed in this order. The light-intercepting mask 33 is provided so that its masking portions cover 50% or more of each contact area where the polymer walls 37 are in contact with the inner surface of the substrate 30. The substrate 35 has counter electrodes 36 on the side of the liquid crystal regions 38 so that the counter electrodes 36 face and cross the pixel electrodes 31, and the orientation film 34b formed so as to cover the counter electrode 36.

When the masking portions of the light-intercepting mask 33 covers 100% or more of the contact area of the polymer walls 37, pixels correspond to portions which are not covered with the light-intercepting mask 33. In contrast, when the masking portions of the light-intercepting mask 33 covers less than 100% of the contact area of the polymer walls 37, pixels correspond to the area where the pixel electrodes 31 overlap the counter electrodes 36.

A liquid crystal display device with the above-mentioned structure is manufactured as follows:

First, the substrate 30 on which the pixel electrodes 31, the scanning lines, the signal lines, the flat film 32, the light-intercepting mask 33 and the orientation film 34a are formed, and the substrate 35 on which the counter electrode 36 and the orientation film 34b are obtained.

The orientation films 34a and 34b are subjected to a rubbing treatment. Then, the substrates 30 and 35 are disposed so as to face each other, and a previously prepared mixture at least containing a light-curable material and a liquid crystal material is injected between the substrates 30 and 35. Then, a photomask having masking portions is placed outside of the substrate 35. Each masking portion has a size smaller than that of each pixel, and the masking portions are formed in a matrix, the other portions of the photomask being light transmission portions. The position and size of the light transmission portions of the photomask are previously determined so that the masking portions of the light-intercepting mask 33 covers 50% or more of each area of the polymer walls 37 reaching the inner surface of the substrate 30.

As described above, it is preferred that the masking portions of the light-intercepting mask 33 cover 50% or more of each area of the polymer walls 37 reaching the inner surface of the substrate 30. However, if 300% or more area is covered, the peripheral areas of the pixel electrodes 31 covered with the masking portions increase, resulting in a decrease in brightness. Thus, the percentage of each area of the polymer walls to be covered should be in the range of 50% to 300%. The range of 80% to 150% is more preferred. The use of the light-intercepting mask 33 has the following advantage:

Even though one liquid crystal region is provided over two pixels or one liquid crystal region is formed between the adjacent pixels, the light-intercepting mask 33 intercepts light between the adjacent pixels. Thus, light can be prevented from being transmitted between the adjacent pixels, thereby avoiding the decrease in contrast.

In the present example, the light-intercepting mask 33 is positioned on the side of the backlight 40 with respect to the liquid crystal regions 38. Alternatively, the light-intercepting mask can be positioned on the opposite side of the backlight 40 with respect to the liquid crystal regions 38. In the case where the light-intercepting mask 33 is positioned on the side of the backlight 40 with respect to the liquid crystal region 38, light can be intercepted before being scattered by the polymer walls 37. Thus, the light-intercepting property can be improved. In addition, the light-intercepting mask 33 is preferably provided close to the portions of the polymer walls 37 reaching the inner surface of the substrate 30 as much as possible.

Any material can be used for the light-intercepting mask 33 as long as visible light can be intercepted by 50% or more. Examples of the material include metal such as aluminum, tantalum, and molybdenum; or organic materials such as colored paints. The material is used as a thin film.

Hereinafter, Example 8 will be described by way of illustrating applications.

APPLICATION 23

First, electrode lines formed of ITO with a thickness of 500 Angstroms were respectively formed on PET films with a thickness of 0.25 mm. In both of the substrates, the width of each electrode line was 200 µm; the distance between the electrodes lines was 50 µm; and the respective number of the electrode lines was 20.

Next, polyimide (SE150, manufactured by Nissan Chemical Industries Ltd.) was coated onto the substrates by a spin coating method, whereby orientation films were formed. These orientation films were subjected to a rubbing treatment by using a nylon cloth. In this way, two substrates were formed.

Then, spacers with a diameter of 6 µm were dispersed on one substrate, and the other substrate was placed thereon so as to keep a gap therebetween, whereby a cell was formed. At this time, the electrode lines formed on the respective PET films crossed each other at right angles.

Figure 20:
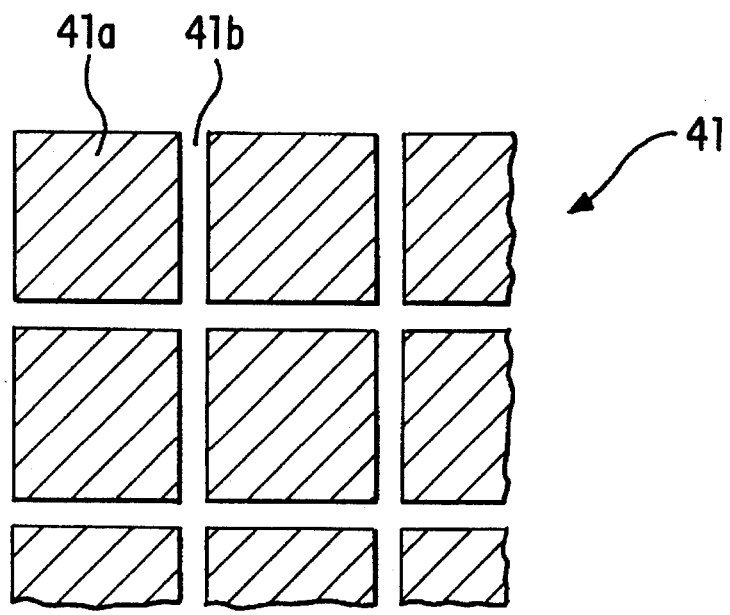
FIG. 20 is a plan view showing a photomask used for manufacturing the liquid crystal display device shown in FIG. 19.

A photomask 41 made of A1 as shown in FIG. 20 was placed on the cell thus obtained. The photomask 41 had square (for example) masking portions 41a, each side of which was 200 µm. The distance between the respective centers of the adjacent square masking portions 41a was 250 µm, and each width of light transmission portions 41b between the adjacent square masking portions 41a was 50 µm. Then, a homogeneous mixture containing 0.1 g of trimethylol propane trimethacrylate, 0.9 g of 2-ethylhexyl acrylate, 4 g of a mixture in which 0.3 g of cholesteric nanonate (CN) was added to liquid crystal material (ZLI-3700-000, manufactured by Merck & Co., Inc.), and 0.03 g of a photopolymerization initiator (Irgacure 184, manufactured by CIBA-GEIGY Corporation) was injected into the cell.

The cell was irradiated with UV-rays by using a high-pressure mercury lamp which can provide parallel rays at an illuminance of 10 mW/cm² for two minutes.

Finally, polarizing plates were attached to the resulting cell so that the respective polarizing directions were aligned with the orientation directions of the corresponding orientation films, whereby a polymer dispersed TN liquid crystal display device was obtained.

APPLICATION 24

Figure 21:
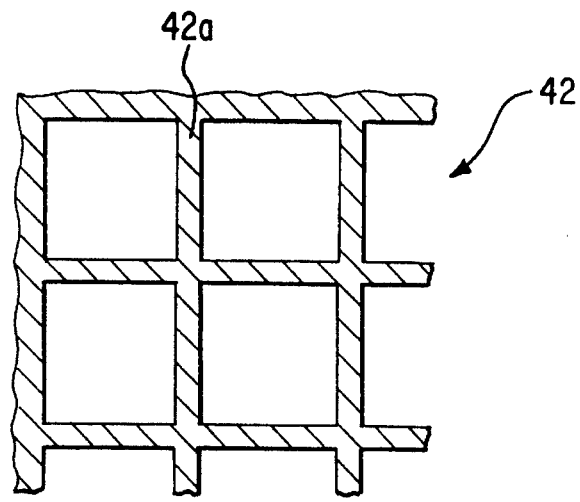
FIG. 21 is a plan view showing a light-intercepting mask provided in the liquid crystal display device shown in FIG. 19.

Another cell was formed as follows:

First, a cell was formed in the same way as in Application 23 except for the step of attaching the polarizing plates. Then, a light-intercepting mask 42 as shown in FIG. 21 was attached to the cell. The light-intercepting mask 42 made of molybdenum had masking portions 42a (which just correspond to the light transmission potions of the photomask 41 in Application 23). The light-intercepting mask 42 was attached to the substrate which was to be on the side of a backlight so that the masking portions 42a overlapped the light transmission portions of the photomask 41.

Finally, polarizing plates were attached to the resulting cell so that the respective polarizing directions were aligned with the orientation directions of the corresponding orientation films, whereby a polymer dispersed TN liquid crystal display device was manufactured.

COMPARATIVE EXAMPLE 17

As a comparative example with respect to Applications 23 and 24, a cell was formed in the same way as in Application 23 by using glass with ITO (flint glass with ITO having a thickness of 500 Angstroms, manufactured by Nippon Sheet Glass Co., Ltd.) instead of the substrate used in Application 23. Moreover, only the same liquid crystal as that of Application 23 was injected into the cell. Then, polarizing plates were attached to the cell so that the respective polarizing directions were aligned with the orientation directions of the corresponding orientation films, whereby a conventional TN liquid crystal display device was manufactured.

COMPARATIVE EXAMPLE 18

As a comparative example with respect to Applications 23 and 24, a TN type cell was formed in the same way as in Application 23. Moreover, the same mixture as that of Application 23 was injected into the cell. Then, the cell was irradiated with UV-rays in the same way as Application 23, except that a photomask was not used, whereby a polymer dispersed liquid crystal display device was manufactured.

Table 13 shows contrast characteristics of the liquid crystal display devices of Applications 23 and 24 together with those of Comparative Examples 17 and 18.

TABLE 13

| | Comparison of contrast characteristics | | | |
|---|---|---|---|---|
| | Application 23 | Application 24 | Comparative Example 17 | Comparative Example 18 |
| Contrast | 38 | 40 | 41 | 9 |

As is understood from Table 13, the liquid crystal display device of Application 23 has an electro-optic characteristic comparable to that of Comparative Example 17. In particular, the liquid crystal display device of Application 24 exhibits almost the same contrast as that of Comparative Example 17. Much more satisfactory contrast can be obtained in Applications 23 and 24, compared with that of Comparative Example 18.

Thus, according to the method of Example 8, a film-shaped substrate can be used, and higher contrast can be obtained, compared with the conventional polymer dispersed liquid crystal display device, because of little light scattering in the pixels.

The liquid crystal display devices of Applications 23 and 24 were cut and one substrate was peeled off from the other substrate in liquid nitrogen. Then, the liquid crystal material was washed away with acetone. After that, a horizontal cross-section of the polymer walls was observed by the SEM, revealing that the liquid crystal regions with the same regularity as that of the masking portions of the photomask (i.e., the same regularity as that of the pixels) were uniformly formed, each liquid crystal region having almost the same size.

In Example 8, each item described in Example 2, such as the Light regulating means such as a photomask, Irradiation of light, etc. can be applied in the same way.

EXAMPLE 9

Example 9 is the case where a photopolymerizable compound material and liquid crystal are clearly separated (phase separation) by curing the material in a non light scattering type liquid crystal display device.

In this type of liquid crystal display device, at least one substrate has an orientation film containing a thin film material and a photopolymerization initiator, and the substrate with the orientation film is subjected to a rubbing treatment in one direction.

A method for manufacturing this liquid crystal display device will be described as follows:

First, two substrates having the above-mentioned orientation films are disposed so that the respective orientation films face each other, whereby a cell is formed. Then, a mixture containing a liquid crystal material and a photopolymerizable material is injected between the substrates. When the cell thus formed is irradiated with light, the polymerizable material starts being polymerized due to the photopolymerization initiator contained in the orientation films. As a result, polymer walls are formed in desired positions.

Hereinafter, materials and the like applicable to the present example will be described.

A Thin Film Material For an Orientation Film

In general, polymer materials, inorganic materials, and the like can be used. Organic materials such as polyimide, thermoplastic resins, and condensation type polymers are preferred. Examples of the polyimide include JALS-203 and JALS-204. (both manufactured by Nippon Chemical Industries Ltd.), and SE150 (manufactured by Japan Synthetic Rubber Co., Ltd.) etc. Examples of the thermoplastic resins include polystyrene, PMMA, polyphenylene oxide (PPO), polycarbonate, etc. Examples of the condensation type polymers include polyimide, novolac resins, etc.

A Photopolymerization Initiator

A general photopolymerization initiator can be used. Examples of the photopolymerization initiator include Irgacure 184, Irgacure 651, Irgacure 907, Darocure 1173, Darocure 1116, and Darocure 2959, etc. The photopolymerization initiator can be added in the range of 1 to 50% by weight based on the total weight of the above-mentioned thin film material.

The thin film material and the photopolymerization initiator are dissolved in a solvent (which allows the thin film material and the photopolymerization initiator to be dissolved) to obtain a dilute solution. The solution thus obtained is coated onto the substrate by a spin coating method, a printing method, etc., whereby an orientation film is formed.

Hereinafter, Example 9 will be described by way of illustrating applications.

APPLICATION 25

Figure 35:
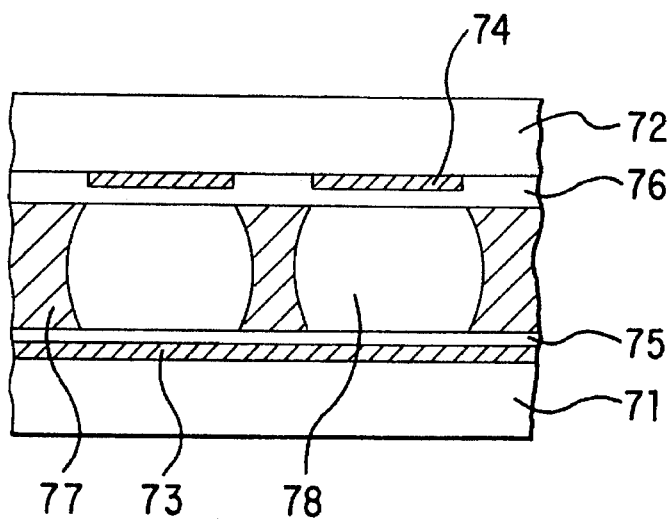
FIG. 35 is a cross-sectional view showing a polymer dispersed liquid crystal display device of Example 9.
Figure 36:
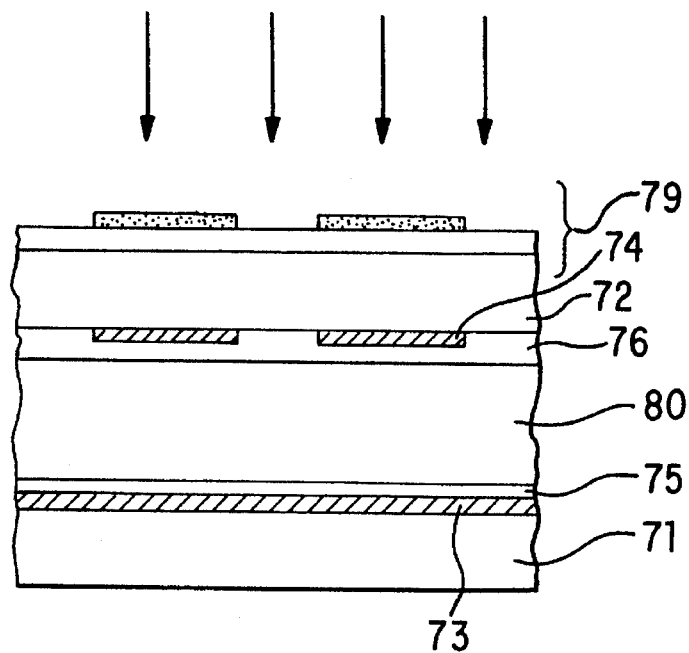
FIG. 36 is a cross-sectional view showing one step of a method for manufacturing the liquid crystal display device shown in FIG. 35.

FIG. 35 is a schematic cross-sectional view of a polymer dispersed liquid crystal display device of the present example. FIG. 36 is a cross-sectional view showing one step of a method for manufacturing the polymer dispersed liquid crystal display device. As shown in FIG. 35, a pair of substrates 71 and 72 face each other so as to have liquid crystal regions 78 supported by polymer walls 77. Electrode lines 73 are provided on an inner side of the substrate 71, and an orientation film 75 is formed so as to cover the electrode lines 73. Electrode lines 74 are provided on an inner side of the substrate 72, and an orientation film 76 is formed so as to cover the electrode lines 74.

The liquid crystal display device with the above-mentioned structure was manufactured as follows:

As shown in FIG. 36, the electrode lines 73 and 74 formed of ITO (a mixture of indium oxide and tin oxide) were formed on the substrates 71 and 72, respectively. The thickness of the respective substrates 71 and 72 was 1.1 mm. Each thickness and width of the electrode lines 73 and 74 was 500 Angstroms and 200 µm. Twenty electrode lines 73 and 74 were respectively formed with a distance of 50 µm between adjacent lines. Glass with ITO (flint glass with ITO having a thickness of 500 Angstroms, manufactured by Nippon Sheet Glass Co., Ltd.) can be used for the substrates 71 and 72.

Then, the orientation films 75 and 76 were coated so as to cover the electrode lines 73 and 74, respectively by a spin coating method. The orientation films 75 and 76 were subjected to a rubbing treatment in one direction by using a nylon cloth. The orientation films 75 and 76 were formed of polyimide (SE150, manufactured by Nissan Chemical Industries Ltd.) to which 5% by weight of a photopolymerization initiator (Irgacure 184) was added. The substrates 71 and 72 thus obtained were attached so that the electrode lines 73 and 74 faced and crossed each other. Then, spacers with a diameter of 6 µm were dispersed on one of the substrates 71 and 72, and the other substrate was placed thereon, whereby a cell was formed.

Next, a photomask 79 was placed outside of the substrate 72 so that pixel portions were masked. Moreover, a homogeneous mixture 80 containing a photopolymerizable material and a liquid crystal material was injected into the cell. The photopolymerizable material contained 0.1 g of trimethylol propane trimethacrylate, 0.4 g of 2-ethylhexyl acrylate, and 0.5 g of isobornyl acrylate; and the liquid crystal material contained 4 g of a mixture in which 0.3% of cholesteric nanonate (CN) was added to ZLI-3700-000 (manufactured by Merck & Co., Inc.). The cell thus obtained was irradiated with UV-rays at an illuminance of 10 mW/cm$^2$ for 10 minutes by using a high-pressure mercury lamp which can provide parallel rays, whereby the photopolymerizable material was cured.

One substrate was peeled off from the other substrate in liquid nitrogen, and the liquid crystal material was washed away with acetone. After that, a horizontal cross-section of the polymer walls was observed by the SEM, revealing that liquid crystal regions 78 with the same regularity as that of the photomask 79 (i.e., the same regularity as that of the pixels) were uniformly formed, each liquid crystal region 78 having almost the same size. Here, it is noted that 20 polymer walls which had the most excellent regularity were selected for observation from samples, since some of the samples were damaged during the formation thereof.

Finally, two polarizing plates were attached to the cell so that each polarizing direction was aligned with the orientation direction of the cell, whereby a liquid crystal display device of the present example was manufactured.

COMPARATIVE EXAMPLE 19

As a comparative example with respect to Application 25, a liquid crystal display device was manufactured as follows:

In Comparative Example 19, glass with ITO (flint glass with ITO having a thickness of 500 Angstroms, manufactured by Nippon Sheet Glass Co., Ltd.) was used instead of the substrates 71 and 72 of application 25, and only a liquid crystal material (ZLI-3700-000) was used.

COMPARATIVE EXAMPLE 20

As a comparative example with respect to Application 25, and a liquid crystal display device was manufactured in the same way as in Application 25 except that a photomask was not used.

Table 14 shows the results obtained by measuring the contrast of the liquid crystal display devices of Application 25 and Comparative Examples 19 and 20. Contrast is measured by using a Photal LC 5000 system, and is taken as a ratio of light transmittance $T_0$ under no applied voltage with respect to light transmittance $T_{sat}$ under the condition that a saturation voltage is applied: $(T_0/T_{sat})$.

TABLE 14

Comparison of contrast characteristics

|  | Application 25 | Comparative Example 19 | Comparative Example 20 |
| --- | --- | --- | --- |
| Contrast | 39 | 41 | 9 |

As is understood from Table 14, the liquid crystal display device manufactured by using a photomask has high contrast. The use of the photomask enables the formation of the polymer walls with the same regularity as that of the pixels and greatly decreases the interfaces between the polymer walls and the liquid crystal regions, sufficiently reducing light scattering between the polymer walls and the liquid crystal regions.

In Example 9, each item described in Example 2, such as Light regulating means such as a photomask, Irradiation of light, etc. can be applied in the same way.

EXAMPLE 10

Example 10 is the case where a phase separation is clearly conducted between a polymer and liquid crystal by curing a photopolymerizable compound in a non light scattering type polymer dispersed liquid crystal display device.

Figure 37:
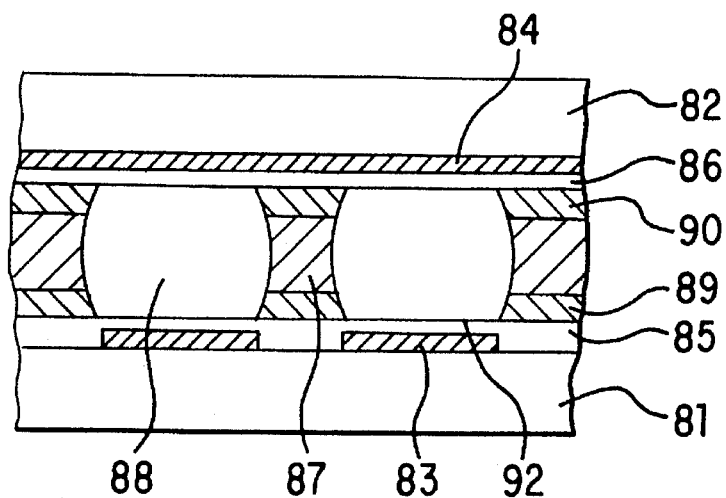
FIG. 37 is a cross-sectional view showing a polymer dispersed liquid crystal display device of Example 10.
Figure 38:
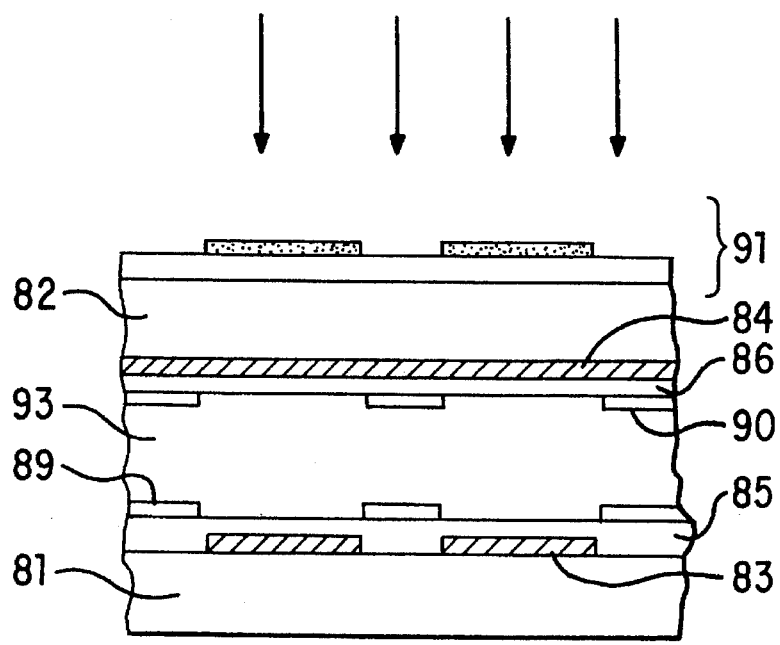
FIG. 38 is a cross-sectional view showing one step of a method for manufacturing a liquid crystal display device shown in FIG. 37.

FIG. 37 shows a cross-sectional view illustrating a method for manufacturing a polymer dispersed liquid crystal display device of the present example. FIG. 38 shows a schematic cross-sectional view of the polymer dispersed liquid crystal display device of the present example. As shown in FIG. 37, substrates 81 and 82 face each other with liquid crystal regions 88 sandwiched therebetween. The liquid crystal regions 88 are partitioned by polymer walls 87.

The substrate 81 has electrode lines 83 on the side of the liquid crystal regions 88, and an orientation film 85 is formed so as to cover the electrode lines 83. On the orientation film 85 other than pixels 92, a thin film pattern 89 containing a polymerization initiator are formed. Electrode lines 84 are provided on an inner side of the substrate 82, and an orientation film 86 is formed so as to cover the electrode lines 84. On the orientation film 86 other than the pixels 92, a thin film pattern 90 containing a polymerization initiator is formed.

A method for manufacturing the liquid crystal display device with the above-mentioned structure is as follows:

First, the thin film patterns 89 and 90 containing a polymerization initiator are respectively formed on portions of the substrates 81 and 82 in which the polymer walls 87 are to be formed. Then, the substrates 81 and 82 are attached to each other, and a mixture containing a liquid crystal material and photopolymerizable or heat-polymerizable compound material is injected between the substrates 81 and 82 whereby a cell is formed. Next, the mixture is irradiated with UV-rays or heated. As a result, the polymerizable compound starts being cured due to the polymerization initiator contained in the thin film patterns 89 and 90, and the polymer walls 87 starts being formed in contact with the thin film patterns 89 and 90. Thus, the liquid crystal regions 88 which are subjected to orientation treatment are formed in one pixel or an adjacent plurality of pixels.

The thin film pattern is prepared by adding a polymerization initiator to a supporter and then dissolving the mixture in a solvent, thereby obtaining a dilute solution. The thin film pattern is formed at least one substrate so as to cover the electrode lines formed on the substrate. Preferably, the same thin film patters are formed on both substrates.

Hereinafter, materials and a method for manufacturing applicable to the present example will be described.

A Thin Film Pattern

It is preferred that a thin film pattern does not cover 60% or more of each area of the pixels. When the thin film pattern covers 60% or more of each area of the pixels, polymer walls formed in the pixel portions which are covered with the thin film pattern cause light scattering, decreasing contrast.

The shape of a portion on which the thin film pattern is not formed (i.e., the shape of a portion in which a liquid crystal region is formed) is not particularly limited. Preferred shapes include a circle, a square, a trapezoid, a hexagon, a rectangle, a diamond shape, a letter shape, a shape surrounded by a curved line(s) and/or a straight line(s), a configuration obtained by cutting a part of these shapes, a configuration obtained by the combination of the different shapes, a configuration obtained by the combination of the same shapes, and the like. When the present invention is put into practical use, one or more of these shapes is selected. In order to improve productivity of the liquid crystal region, it is preferred to limit the configuration to one shape with the same size.

Figure 39:
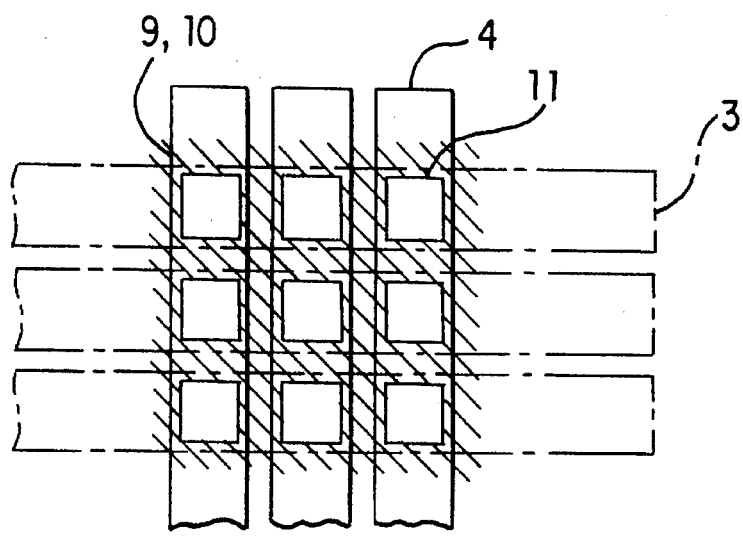
FIG. 39 is a schematic view showing an example of a shape for the thin film pattern of Example 10.
Figure 40:
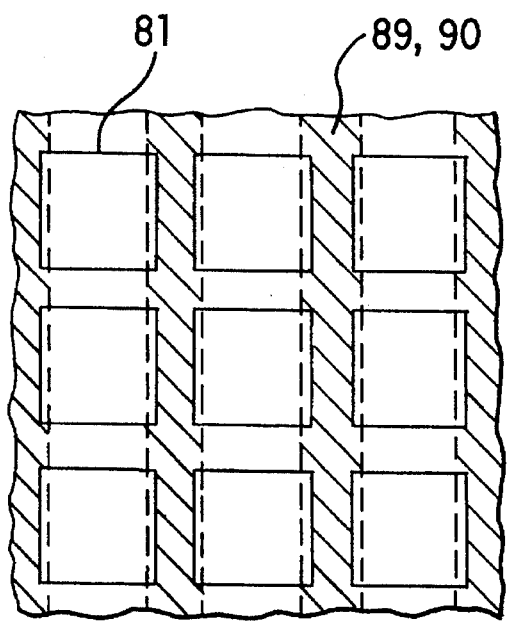
FIG. 40 is a schematic view showing another example of a shape for the thin film pattern of Example 10.
Figure 41:
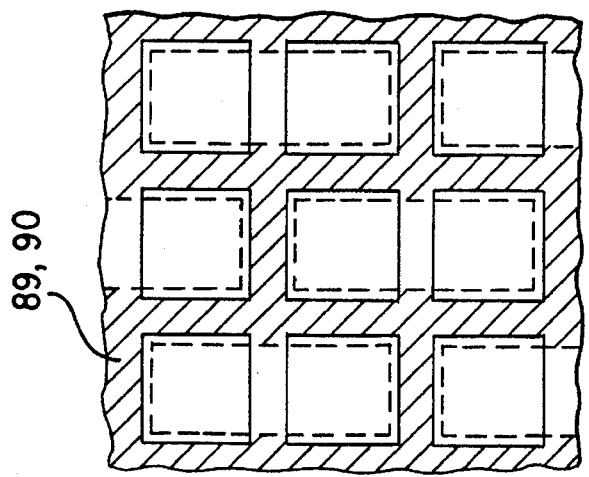
FIG. 41 is a schematic view showing another example of a shape for the thin film pattern of Example 10.

Moreover, as shown in FIG. 39, as in the present example, it is preferred to form the thin film pattern on the entire portions other than pixels. Because this structure decreases the intensity of light scattering in the pixels and improves the contrast of the liquid crystal display device. Alternatively, the thin film pattern can be formed on a part of the portions other than pixels. For example, as shown in FIG. 40, the thin film pattern is formed in a line shape or as shown in FIG. 41, the above-mentioned shapes are combined as one pixel.

A Method For Forming Thin Film Pattern

An example of the method for forming a thin film pattern includes a printing method or lithography used in the semiconductor industry.

In the printing method, a material obtained by adding a polymerization initiator to a supporter and dissolving the mixture in a solvent is formed into a thin film pattern by a seal printing, a screen printing, an offset printing, etc. As the supporter, a polymer material can be used. Examples of the polymer material include methyl polymethacrylate (PMMA), polyvinyl alcohol, nitrocellulose, polycarbonate, vinyl acetate, polyimide, etc. The solvent depends upon the material of the supporter to be used. The examples of the solvent include toluene, methyl ethyl ketone (MEK), $\gamma$-butyrolactone, etc. The mixture of the supporter and the polymerization initiator is dissolved in the solvent to obtain a solution containing the mixture in an amount of 0.1 to 50% by weight.

In the photolithography, a polymerization initiator is added to a positive resist material, and the mixture is coated onto at least one of the two substrates. Then, a photomask is placed on the substrate, on which the mixture is coated, so that a thin film pattern is formed on a desired place, and under this condition, the substrate is exposed to light. After that, a resist material on a light-exposed portion is removed. An example of the positive resist material includes AZ1350 (manufactured by Shipley Corporation).

A Polymerization Initiator

As a polymerization initiator, a photopolymerization initiator and a thermal polymerization initiator can be used. Examples of the photopolymerization initiator include Irgacure 184, Irgacure 651, Irgacure 907, Darocure 1173, Darocure 1116, and Darocure 2959. Examples of the thermal polymerization initiator include peroxides such as BPO and t-butylperoxide; radical generating agents such as azobisisobutyronitrile (AIBN); and amine compounds such as ethylamine, n-butylamine, benzylamine, diethylenetriamine, tetramethylenepentamine, diaminodiphenylmethane.

A Thickness Of a Cell

When two substrates face each other, the thickness of a cell is varied depending upon a display mode. In the case of photosetting, the thickness of the cell is preferably larger than a dot diameter of the photomask to be used. Due to this, liquid crystal regions are formed in a column-shaped honeycomb structure, decreasing the intensity of light scattering in pixels and improving the contrast of the liquid crystal display device.

A Polymerizable Compound Material

In addition to the materials described in "A polymerizable material" of Example 2, a thermosetting monomer can be used as the polymerizable compound material. Examples of the thermosetting monomer include bisphenol A type epoxy resins, bisphenol A diglycidyl ether, bisphenol F diglycidyl ether, hexahydrobisphenol A diglycidyl ether, propylene glycol diglycidyl ether, neopentyl glycol diglycidyl ether, diglycidylester phthalate, triglycidyl isocyanate, tetraglycidylmethaxylenediamine, etc. These monomers can be used alone or in combinations of two or more kinds. As the light-curable and thermosetting oligomers and polymers, for example, chlorinated and/or fluorinated polymers obtained from these monomers can be used. These monomers, oligomers, and polymers can be used in combination.

A Method For Curing a Polymerizable Compound Material

A polymerizable compound material is cured by being irradiated with light or by being heated.

In the case of the light irradiation, it is preferred that the UV-rays to be used are parallel rays. Here, when ferroelectric liquid crystal (FLC) is used, it is effective for improving shock resistance to provide small liquid crystal droplets as a buffer at the periphery of large liquid crystal regions with almost the same size as that of pixels. Thus, for the purpose of forming such small liquid crystal droplets, the end portions of the photomask are made so that much more light can be transmitted toward outside of the photomask; the photomask is placed away from the substrate; and UV-rays with a relatively poor degree of parallelization are used. It is preferred to select the polymerizable compound material and the liquid crystal material so that the diameter of each liquid crystal region becomes larger than a dot diameter of the photomask used during the UV-rays irradiation step. However, even though the selected polymerizable compound material and liquid crystal material make the diameter of each liquid crystal region smaller than a dot diameter of the photomask, these selected materials can be used by decreasing the intensity of UV-rays, conducting the reaction at low temperatures over a long period of time, and reducing the added amount of the polymerization initiator.

Moreover, the shape of the photomask to be used is not particularly limited as long as it appropriately decreases the intensity of UV-rays. It is preferred that the photomask is provided so that each masking portion thereof covers 30% or more of the size of each pixel and 50% or more of each portion of a thin film pattern is exposed to light. When each masking portion of the photomask covers less than 30% of the size of each pixel, each liquid crystal region obtained has a size corresponding to less than 30% of the size of each pixel. As a result, the number of interfaces between the liquid crystal regions and the polymer walls are formed in pixels, increasing the degree of light scattering in the pixels and decreasing contrast. Therefore, this case is not preferred. When less than 50% of each portion of the thin film pattern is exposed to light, the area occupied by the liquid crystal regions formed is reduced, resulting in the decrease in overall contrast. Thus, this case is not preferred, either.

In the case of thermosetting, when the reaction rate is low, polymer walls are formed in liquid crystal regions due to the formation of polymerized ends in the liquid crystal regions, decreasing contrast. Thus, it is preferred to select a reaction system and reaction conditions which allow reaction to be completed within 10 minutes.

Hereinafter, Example 10 will be described by way of illustrating Applications.

APPLICATIONS 26

A liquid crystal display device with a structure shown in FIG. 37 was manufactured by the following method:

First, as shown in FIG. 37, the electrodes 83 and 84 formed of ITO (a mixture of indium oxide and tin oxide) were formed on the substrates 81 and 82. As the substrates 81 and 82, flint glass (manufactured by Nippon Sheet Glass Co., Ltd.) with a thickness of 1.1 mm, a length of 30 mm, and a width of 30 mm was used. The electrode lines 83 and 84 had a thickness of 500 Angstroms and a width of 200 µm. The respective electrode lines 83 and 84 were formed with a distance between them of 50 μm. The respective number of the electrode lines 83 and 84 was 100. Then, polyimide (SE150, manufactured by Nissan Chemical Industries Ltd.) was respectively coated so as to cover the electrode lines 83 and 84 by a spin coating method. The polyimide was cured by heating to form orientation films 85 and 86. The orientation films 85 and 86 were subjected to a rubbing treatment in one direction with a nylon cloth.

Next, the thin film patterns 89 and 90 were formed on the orientation films 85 and 86, respectively by the following method:

First, a solution in which a photopolymerization initiator (Irgacure 184) was added to a positive resist material (i.e., a supporter) (AZ1350, manufactured by Shipley Corporation) in an amount of 5% by weight was coated onto the orientation films 85 and 86 by a spin coating method, thereby forming positive photoresists. Then, a photomask was placed on each photoresist so that its masking portions covered portions of the positive photoresist other than the portions to be pixels 92. Under this condition, UV-rays were irradiated to each photoresist at an illuminance of 15 mW/cm$^2$ (measured at 365 nm) by using a high-pressure mercury lamp and developed with a developer. Then, photoresist portions exposed to light were removed to obtain the thin film patterns 89 and 90 as shown in FIG. 38. Here, the portions of the photoresist patterns 89 and 90 other than the portions to be pixels 92 correspond to portions between the adjacent electrode lines 83 formed on the substrate 81 and portions between the adjacent electrode lines 84 formed on the substrate 82.

Spacers with a diameter of 6 μm were dispersed on one of the substrates 81 and 82 and the other substrate was placed thereon so as to keep a gap therebetween, whereby a cell was formed. At this time, the electrode lines 83 and 84 faced and crossed each other.

Next, as shown in FIG. 38, a photomask 91 was placed on the substrate 82 so that its masking portions covered the pixels 92. Moreover, a homogeneous mixture 93 containing a photopolymerizable compound material and a liquid crystal material was injected into the cell. Then, the cell was irradiated with UV-rays at an illuminance of 10 mW/cm$^2$ for 5 minutes by using a high-pressure mercury lamp which can provide parallel rays, whereby the photopolymerizable compound material was cured. As the photopolymerizable compound material, a mixture containing 0.1 g of trimethylol propane methacrylate, 0.4 g of 2-ethylhexyl acrylate, and 0.5 g of isobornyl acrylate was used. As the liquid crystal material, 4 g of a mixture in which 0.3% of cholesteric nanonate was added to ZLI-3700-000 (manufactured by Merck & Co., Inc.) was used. As a result, as shown in FIG. 37, in regions which were irradiated with the UV-rays, polymer walls 87 with high physical strength were formed in contact with the thin film patterns 89 and 90; and in regions which were covered with the masking portions of the photomask 91, the liquid crystal regions 88 subjected to orientation treatment were formed in contact with the orientation films 85 and 86.

The cell thus obtained was sandwiched by two polarizing plates so that the respective polarizing directions were aligned with the orientation directions of the corresponding orientation films, whereby a liquid crystal display device of Application 26 was obtained.

One substrate was peeled off from the other substrate in liquid nitrogen, and the liquid crystal material was washed away with acetone. After that, a horizontal cross-section of the polymer walls was observed by the SEM, revealing that liquid crystal regions with the same regularity as that of a pattern of the photomask 91 (i.e., the same distribution as that of the pixels 92) were uniformly formed, each liquid crystal region having almost the same size. The polymer walls were likely to be damaged while forming samples, so that 20 polymer walls which had the most excellent regularity among the samples were selected for observation.

APPLICATION 27

First, the electrode lines 83 and 84, and the orientation films 85 and 86 were formed on the substrates 81 and 82 in the same way as in Application 26. Then, the rubbing treatment was conducted in the same way as in Application 26.

Next, the same photopolymerization initiator as that of Application 26 was added in an amount of 5% by weight to a supporter (polystyrene), and the mixture was diluted with toluene to obtain 3% by weight of solution. Then, on portions of the orientation films 85 and 86 other than portions to be pixels the toluene solution thus obtained was printed by seal printing to form thin film patterns 89 and 90, respectively with a thickness of 1 μm after being dried. The thin film patterns 89 and 90 had the same pattern. Then, a cell was formed in the same way as in Application 26, the photomask 91 was mounted, and the same mixture 93 as that of Application 26 was injected into the cell. After that, the cell was irradiated with UV-rays in the same way as in Application 26, whereby the photopolymerizable compound material was cured. The cell was sandwiched by two polarizing plates in the same way as in Application 26, whereby a liquid crystal display device of Application 27 was obtained.

COMPARATIVE EXAMPLE 21

A conventional TN liquid crystal display device (which is not a polymer dispersed type) was manufactured.

COMPARATIVE EXAMPLE 22

A liquid crystal display device was manufactured in the same way as in Application 26, except that the thin film patterns 89 and 90 were not formed.

Table 15 shows the results obtained by measuring the contrast of the liquid crystal display devices of Applications 26 and 27, and those of Comparative Examples 21 and 22. The contrast is taken as a ratio of transmittance of light passing though a liquid crystal display device under no voltage with respect to light transmittance under the condition that a voltage of 10 V is applied to electrodes, i.e., (light transmittance under no applied voltage)/(light transmittance under the condition of a voltage 10 V applied).

TABLE 15

| | Comparison of contrast characteristics | | | |
|---|---|---|---|---|
| | Application 26 | Application 27 | Comparative Example 21 | Comparative Example 22 |
| Contrast | 39 | 37 | 41 | 9 |

As is understood from Table 15, the polymer dispersed liquid crystal display devices of Applications 26 and 27 in which the thin film patterns 89 and 90 are formed have high contrast. The liquid crystal display device of Comparative Example 21 which is not a polymer dispersed type also has high contrast. However, when this device was raised, a rough display was observed on the upper and lower parts. It is understood from this result that the formation of the thin film patterns 89 and 90 enables a clear separation between the liquid crystal regions and the polymer walls, greatly decreases interfaces between the liquid crystal regions and the polymer walls in the pixels 92, and sufficiently reduces the light scattering between the liquid crystal regions and the polymer walls.

Items described in Example 2: A light regulating means such as a photomask, Irradiation light, etc. can be applied to Example 10.

EXAMPLE 11

Example 11 is the case where the response speed is sufficiently improved and a high electrical holding ratio can be maintained. The present example will be described by way of illustrating Applications.

APPLICATION 28

Figure 42:
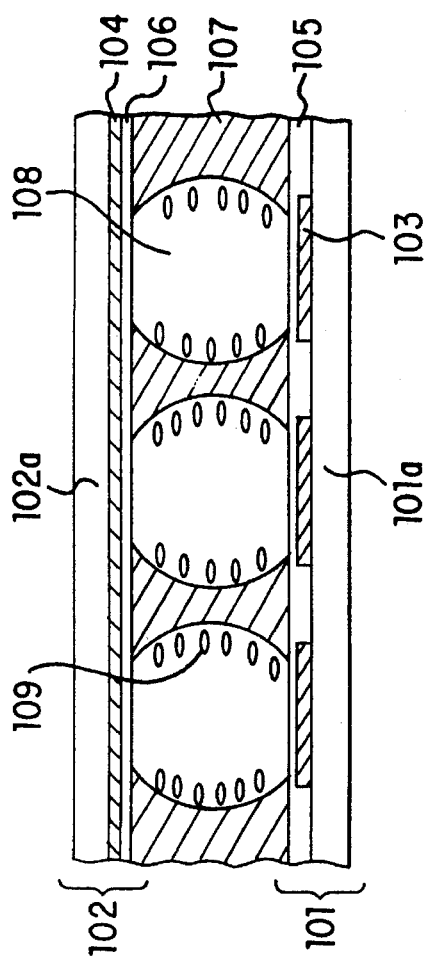
FIG. 42 is a cross sectional view showing a liquid crystal display device of Example 11.

FIG. 42 is a cross-sectional view showing a liquid crystal display device of Application 28. In the liquid crystal display device, a display medium is provided between two facing substrates 101 and 102. The display medium has a structure in which liquid crystal regions 108 are partitioned by polymer walls 107 formed in a matrix. A plurality of electrode lines 103 are provided in parallel on a base substrate 101*a*. Moreover, an orientation film 105 is formed so as to cover the electrode lines 103. On the substrate 102, a plurality of electrode lines 104 are provided in parallel on a substrate 102*a*. Moreover, an orientation film 106 is formed so as to cover the electrode lines 104. The electrode lines 104 are formed on the substrate 102 so as to cross the electrode lines 103 formed on the substrate 101 at right angles.

Figure 43:
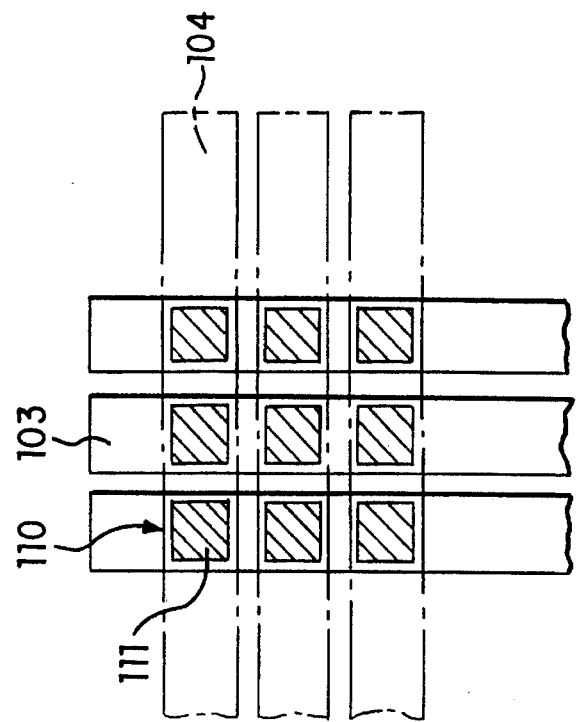
FIG. 43 is a plan view showing a map for crossing electrode lines in the liquid crystal display device of Example 11.

Each crossed portion of the electrode lines 103 and 104 defines a pixel 110 as shown in FIG. 43. It is not necessary that the electrode lines 103 and 104 cross each other at right angles, and they may Just cross each other. Furthermore, in the case where a display device is used in an active matrix system, e.g., a TFT is used as an active element formed on a pixel electrode on one substrate (generally, one TFT is provided for one pixel), one counter electrode can be used on the other substrate.

The display medium containing polymer walls 107 and liquid crystal regions 108 is obtained as follows:

A liquid crystal material and a polymerizable compound material containing a liquid crystalline compound having at least one polymerizable functional group in its molecule is mixed, and the mixture is polymerized. Thus, the display medium is obtained by a phase separation involved in this reaction. Each liquid crystal region 108 has a structure in which a polymerizable liquid crystalline compound 109 is present in the vicinity of the interface between the liquid crystal region 108 and the polymer wall 107.

Hereinafter, a method for manufacturing a liquid crystal display device with the above-mentioned structure will be described.

First, a liquid crystalline compound having a polymerizable functional group in its molecule was prepared. The polymerizable liquid crystalline compound was referred to as, for example, a compound X (represented by the following Formula (1)).

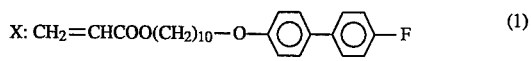

The compound X was prepared as follows:

First, 4'-hydroxy-4-phlorobiphenyl was esterified by using excess 1,10-dibromodecane in the presence of calcium carbonate. Then, the esterified 4'-hydroxy-4-fluorobiphenyl was purified by a column chromatography, and the purified substance was mixed with an equimolar tetramethyleneammonium-hydroxypentahydrate. The mixture thus obtained was esterified with acrylic acid to obtain a polymerizable liquid crystalline compound. The polymerizable liquid crystalline compound can previously be prepared.

Next, a pair of substrates each having electrode lines 103 and 104 on a PET film with a thickness of 0.25 mm were obtained. The electrode lines 103 and 104 were formed of ITO (a mixture of indium oxide and tin oxide), had a thickness of 500 Angstroms, a width of 200 μm, and each electrode line was disposed with an interval of 50 μm between lines. The number of the electrode lines 103 and that of the electrode lines 104 were 20, respectively. Polyimide obtained by adding 5% of a polymerization initiator (Irgacure184) to SE150 (manufactured by Nissan Chemical Industries Ltd.) was coated onto one substrate by a spin coating method. The coated film was subjected to a rubbing treatment by using a nylon cloth.

Spacers with a diameter of 6 μm were dispersed on one of the substrates 101 and 102 and the other substrate was placed theron so as to keep a predetermined gap therebetween, whereby a cell was formed. At this time, the electrode lines 103 and 104 crossed each other at right angles.

Then, a photomask having masking portions 111 for each pixel 110 as shown by shaded portions of FIG. 43 (i.e., having masking portions in a dot pattern) was placed on the cell thus formed so that the masking portions 111 covered the pixels 110. Moreover, a homogeneous mixture previously prepared was injected into the cell. The mixture contained 0.1 g of trimethylol propane trimethacrylate, 0.35 g of 2-ethylhexyl acrylate, 0.45 g of isobornyl acrylate, 4 g of the compound X and a liquid crystal material (i.e., 0.2 g of the compound X and 3.8 g of a liquid crystal material (ZLI-4792, manufactured by Merck & Co., Inc.)) to which 0.3% of cholesteric nanonate (CN) was added, and 0.15 g of a polymerization initiator (Irgacure 184 ). Namely, the mixture contained a polymerizable material, a polymerizable liquid crystalline compound (compound X), a liquid crystal material, and a polymerization initiator. Then, the cell was irradiated through the photomask with UV-rays at an illuminance of 10 mW/cm² for 5 minutes by using a high-pressure mercury lamp which can provide parallel rays, whereby the polymerizable material was cured.

Another cell was separately formed in the same manner as the above, and one substrate of the cell was peeled off from the other substrate in liquid nitrogen, and the liquid crystal material was washed away with acetone. After that, a horizontal cross-section of the polymer walls was observed by an SEM, revealing that liquid crystal regions with the same regularity as that of a dot pattern of the photomask (i.e., the same regularity as that of the pixels 110) were uniformly formed, each liquid crystal droplet having almost the same size. Since the polymer walls 107 were likely to be damaged while forming a sample, 20 liquid crystal regions which had the most excellent regularity in the sample were selected for observation. Thus, the same regularity is required for the photomask.

Polarizing plates were attached to the cell so that the respective polarizing directions were aligned with the orientation directions of the corresponding orientation films, whereby a polymer dispersed liquid crystal display device of a TN mode was manufactured.

COMPARATIVE EXAMPLE 23

As a comparative example with respect to Application 28, a liquid crystal display device was manufactured as follows:

A cell was formed in the same way as in Application 28, except that glass with ITO (flint glass with ITO having a thickness of 500 Angstroms, manufactured by Nippon Sheet Glass Co., Ltd.) was used instead of the substrates used in Application 28. Moreover, only the same liquid crystal material as that of Application 28 was injected into the cell. Then, polarizing plates were attached to the cell so that the respective polarizing directions were aligned with the orientation directions of the corresponding orientation films, whereby a conventional TN liquid crystal display device was manufactured.

COMPARATIVE EXAMPLE 24

As a comparative example with respect to Application 28, a TN cell was formed in the same way as in Application 28. Then, the same mixture as that of Application 28 containing the liquid crystal material and the light-curable material (to which the compound X was not added) was injected into the cell. The cell was irradiated with UV-rays in the same way as in Application 28 without a photomask, whereby a polymer dispersed liquid crystal display device was manufactured.

Table 16 shows the electro-optic characteristics of the liquid crystal display device of Application 28 together with those of the liquid crystal display devices of Comparative Examples 23 and 24.

TABLE 16

| | Comparison of electro-optic characteristics | | |
|---|---|---|---|
| | Application 28 | Comparative Example 23 | Comparative Example 24 |
| Contrast | 40 | 41 | 9 |
| Response speed $\tau_r + \tau_d$ (ms) | 30 | 45 | 150 |

As is understood from Table 16, the liquid crystal display device of Application 28 has an electro-optic characteristic comparable to that of the liquid crystal display device of Comparative Example 23 which has conventionally been used. Moreover, in Application 28, the liquid crystal display device has less light scattering in pixels, compared with the conventional polymer dispersed liquid crystal display device (Comparative Example 24), so that contrast of the liquid crystal display device in Application 28 is remarkably high. Moreover, the response speed of Application 28 is about 5 times that of Comparative Example 24. Furthermore, the response speed of Application 28 is faster than that of the TN liquid crystal display device of Comparative Example 23 due to the effects of the liquid crystalline compound fixed on the polymer walls. In the present invention, the response speed was taken as a sum of a response speed ($\tau_r$) under the condition that a saturation voltage was applied and a response speed ($\tau_d$) under the condition that the saturation voltage was not applied.

In application 28, in order to use ZLI-4792 having fluorine as a liquid crystal material, a fluorine atom was contained in the polymerizable liquid crystalline compound as shown in Formula (1). Because of this, the liquid crystal molecules present in the vicinity of the interfaces between the liquid crystal regions and the polymer walls are chemically stabilized; as a result, a TFT of a charge holding type can be applied to the liquid crystal display device without decreasing the electrical holding ratio of an entire liquid crystal display device. Such advantages can also be obtained in the case where chlorine atoms are contained in the polymerizable liquid crystalline compound.

APPLICATION 29

A liquid crystal display device was manufactured by changing the kinds of polymerizable liquid crystalline compound to be used. In Application 29, a polymerizable liquid crystalline compound prepared by using a ferroelectric compound Y represented by the following Formula (2) in accordance with "Liquid Crystal" vol. 9, No. 5, pp. 635–641 (1991) was used.

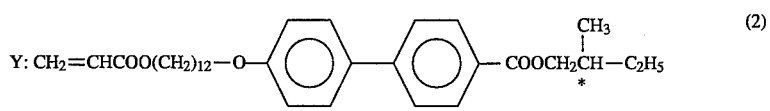

First, two substrates which were subjected to uniaxial orientation treatment in the same way as in Application 28 were made to face each other with silica beads having a diameter of 2 μm sandwiched therebetween. At this time, each rubbing direction of the substrates was aligned. Then, a homogeneous mixture containing 0.018 g of trimethylol propane methacrylate, 0.060 g of lauryl acrylate, 0.020 g of compound Y, 0.002 g of a polymerization initiator (Irgacure 651), and 0.400 g of a ferroelectric liquid crystal material (ZLI-4237-000) was injected into the cell. Namely, the mixture contained the polymerizable material, the polymerizable liquid crystalline compound (compound Y), the polymerization initiator, and the ferroelectric liquid crystal material.

After that, a photomask was placed on the cell in the same way as in Application 28, and the cell was irradiated through the photomask with UV-rays at 10 mW/cm² for 20 minutes by using a high-pressure mercury lamp which can provide parallel rays, whereby the polymerizable material was cured.

COMPARATIVE EXAMPLE 25

A mixture containing the ferroelectric liquid crystal (ZLI-4003) which was the same kind as that of Application 29 and a light-curable material excluding the compound Y was injected into the cell. Then, the cell was irradiated with UV-rays without a photomask in the same way as in Application 28, whereby a polymer dispersed liquid crystal display device was manufactured.

COMPARATIVE EXAMPLE 26

Only the ferroelectric liquid crystal (ZLI-4003) was injected between the substrates prepared in the same way as in Application 29, whereby a liquid crystal cell was formed.

Table 17 shows electro-optic characteristics of the cell of Application 29 and results obtained by measuring shock resistance together with those of the cells of Comparative Examples 25 and 26. The electrooptic characteristics were obtained by measuring a response speed, a memory pulse width, contrast, and applied pressure; and the shock resistance was measured by an impact test.

TABLE 17

|  | Application 29 | Comparative Example 25 | Comparative Example 26 |
|---|---|---|---|
| Response speed | 130 μsec | 120 μsec | 150 μsec |
| Memory pulse width | 200 μsec | 180 μsec | — |
| Contrast | 35 | 40 | 5 or less |
| Pressure application test | 10 kgf/cm² | 1 kgf/cm² | 10 kgf/cm² |
| Impact test | O | X | Δ |

Note:
In Comparative Example 26, the liquid crystal layer takes a certain state by the application of a voltage; however, it cannot hold the state, when a voltage is made 0 V. The liquid crystal molecules in the device are not in a symmetrical orientation which enables bistability.

The above-mentioned electro-optic characteristics were measured under the following conditions:

A cell was placed between polarizing plates of an optical characteristic measurement system under crossed Nicols. Then, the electro-optic characteristics of the cell were measured under the condition that the polarizing plate was rotated by 22.5° so that polarity of the electrical field and that of the signal from a photodetector coincided with each other (here, the angle of the polarizing plate, in which the maximum values of the photodetector with respect to the intensity of transmitted light in positive and negative electrical fields became almost the same, was taken as 0, when a rectangular wave with 100 Hz and ±10 V was applied). Each measurement value was obtained as follows:

Response Speed

A response speed is taken as the average time which is required for the optical amount of the cell to change from 10% to 90% when a pulse rises/falls as a result of the application of a rectangular wave with 100 Hz and ±10 V.

A Memory Pulse Width

A memory refers to a pulse width required for holding bistable two states, when a voltage is made 0 V. The two states are obtained, when voltages with different polarity are applied to the polymer dispersed liquid crystal layer (i.e., energy required for changing the two states expressed by the formula: Voltage×Pulse width (sec.) is given to the layer). In this case, a memory pulse width is a pulse width of a bipolar pulse of ±10 V.

Contrast

Contrast is measured as $(V_{ON}-V_D)/(V_{OFF}-V_D)$, where $V_{ON}$ is a photodetector signal in an ON state, $V_{OFF}$ is a photodetector signal in an OFF state, and $V_D$ is a photodetector signal in a dark state under the condition that a memory state of all of the pixels is switched.

A Pressure Application Test

A pressure application test is conducted by a compression test using a pressure test machine (AGS-100A, manufactured by Shimadzu Seisakusho Ltd.). A cell is placed on a horizontal table, and a load is applied to the cell through a bar which is in contact with the cell in a horizontal manner. The diameter and the cross section of the bar are 8 mm and 0.670 cm², respectively. The change of load is checked when the orientation is changed.

An Impact Test

The change of the orientation of the liquid crystal molecules in a cell is checked, when the cell is dropped from a height of 50 cm to a linoleum table. In Table 17, a mark O shows that the orientation is slightly disturbed between the polymer walls and the liquid crystal; however, no problem is caused for practical use. A mark × shows that the orientation is disturbed in the pixels. This indicates a problem for practical use. A mark Δ shows that the orientation state is partially disturbed due to the impact.

As is understood from Table 17, the cell of Application 29 is more excellent in the pressure application test and the impact test, compared with the cell of Comparative Example 25 using the same ferroelectric liquid crystal as that of Application 29. Moreover, in Comparative Example 26, the liquid crystal molecules are not sufficiently aligned, so that contrast is low. Furthermore, the cell of Comparative Example 26 cannot be measured in the impact test, since the orientation of the liquid crystal molecules are not sufficient from the beginning. In contrast, the cell of Application 29 provides satisfactory results in both of these tests.

As described above, according to Application 29, a mixture containing a liquid crystal material and a polymerizable compound material which contains a liquid crystalline compound having at least one polymerizable functional group in its molecule is polymerized. As a result of this reaction, a phase separation occurs between polymer walls and liquid crystal regions, whereby a display medium in which the liquid crystal regions are partitioned by the polymer walls is formed. On each interface between the polymer wall and the liquid crystal region, the liquid crystalline compound is fixed. Due to this structure, each interface between the liquid crystal region and the polymer wall is driven by the application of a voltage, and a driving force is increased under no applied voltage, since the liquid crystalline compound is bound to the polymer wall. Thus, $\tau_r$ and $\tau_d$ are improved. Moreover, the phase separation is clearly conducted since the liquid crystalline compound is fixed to the interface between the polymer wall and the liquid crystal region.

In the case where a mixture containing ferroelectric liquid crystal as a liquid crystal material and a polymerizable compound material which contains a liquid crystalline compound having a polymerizable functional group and an optically active group in its molecule is used, liquid crystal molecules having an optically active functional group are present at the interfaces between the polymer walls and the liquid crystal regions. Due to the presence of the liquid crystalline molecules, the liquid crystal regions are influenced by the ability of the polymer walls as well as that of the substrate. That is, the orientation regulating ability of the substrate (subjected to an orientation treatment) and that of the polymer walls (which have a component in a direction orthogonal to the surface of the substrate) influence the liquid crystal regions. Thus, the orientation of the liquid crystal molecules is stabilized to improve shock resistance.

Furthermore, in the case where a mixture containing a liquid crystal material of a fluorine type and/or a chlorine type and a polymerizable compound which contains a polymerizable liquid crystalline compound having a fluorine atom(s) and/or a chlorine atom(s) in its molecule is used, liquid crystal molecules are chemically stabilized. Due to the chemical stability, a charge holding type element such as a TFT can be applied to the liquid crystal display device of the present invention without decreasing the electrical holding ratio of an entire display device.

APPLICATION 30

Application 30 is the case where the orientation regulating ability of a polymer with respect to liquid crystal is increased. In this case, a mixture containing a polymerizable material having a liquid crystalline functional group and a liquid crystal material is used, whereby a phase separation of the mixture containing a curable material and liquid crystal is achieved in a liquid crystal phase. Thus, the polymer walls as well as the liquid crystal regions can be in an orientation state.

Hereinafter, a method for manufacturing a liquid crystal display device of Application 30 will be described.

First, the compound X used in Application 28 was prepared. Then, a homeotropic orientation film (JALS-203-R6, manufactured by Nippon Synthetic Rubber Co., Ltd.) was coated onto a glass substrate (1.1 mm thickness) with ITO (a mixture of indium oxide and tin oxide having a thickness of 500 Angstroms) as transparent electrodes by a spin coating method. After that, the substrate was baked. Two substrates treated in this way were made to face each other with spacers sandwiched therebetween so as to give a gap of 6 μm. Thus, a cell was formed.

Then, a photomask having square masking portions was placed on the cell so that the masking portions covered the pixels. Each square masking portion had a side of 200 μm and were provided at an interval of 50 μm therebetween (i.e., the masking portions were disposed at a pitch of 250 μm). Moreover, a mixture containing 0.1 g of acrylate with two functional groups, i.e., a photopolymerizable compound (R-684, manufactured by Nippon Kayaku K.K.), 0.05 g of styrene, 0.85 g of the compound X, 4 g of a liquid crystal material (ZLI-2806, where anisotropy of dielectric constant $\Delta\epsilon$ is <0: manufactured by Merck & Co., Inc.), and 0.0025 g of a photopolymerization initiator (Irgacure 651) was prepared.

The mixture thus prepared was observed by a polarizing microscope while varying temperature, revealing that the transition temperature at which liquid crystal was changed to nematic liquid crystal was 45° C. and a transition temperature at which nematic liquid crystal was changed to a homogeneous liquid was 78° C. The mixture was injected into the cell at 48° C. (in a nematic state). After that, the cell was irradiated with UV-rays through the photomask by using a high-pressure mercury lamp which can provide parallel rays under the condition that a cycle including one second irradiation and 30 seconds non-irradiation was repeated 20 times at 10 mW/cm$^2$ and 48° C. Then, the cell was continuously irradiated for 10 minutes. Moreover, the cell was irradiated without the photomask for 10 minutes, whereby the polymerizable compound contained in the mixture was cured.

One substrate was peeled off from the other substrate in liquid nitrogen, and the liquid crystal material was washed away with acetone. After that, a horizontal section of the polymer walls was observed by the SEM, confirming that the liquid crystal regions with the same regularity as that of a dot pattern of the photomask (i.e., the same regularity of the pixels) were formed, each liquid crystal region having almost the same size.

Two polarizing plates were attached to the upper and lower sides of the cell so that each polarizing direction crossed each other at right angles, whereby an ECB liquid crystal display device, in which the liquid crystal regions were partitioned by the polymer walls, was manufactured.

APPLICATION 31

Application 31 is within the scope of Application 29 or 30. A liquid crystal display device of Application 31 was manufactured as follows:

First, a cell was formed in the same way as in Application 30. The same mixture as that of Application 30 was injected into the cell. Then, the mixture was kept at 100° C., at which temperature the mixture became homogeneous. A photomask was placed on the cell in the same way as in Application 30 and the cell was irradiated with UV-rays. Finally, two polarizing plates were attached to the cell in the same way as in Application 30.

COMPARATIVE EXAMPLE 27

The same orientation film as that of Application 30 was formed on the same substrate as that of Application 30, and the orientation film was subjected to a rubbing treatment by a nylon cloth. Then, the two substrates thus treated were made to face each other in the same way as in Application 30 so that the directions of the orientation films which are not in parallel with each other was obtained. After that, only the same liquid crystal material (ZLI-2806) as that of Application 30 was injected between the substrates, whereby a cell was formed. Two polarizing plates were attached to the upper and lower sides of the cell so that each polarizing direction crossed the other at right angles, whereby a conventional ECB display device was obtained.

COMPARATIVE EXAMPLE 28

A cell was formed in the same way as in Application 30. The same mixture as that of Application 30 was injected into the cell, and then the cell was irradiated with UV-rays in the same way as in Application 30 without a photomask. Two polarizing plates were attached to the cell in the same way as in Application 30, whereby a polymer dispersed liquid crystal display device was manufactured.

Table 18 shows the electro-optic characteristics of the above-mentioned liquid crystal display devices. In an item of Inversion phenomenon in half tone, a mark ○ shows a state in which inversion phenomenon is not caused, a mark × shows a state in which inversion phenomenon is easily observed, and a mark Δ shows a state in which inversion phenomenon is barely observed.

TABLE 18

Comparison of electro-optic characteristics

| | Application 30 | Application 31 | Comparative Example 27 | Comparative Example 28 |
|---|---|---|---|---|
| Contrast | 33 | 23 | 39 | 17 |
| Inversion phenomenon in half tone | ◯ | ◯ | X | △ |

As is understood from Table 18, the liquid crystal display device of Application 30 is excellent in a black state under no applied voltage due to the homeotropic orientation of the polymer portions, and has an electro-optic characteristic comparable to that of the liquid crystal display device of Comparative Example 27. Moreover, in Application 30, a film substrate can also be used. Compared with the polymer dispersed liquid crystal display device of Comparative Example 28, the liquid crystal display device of Application 30 has higher contrast because of less light scattering in its pixels.

Furthermore, in Application 30, the liquid crystal molecules tilt in various directions due to the interaction with the polymer walls, so that the same refractive index can be obtained when seen from any direction, improving the viewing angle characteristic. In Comparative Example 27, the liquid crystal molecules tilt in one direction under an applied voltage, due to the rubbing treatment in one direction. Thus, the refractive index is varied depending upon the direction in which the liquid crystal molecules are seen, so that inversion phenomenon and change of contrast are caused depending upon the direction of the observation, deteriorating the viewing angle characteristic. In Comparative Example 28, liquid crystal regions in a particle shape were formed, and as a whole, a rough display was obtained.

The observation of the cell of Application 31 by a polarizing microscope revealed that the liquid crystal regions were in a nearly homeotropic orientation and light was passed through the polymer walls under crossed Nicols. Thus, contrast of the liquid crystal display device of Application 31 is slightly lower than that of Application 30.

Next, the reasons why a viewing angle characteristic is improved in Application 30 will be described.

Figure 44A:
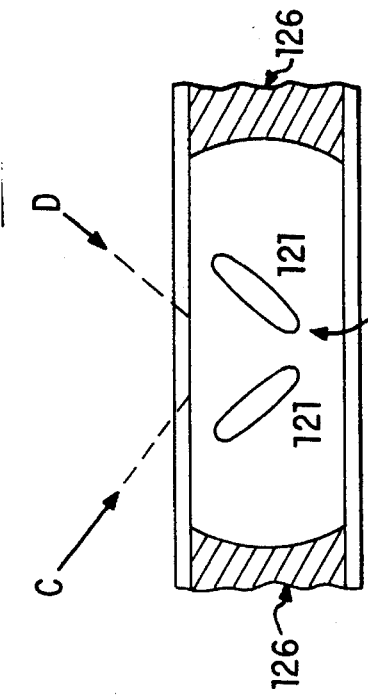
FIG. 44A is a view showing a state in which a conventional ECB liquid crystal display device performs a half tone display in a half tone.

A liquid crystal display device utilizing a conventional polarizing plate has a poor viewing angle characteristic. Thus, such a device is not suitable as a liquid crystal display device which is seen at a large angle (i.e., which is seen from various directions). For example, in the case where an initial orientation of liquid crystal molecules is a homeotropic orientation in an ECB liquid crystal display device, an orientation film is subjected to an orientation treatment so that the liquid crystal molecules tilt in one direction when applied with a voltage. Because of this, the liquid crystal molecules tilt in one direction in a half tone. Thus, when a liquid crystal molecule 121 is seen from an A direction and a B direction as shown in FIG. 44A, each apparent refractive index is different, and contrast seen from the respective directions is greatly different. In some cases, a display defect such as inversion phenomenon is caused. In this way, the conventional liquid crystal display device has a poor viewing angle characteristic.

Figure 44B:
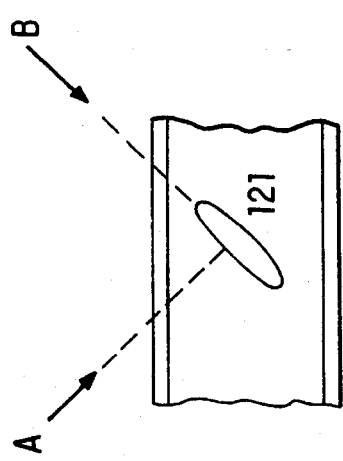
FIG. 44B is a view showing a state in which the ECB liquid crystal display device of Example 11 performs a ½ tone display.

On the other hand, in a liquid crystal display device (with a polarizing plate) in which a phase separation between liquid crystal and a polymer material is regularly conducted by using a photomask, the liquid crystal molecule 121 tilts toward each polymer wall 126 under a voltage applied, due to the interaction between the liquid crystal molecule 121 and the polymer wall 126 as shown in FIG. 44B. Thus, each apparent refractive index of a C direction and a D direction is almost the same, having great advantages in the improvement of a viewing angle characteristic. However, in this case, a very thin polymer film is formed between the liquid crystal molecules and the substrate in the liquid crystal regions, so that homeotropic orientation effects of the substrate are decreased, even though a homeotropic orientation film excellent in orientation regulating ability is used. Due to this, the homeotropic orientation of the liquid crystal molecules is slightly disturbed, and part of the light is passed through the cell under crossed Nicols, slightly decreasing contrast. Moreover, in the case of a mode utilizing a homeotropic orientation film, small liquid crystal droplets are formed in the polymer walls, the orientation state on the substrate is not reflected in the orientation of the liquid crystal molecules, and the liquid crystal molecules are in a random orientation. Therefore, part of the light is transmitted though the cell under crossed Nicols, remarkably decreasing apparent contrast. In the case of a ferroelectric liquid crystal display device, there is a problem of low shock resistance. This problem can be overcome by dispersing liquid crystal regions in the polymer walls; however, in this case, a phase separation is not clearly conducted making it difficult to regulate the orientation.

In Application 30, a homogeneous mixture containing a liquid crystal material and a polymerizable compound material (polymerizable compound having liquid crystallinity) is used and the polymerizable compound is cured in a liquid crystal state, whereby a phase separation is conducted between the liquid crystal and the polymer. According to this method, the liquid crystal and the polymer can be made in the same orientation state. In addition, if the polymerizable compound is cured in a liquid crystal state, the orientation state of the polymer walls as well as that of the liquid crystal regions can be maintained, so that the orientation of the liquid crystal regions becomes strong.

In particular, in the case of a general ECB liquid crystal display device, minute liquid crystal molecules are randomly aligned in the polymer walls, so that light is transmitted through the cell under crossed Nicols, decreasing contrast. On the other hand, in the case of Application 31, the liquid crystalline compound is contained in the polymer, and the compound has the same orientation as that of the liquid crystal material, so that light is hardly transmitted through the cell under crossed Nicols. Moreover, in the case of an ECB liquid crystal display device (with polarizing plates) to which Application 31 is applied, the liquid crystal molecules tilt in a random direction under an electrical field, due to the interaction between the polymer walls and the liquid crystal molecules. Therefore, the refractive index becomes the same, when seen from any direction, making the viewing angle characteristic in a half tone excellent.

APPLICATION 32

Application 32 is the case where contrast is improved, in addition to Application 30 in which the liquid crystal regions and the polymer walls have the same orientation state. In Application 32, a dichroic dye is used.

Hereinafter, a method for manufacturing a liquid crystal display device of Application 32 will be described.

A cell was formed so as to have a thickness of 9 μm in the same way as in Application 30. A mixture was prepared in the same way as in Application 30, except that a liquid crystal material in which 4% of a dichroic dye (S-301, manufactured by Mitsui Toatsu Chemicals. Inc.) was added to ZLI-2806 was used. A mixture containing the liquid crystal material and the other materials (e.g., a photopolymerization initiator) was checked for its transition temperature by a differential scanning calorimeter (DSC), leading to almost the same results as those of Application 30. Then, the mixture was injected into the cell at 48° C. and the cell was irradiated with UV-rays through a photomask, whereby the polymerizable material contained in the mixture was cured.

A substrate on which Al was vapor-deposited was placed on the cell thus obtained. Then, an optical source and an observation section were respectively placed in different positions at an angle of 30° from a vertical direction with respect to the cell, whereby an electro-optic characteristic as a reflective liquid crystal display device was measured.

Figure 45A:
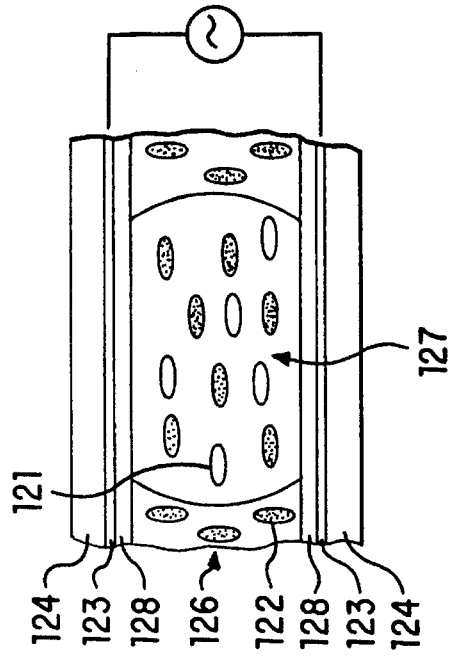
FIG. 45A is a view showing the orientation state of liquid crystal molecules in the GH liquid crystal display device of Example 11 under no applied voltage.
Figure 45B:
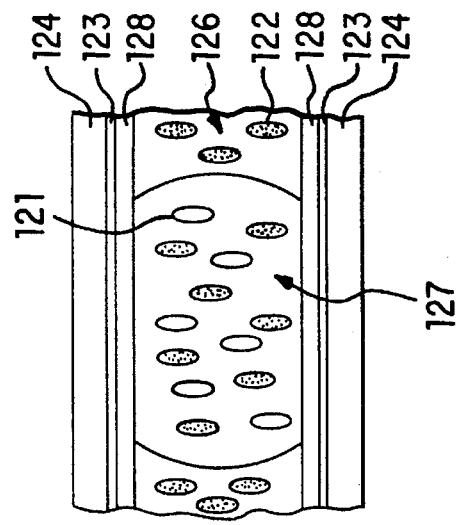
FIG. 45B is a view showing the orientation state of liquid crystal molecules in the GH liquid crystal display device of Example 11 under an applied voltage.

In the cell thus obtained, as shown in FIG. 45A, liquid crystal molecules 121 and a dichroic dye 122 in a liquid crystal region 127 and a polymer and the dichroic dye 122 in a polymer wall 126 were aligned in the same direction under no applied voltage, so that the whole area (i.e., the liquid crystal regions and the polymer walls) was in a colorless state. When a voltage was applied to electrodes 123, as shown in FIG. 45B, the liquid crystal molecules 121 and the dichroic dye 122 in the liquid crystal region 127 alone changed their orientation to be colored. In FIGS. 45A and 45B, the reference numeral 124 denotes a substrate, and 128 an orientation film. The contrast and saturation drive voltage of the liquid crystal display device of Application 32 were 7 and in the vicinity of 7 V, respectively. Moreover, the liquid crystal molecules tilt in an omnidirection under an applied voltage, so that contrast was uniform in an omnidirection.

COMPARATIVE EXAMPLE 29

A liquid crystal display device was manufactured as follows:

A substrate was subjected to a rubbing treatment in one direction by using a nylon cloth in the same way as in Application 32. Two substrates thus obtained faced each other so that each orientation direction was in an anti-parallel state. Then, ZLI-2806 (containing 4% of a dichroic dye S-301) was injected into the cell. Thus, a conventional liquid crystal display device of a GH mode was manufactured. In this device, the liquid crystal molecules tilted in one direction under a voltage applied, so that contrast was varied depending upon the observation direction, decreasing display characteristics.

As described above, in the case of Applications 30 and 32, the polymerizable material is cured in a liquid crystal state, so that the orientation direction of the liquid crystal layer can artificially be determined. When the polymerizable material is cured in a non-liquid crystal state as in Applications 28 and 29, a very thin polymer film is formed between the substrate and the liquid crystal layer. Therefore, the orientation regulating ability of the substrate is decreased, making it difficult to artificially determine the orientation of the liquid crystal layer. Moreover, in Applications 28 and 29, the polymer is not aligned, so that minute liquid crystal molecules entered from the liquid crystal regions into the polymer walls are randomly aligned since the molecules are aligned along the polymer walls, causing problems. For example, in the case where the liquid crystal display device is used under crossed Nicols, utilizing a homeotropic orientation film, the minute liquid crystal molecules in the liquid crystal regions are randomly aligned, so that light leakage is generated to decrease contrast. In the case of Applications 30 and 32, due to the thin polymer film entered between the substrate and the liquid crystal regions, the polymer is also aligned to be cured in the orientation direction of the substrate; as a result, the liquid crystal regions are aligned in the orientation direction of the substrate.

The liquid crystal display devices of Applications 30 and 32 can be applied to conventional liquid crystal display devices which require an orientation treatment, such as TN, GH, STN, ECB and FLC liquid crystal display devices. In particular, applications in ECB, GH, FLC liquid crystal display devices are effective. For example, when the liquid crystal display devices of Applications 30 and 32 are applied to an ECB liquid crystal display device, the viewing angle characteristic can be improved. That is, in an ECB mode, liquid crystal molecules are in a homeotropic orientation under no applied voltage (black state under crossed Nicols). When a voltage is applied, the liquid crystal molecules tilt (a white state is obtained due to birefringence). The liquid crystal molecules tilt in various directions due to the interaction between the liquid crystal molecules and the polymer, so that the refractive index becomes the same in any directions, whereby the viewing angle characteristic can be improved.

Even in the case of the ECB liquid crystal display device (with no polarizing plate) in which a dichroic dye is added, when the polymer walls are not aligned, the dichroic dye contained in the polymer walls takes a colored state in a random orientation and the orientation of the dichroic dye is not changed with respect to the application of an electrical field, decreasing overall contrast. On the other hand, in the case where the polymer is also aligned as in Applications 30 and 32, the dichroic dye contained in the polymer walls can also be in a homeotropic orientation state. Thus, in the polymer walls, a nearly transparent state as a whole is changed to a state in which only the dichroic dye is colored, and the dichroic ratio of the dichroic dye can be used to the full. Moreover, when the polymerizable compound material is cured by using a photomask, since the dichroic dye is contained in the mixture, light is not leaked into masking portions of the photomask. Therefore, regions where the polymer walls are to be formed are clearly limited. Furthermore, in this case, due to the electrical field, the polymer walls and the orientation ability of the liquid crystal, the liquid crystal molecules in a vertical direction are aligned in a horizontal direction with respect to the cell and in a random direction within a surface horizontal with respect to the cell. Thus, a reflective liquid crystal display device excellent in viewing angle characteristic can be manufactured.

In the application to a GH mode using liquid crystal to which a dichroic dye is added, the vertical direction and the horizontal direction of the liquid crystal molecules can electrically be switched, so that a dichroic ratio of the dichroic dye can be used to the full. Moreover, the dichroic dye contained in the polymer walls are in a homeotropic orientation, so that its molecules are aligned in a direction to be colorless. Thus, a colorless state as a whole can be electrically changed into a state in which only liquid crystal regions are colored.

In the application to an FLC liquid crystal display device, the liquid crystal molecules are more strongly aligned due to the uniaxially oriented polymer. Because of this, low shock resistance which is the most serious disadvantage of the FLC can be improved by the polymer walls. Furthermore, in the case where a FLC polymerizable material is used as a light-curable material, the FLC polymer also responds to the application of a voltage, and a half tone display can be realized because of the difference in the drive voltage between the FCL and the FLC polymer.

In Applications 30 and 32, the polymerizable material contained in the mixture is cured in a liquid crystal state. Examples of the liquid crystal state include a nematic phase, smectic phase, and a cholesteric phase.

Hereinafter, materials applicable to the present examples will be described.

A Polymerizable Liquid Crystalline Compound

As a polymerizable liquid crystalline compound, the compound X is used In Applications 28, 30 and 32 and the compound Y is used in Application 29. The present invention is not limited thereto. A general compound represented by the following Formula (3) can be used.

$$A\text{--}B\text{--}LC \quad (3)$$

In Formula (3), Letter A represents a polymerizable functional group. Examples thereof include functional groups having unsaturated bonds such as $CH_2=CH-$, $CH_2=CH-COO-$, $CH_2=C(CH_3)-COO-$, and $-N=C=O$, and functional groups having a heterocyclic structure with strain such as a structure represented by the following Formula (4).

Letters LC represent a liquid crystalline compound. Examples thereof include a compound represented by the following Formula (5), a cholesterol ring, and derivatives thereof.

$$D\text{--}S\text{--}G \quad (5)$$

Letter B represents a coupling group connecting the polymerizable functional group to the liquid crystalline compound. Examples thereof include an alkyl chain ($-(CH_2)_n-$), an ester bond ($-COO-$), an ether bond ($-O-$), a polyethylene glycol chain ($-CH_2CH_2O-$), and coupling groups obtained by combining these coupling groups. In particular, in order that the liquid crystalline compound can easily move on the polymer walls in response to the electrical field, a coupling group having 6 or more bonds from the polymerizable functional group to the fixed portion of the liquid crystal molecules is preferred.

In the case where the polymer walls are also aligned, it is preferred that the liquid crystalline compound exhibits liquid crystallinity when mixed with the liquid crystal material.

In Formula (5), Letter D represents a functional group capable of being bound to the coupling group represented by Letter B, and has a function of influencing the degree of anisotropy of dielectric constant of the liquid crystal molecules and that of the anisotropy of refractive index. Examples thereof include a p-phenyl ring, a 1,10-diphenyl ring, a 1,4-cyclohexane ring, a 1,10-phenylcyclohexane ring, a naphthalene ring, and a tarphenyl ring. G represents a polar group which makes the anisotropy of dielectric constant of the liquid crystal exhibited. Examples thereof include a benzene ring, a cyclohexane ring, a p-diphenyl ring, a phenylcyclohexane ring, a tarphenyl ring, and a diphenylcyclohexane ring, each having a functional group such as $-CN$, $-OCH_3$, $-F$, $-Cl$, $-OCF_3$, $-OCCl_3$, $-H$, $-R$ (R: alkyl group). E represents a functional group connecting D to G. Examples thereof include a single bond, $-CH_2-$, $-CH_2CH_2-$, $-O-$, a triple bond of carbon-carbon, and $-CH=CH-$.

A Liquid Crystal Material

The liquid crystal material as that of Example 2 can be used.

A Polymerizable Material

A light-curable material (photopolymerizable material), a thermosetting material (heat-polymerizable material), and the like can be used. As a light-curable material, there are acrylic acids and acrylic esters having a long chain alkyl group with three or more carbons or having a benzene ring. Examples of the light-curable material include isobutyl acrylate, stearyl acrylate, lauryl acrylate, isoamyl acrylate, n-butyl methacrylate, n-lauryl methacrylate, tridecyl methacrylate, 2-ethylhexyl acrylate, n-stearyl methacrylate, cyclohexyl methacrylate, benzyl methacrylate, 2-phenoxyethyl methacrylate, isobornyl acrylate, and isobornyl methacrylate. In addition, in order to increase the physical strength of the polymer, mult-functional materials having two or more functional groups can be used. Examples of the mult-functional materials include bisphenyl A dimethacrylate, bisphenol A diacrylate, 1,4-butanediol dimethacrylate, 1,6-hexanediol dimethacrylate, trimethylol propane trimethacrylate, trimethylol propane triacrylate, tetramethylolmethane tetraacrylate, and neopentyl diacrylate. More preferably, material obtained by halogenating, in particular, chlorinating or fluorinating these monomers are used. Examples thereof include 2,2,3,4,4,4-hexaphlorobutyl methacrylate, 2,2,3,4,4,4-hexachlorobutyl methacrylate, 2,2,3,3-tetraphloropropyl methacrylate, 2,2,3,3-tetraphloropropyl methacrylate, perphlorooctylethyl methacrylate, perchlorooctylethyl methacrylate, perphlorooctylethyl acrylate, and perchlorooctylethyl acrylate.

As the thermosetting compound, the above-mentioned light-curable materials and compounds having an epoxy group, an isocyanate group, etc. in its molecules can be used. Examples of the light-curable compound include bisphenol A type epoxy compounds, bisphenol A diglycidyl ether, bisphenol F diglycidyl ether, hexahydrobisphenol A diglycidyl ether, propylene glycol diglycidyl ether, neopentyl glycol diglycidyl ether, diglycidyl ester phthalate, triglycidyl isocyanate, and tetraglycidylmethaxylene diamine.

These monomers can be used alone or in a combination of two or more kinds. Moreover, compounds which have both a light-curable property and heat-curable property can be used. Among the light-curable or heat-curable compounds, in the case where fluorinated compounds having the effects of reducing hysteresis and increasing the response speed are used, the interaction between the liquid crystal regions and the polymer walls can be decreased.

As the dichroic dye used in the present invention, both N-type and P-type dyes can be used. Examples of the dichroic dye include a merocyanine type, an anthraquinone type, a styryl type, and an azobenzene type. The added amount of the dichroic dye is in the range of 0.5% to 10% by weight based on the weight of the liquid crystal, preferably in the range of 1% to 5%. Moreover, it is also possible to use another dye for coloring together with the dichroic dye; however, in some cases, sufficient contrast cannot be obtained due to the light absorption effects.

When the liquid crystalline compound having a polymerizable functional group in its molecule is selected, it is preferred in terms of compatibility that portions exhibiting liquid crystallinity of the liquid crystal material and those of the polymerizable liquid crystalline compound are similar to each other. In particular, when a fluorine and/or chlorine type liquid crystal material (which has specific chemical environment) is used, it is preferred that a fluorine and/or chlorine type liquid crystal material is used as a liquid crystalline compound having a polymerizable functional group. Moreover, in the case where ferroelectric crystal is used, a polymerizable compound having ferroelectric liquid crystal in its molecule is preferred for forming a stable smectic phase.

The Weight Ratio Of Liquid Crystal and a Polymerizable Compound

The weight ratio of the liquid crystal and the polymerizable compound is preferably in the range of 50:50 to 97:3, more preferably in the range of 70:30 to 90:10. When the percentage of the liquid crystal material is less than 50%, the ratio occupied by the polymer walls increases, resulting in a remarkable rise in the drive voltage of the cell. Thus, practicality is lost. In contrast, when the percentage of the liquid crystal material is more than 97%, the physical strength of the polymer walls decreases. Thus, stable performance cannot be obtained.

Moreover, in the case where a polymerizable liquid crystalline compound and a polymerizable non-liquid crystalline compound are mixed, it is preferred that the weight ratio thereof is within the above-mentioned range and the percentage of the polymerizable liquid crystalline compound is 0.5% or more. In particular, in the case where ferroelectric liquid crystal is used, a ferroelectric liquid crystal display device capable of performing a half tone display can be manufactured as follows:

The percentage of the polymerizable liquid crystalline compound is made 70% or more, whereby two regions, i.e., a low molecular liquid crystal region and a polymer liquid crystal region are formed. Then, a voltage is adjusted to a value at which each compound is driven.

A Photopolymerization Initiator Or Catalyst

A reaction initiator includes a photopolymerization initiator, a heat polymerization initiator, etc. As the photopolymerization initiator, Irgacure 184, Irgacure 651, Irgacure 907, Darocure 1173, Darocure 1116, Darocure 2959, and the like can be used. As the heat polymerization initiator, peroxides such as biphenyl peroxide and t-butyl peroxide; and a radical generating agent such as AIBN can be used. Moreover, the added amount of the polymerization initiator(s) is varied depending upon the reactivity of each compound. There is no special limit in the present example. It is preferred that the added amount of the photopolymerization initiator(s) is in the range of 0.01% to 5% based on the total amount of a mixture of liquid crystal and a light-curable material (containing polymerizable liquid crystalline material). When the added amount is more than 5%, the phase separation speed between the liquid crystal and the polymer is too high to be regulated. As a result, liquid crystal regions become small, the drive voltage is increased, the orientation regulating ability of the orientation film on the substrate is decreased, less liquid crystal regions are formed in pixels (liquid crystal regions are formed in the masking portions in the case where a photomask is used), and contrast is decreased. In contrast, when the added amount is less than 0.01%, the polymerizable material cannot be sufficiently cured.

An Orientation Film

As a material for the orientation film, organic films such as polyimide (SE 150, manufactured by Nissan Chemical Industries Ltd.; Cytop, manufactured by Asahi Glass Co., Ltd., etc.) and inorganic films such as SiO can be used. If required, the orientation film is subjected to a rubbing treatment.

In Example 11, items described in Example 2: A light regulating means such as a photomask, Irradiation light, etc. can be applicable.

EXAMPLE 12

Example 12 is the case where the response speed and the electrical holding ratio of a non light scattering type liquid crystal display device are increased by taking advantage of the mixture.

The mixture to be used in the liquid crystal display device of the present example is formed of a liquid crystal material, a polymerizable liquid crystalline compound, a photopolymerizable compound, and a photopolymerization initiator; or a liquid crystal material, a polymerizable liquid crystalline compound, a heat polymerizable compound, and a heat polymerization initiator.

The liquid crystal material and the polymerizable liquid crystalline compound are selected so that the product of anisotropy of dielectric constant $\Delta\epsilon_L$ and a polymerizable liquid crystal compound $\Delta\epsilon_p$ (i.e., $\Delta\epsilon_L \neq \epsilon_p$) becomes negative. The purpose of this condition is that a liquid crystalline polymer is supported by polymer walls when the photo- or heat-polymerizable compound and the polymerizable liquid crystalline compound are cured. In this structure, the interfaces between the liquid crystal regions and the polymer walls are driven under an applied voltage. When a voltage is not applied, the interaction between the liquid crystalline polymer and the polymer walls is increased since the end portions (polymerizable functional groups) of the liquid crystalline polymer and the polymer walls are bonded to each other. Then, the orientation is disturbed between the liquid crystalline polymer and the liquid crystal molecules in the liquid crystal regions, so that the liquid crystal molecules immediately return to the orientation in a light scattering state. As a result, the response speed of the liquid crystal display device can be improved. The anisotropy of dielectric constant is an intrinsic property of the liquid crystalline functional group and does not change before and after the polymerization reaction, so that the anisotropy of the dielectric constant of the polymerizable liquid crystalline compound and that of the polymerized liquid crystalline compound are the same. Moreover, even in the case where the liquid crystal material and the polymerizable liquid crystalline compound which have a fluorine atom(s) and/or a chlorine atom(s) in its molecule and have a weak interaction therebetween are used, an element of a charge holding type such as a TFT can be applied to the liquid crystal display device due to the chemical stability inherent in these materials without decreasing the electrical holding ratio of the device itself.

In the case where the polymerizable liquid crystalline compound and the heat polymerizable compound are thermally polymerized in the present example, if a response speed is low, polymerized ends are formed in the liquid crystal regions, resulting in the formation of the polymer walls in the liquid crystal regions and decreasing contrast. Thus, it is preferred that the reaction system and reaction conditions which make the polymerization reaction complete within 10 minutes are selected.

Hereinafter, materials and the like applicable to the present example will be described.

A Polymerizable Material

The respective polymerizable compounds described: A polymer material in Example 11 can be used as the photopolymerizable compound and the heat polymerizable compound.

A Weight Ratio Of the Liquid Crystal Material With Respect To the Polymerizable Compound, Etc.)

The mixed ratio of the liquid crystal material with respect to the polymerizable liquid crystalline compound and the photo- or heat-polymerizable compound is preferably in the range of 50:50 to 97:3 (weight ratio), more preferably in the range of 70:30 to 90:10 (weight ratio). When the mixed ratio of the liquid crystal material is less than 50% by weight, a great number of polymer walls are formed, remarkably increasing the drive voltage of the liquid crystal display device, resulting in a loss of practicability of the device. When the mixed ratio of the liquid crystal material is more than 97% by weight, the physical strength of the polymer walls to be formed is decreased, making it difficult to obtain stable performance. Thus, these cases are not preferred. Under the condition of the above-mentioned range, it is preferred that the polymerizable liquid crystalline compound is made 0.05% or more by weight based on the total weight of the polymerizable liquid crystalline compound and the photo- or heat-polymerizable compound.

A Polymerization Initiator

A general photo- or heat-polymerization initiator can be used. Examples of the photopolymerization initiator include Irgacure 184, Irgacure 651, Irgacure 907, Darocure 1173, Darocure 1116, Darocure 2959, etc. Examples of the heat polymerizable initiator include peroxides such as benzoperoxide (BPO), t-butyl peroxide; and azo compounds such as azobis(isobutylonitrile) (AIBN). It is preferred that the mixed ratio of the photo- or heat-polymerizable initiator is in the range of 0.3 to 5% by weight based on the total weight of the liquid crystal material, the polymerizable liquid crystalline compound and the photo- or heat-polymerizable compound. When the mixed ratio is less than 0.3% by weight, there is a possibility that the polymerization reaction does not sufficiently start. Thus, this ratio is not preferred. When the mixed ratio is more than 5% by weight, the phase separation speed between the liquid crystal and the polymer is too high to regulate the size of the liquid crystal regions; as a result, small liquid crystal regions are formed, increasing the drive voltage. Thus, this ratio is not preferred.

The present example will be described by way of illustrating Applications.

APPLICATION 33

The liquid crystal display device of Application 33 has the same structure as that shown in FIG. 35. A method for manufacturing this liquid crystal display device is as follows:

First, a polymerizable liquid crystalline compound Z (with the anisotropy of dielectric constant $\Delta\epsilon<0$) shown by the following Formula (6) was prepared in the following manner: 4'-hydroxy-2, 3-difluorobiphenyl and excess 1,10-dibromodecane were etherificated in the presence of calcium carbonate. The resulting ether was purified by column chromatography. After that, the purified substance was mixed with equimolar tetramethylammoniumhydroxypentahydrate, and acrylic acid was added to this mixture to obtain the polymerizable liquid crystalline compound Z represented by Formula (6):

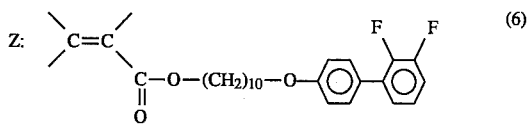

Next, the electrode lines 73 and 74 made of ITO (a mixture of indium oxide and tin oxide) were formed on the substrates 71 and 72, respectively. In the present application, a PET film with a thickness of 0.25 mm was used as the substrates 71 and 72, and the electrode lines 73 and 74 respectively having a width of 200 μm were formed with an interval of 50 μm between each electrode line. The respective number of the electrode lines 73 and 74 was 20. Then, the orientation films 75 and 76 were coated so as to cover the electrode lines 73 and 74 by a spin coating method. The orientation films 75 and 76 were subjected to a rubbing treatment in one direction. In Application 33, polyimide (SE150, manufactured by Nissan Chemical Industries Ltd.) was used as the orientation films 75 and 76. These substrates 71 and 72 face each other with spacers having a diameter of 6 μm sandwiched therebetween so that the electrode lines 73 and 74 faced and crossed each other. Thus, a liquid crystal cell was formed.

Next, the photomask 79 was placed outside the substrate 72 so that masking portions of the photomask 79 covered the pixels. Then, 0.85 g of a photopolymerizable compound, 0.05 g of the polymerizable liquid crystalline compound Z, 4 g of a liquid crystal material, and 0.15 g of a photopolymerization initiator were homogeneously mixed to obtain a mixture 80. The mixture 80 was injected into the cell. In Application 33, as the photopolymerizable compound, 0.1 g of trimethylol propane trimethacrylate, 0.30 g of 2-ethylhexyl acrylate, and 0.45 g of isobornyl acrylate were used. As the liquid crystal material, a mixture in which 0.3% of cholesteric nanonate (CN) was added to ZLI-4792 (manufactured by Merck & Co., Inc., where, the anisotropy of dielectric constant is $\Delta\epsilon>0$) was used. As the photopolymerization initiator, Irgacure 184 was used.

Then, the cell was irradiated with UV-rays through the photomask 79 at 10 mW/cm$^2$ for 5 minutes by using a high-pressure mercury lamp which can provide parallel rays, whereby the photopolymerizable compound and the polymerizable liquid crystalline compound were cured.

One substrate was peeled off from the other substrate in liquid nitrogen. Then, the liquid crystal material was washed away with acetone. A cross-section of the polymer walls was observed by the SEM, revealing that liquid crystal regions with the same regularity as that of the photomask 79 (i.e., the same regularity as that of the pixel distribution) were uniformly formed, each liquid crystal region having almost the same size.

Two polarizing plates were attached to the cell thus obtained so that the respective polarizing directions were aligned with the orientation directions of the corresponding orientation films, whereby a TN liquid crystal display device was obtained.

COMPARATIVE EXAMPLE 30

Glass with ITO (flint glass with ITO having a thickness of 500 Angstroms, manufactured by Nippon Sheet Glass Co., Ltd.) was used as the substrates 71 and 72 of Application 33. A liquid crystal material (ZLI-4792 to which 3% of CN was added, manufactured by Merck & Co., Inc., where the anisotropy of dielectric constant is $\Delta\epsilon>0$) was injected into the liquid crystal cell, whereby a conventional liquid crystal display device which was not a polymer dispersed type was manufactured.

COMPARATIVE EXAMPLE 31

A liquid crystal display device was manufactured in the same way as in Application 33, except that the photomask 79 was not used.

Table 19 shows a comparison of contrast characteristics obtained in Application 33, and Comparative Examples 30 and 31. Contrast is taken as $T_0 T_{sat}$, where $T_0$ is light transmittance obtained under no applied voltage and $T_{sat}$ is light transmittance obtained under an applied saturation voltage. Here, light transmitted through a liquid crystal panel is detected by a detector with a converging angle of 6°, using a metal halide lamp as an optical source, whereby contrast is measured.

TABLE 19

| Comparison of contrast characteristics | | | |
|---|---|---|---|
| | Application 33 | Comparative Example 30 | Comparative Example 31 |
| Contrast | 41 | 41 | 9 |

As is understood from Table 19, the liquid crystal display device of Application 33 has an electro-optic characteristic comparable to that of the conventional liquid crystal display device of Comparative Example 30. In addition, in Application 33, the polymer walls can be formed having a regularity with respect to the pixels by using the photomask. Compared with the liquid crystal display device of Comparative Example 31 manufactured without using a photomask, the number of the interfaces between the polymer walls and the liquid crystal regions are greatly decreased, so that light scattering is sufficiently reduced between the polymer walls and the liquid crystal regions.

APPLICATION 34

A liquid crystal cell was formed in the same way as in Application 33, except that glass with ITO (flint glass with ITO having a thickness of 500 Angstroms, manufactured by Nippon Sheet Glass Co., Ltd.) was used as the substrates 71 and 72 and plastic beads with a diameter of 12 μm were sandwiched as spacers between the substrates 71 and 72.

Then, the photomask 79 was placed in the same way as in Application 33. The mixture 80 was prepared in the same way as in Application 33, except that 0.01 g of trimethylol propane trimethacrylate and 0.08 g of isobornyl acrylate as the photopolymerizable compound, 0.01 g of the polymerizable liquid crystalline compound Z, 0.4 g of ZLI-4792 (manufactured by Merck & Co., Ltd., where the anisotropy of dielectric constant is $\Delta\epsilon>0$) as the liquid crystal material, and 0.015 of Irgacure 651 as the photopolymerization initiator were used. Then, the cell was irradiated with UV-rays through the photomask 79 at 40 mW/cm² for 2 minutes by using a high-pressure mercury lamp, whereby the polymerizable compound and the polymerizable liquid crystalline compound were cured to obtain a liquid crystal display device.

COMPARATIVE EXAMPLE 32

A liquid crystal display device was manufactured in the same way as in Application 34, except that a mixture containing 0.01 g of trimethylol propane trimethacrylate and 0.09 g of isobornyl acrylate as the photopolymerizable compound, 0.4 g of ZLI-4792 (manufactured by Merck & Co., Inc., where the anisotropy of dielectric constant is $\Delta\epsilon>0$) as the liquid crystal material, and 0.015 g of Irgacure 651 as the photopolymerization initiator was used instead of the mixture 80 used in Application 34.

COMPARATIVE EXAMPLE 33

A liquid crystal display device was manufactured in the same way as in Application 34, except that a mixture containing 0.01 g of trimethylol propane trimethacrylate and 0.09 g of isobornyl acrylate as the photopolymerizable compound, 0.4 g of E7 (manufactured by Merck & Co., Inc., where the anisotropy of dielectric constant is $\Delta\epsilon>0$) as the liquid crystal material, and 0.015 g of Irgacure 651 as the photopolymerization initiator was used instead of the mixture 80 used in Application 34.

Table 20 shows the results obtained by measuring contrast, response speed, and the electrical holding ratio of the liquid crystal display device of Application 34 and those of Comparative Examples 32 and 33. The contrast is taken as $T_{sat}/T_0$ (converging angle: 6°) in the same way as in Application 33. The response speed is taken as the sum of times $\tau_r$ and $\tau_d$, where $\tau_r$ is the time required for light transmittance to change from $T_0$ to $0.9 \times T_{sat}$ while the voltage is increased from 0 to 10 V, when a voltage is applied to a liquid crystal panel by being changed from 0 V→10 V→0 V; and $\tau_d$ is a time required for light transmittance to change from $T_{sat}$ to $0.9 \times T_0$ while a voltage is changed from 10 V to 0 V, when a voltage is applied to a liquid crystal panel by being changed from 0 V→10 V→0 V. If this value is smaller, the response speed is higher. The electrical holding ratio is taken as a ratio of the amount of charge retained for 16.5 ms with respect to the initial charge amount, when 5 V voltage with a rectangular wave is applied to the liquid crystal panel. For example, when the charge is not leaked out of the liquid crystal panel at all, the electrical holding ratio is 100%.

TABLE 20

| Comparison of electro-optic characteristics | | | |
|---|---|---|---|
| | Application 34 | Comparative Example 32 | Comparative Example 33 |
| Contrast | 8 | 8 | — |
| Response speed (ms) | 45 | 185 | — |
| Electrical holding ratio (%) | 98.2 | 98.0 | 82.4 |

As is understood from Table 20, the liquid crystal display device of Application 34 has a high response speed and a satisfactory electrical holding ratio. However, the liquid crystal display device of Comparative Example 32 has a low response speed. In Comparative Example 33, the drive voltage of the liquid crystal display device is 20 V or more, so that contrast and a response speed cannot be measured, and its electrical holding ratio is not satisfactory.

Hereinafter, materials and the like applicable to Applications 33 and 34 will be described.

A Liquid Crystal Material

The liquid crystal material described: A liquid crystal material in Example 2 can be used.

A Polymerizable Liquid Crystalline Compound

The polymerizable liquid crystal line compound described: A polymerizable liquid crystalline compound in Example 11 can be used.

In the case where the polymerizable liquid crystal line compound used in the present example has positive anisotropy of dielectric constant ($\Delta\epsilon_L > 0$), a functional group of the compound G represented by Formula (5) is positioned so that anisotropy of dielectric constant $\Delta\epsilon_p$ of the polymerizable liquid crystalline compound becomes negative. Examples of the compound G having such a functional group include 2-substitution product, 3-substitution product, 2,3-substitution product, etc. of a benzene ring. In the case where the liquid crystal material has negative anisotropy of dielectric constant ($\Delta\epsilon_L < 0$), a functional group of the compound G is positioned so that the anisotropy of dielectric constant $\Delta\epsilon_p$ of the polymerizable liquid crystalline compound becomes positive. Examples of compounds having such a functional group include 4-substitution product, 3,4,5-substitution product, 3,4-substitution product, etc. of a benzene ring. When a plurality of functional groups of these substitution products are present in the same substitution product, the kind of a plurality of functional groups is not limited to one. Moreover, in either of the above-mentioned cases, only one kind of the polymerizable liquid crystalline compound can be used or a plurality of the polymerizable liquid crystalline compounds can be used. When the polymerizable liquid crystalline compound having the above-mentioned structure is polymerized, a liquid crystalline polymer obtained as a result of the polymerization has a liquid crystalline functional group LC in liquid crystal regions and a polymerizable functional group A in polymer walls, whereby the liquid crystalline polymer is fixed on the polymer walls.

Conditions For Selecting a Liquid Crystal Material and a Polymerizable Liquid Crystalline Compound It is preferred in terms of compatibility that the liquid crystal material and the polymerizable liquid crystalline compound are selected so that respective portions exhibiting liquid crystallinity are similar to each other. In particular, in the case where a liquid crystal material of a fluorine type and/or a chlorine type, which has an intrinsic chemical environment, is selected, it is preferred to select a polymerizable liquid crystalline compound of a fluorine type and/or a chlorine type.

APPLICATION 35

First, 0.1 g of the polymerizable liquid crystalline compound Z of Application 33 and 0.01 g of benzoperoxide (BPO) were dissolved in toluene, followed by being polymerized at 100° C. for 2 hours. Then, ethanol was added to this mixture to obtain a polymer. The polymer thus obtained was washed with ethanol to obtain a liquid crystalline polymer Z' (which is a polymer of the polymerizable liquid crystalline compound Z).

Next, 2 g of E8 (manufactured by Merck & Co., Inc., where the anisotropy of dielectric constant is $\Delta\epsilon > 0$) and 0.01 g of the liquid crystalline polymer Z' as a liquid crystal material, and 0.5 g of polymethyl methacrylate (PMA, manufactured by Asahi Kasei Kogyo K.K.) as a polymer other than the liquid crystalline polymer were dissolved in chloroform, whereby a solution with a solute concentration of 15% by weight was prepared. This solution was coated onto the substrate 71 by a bar coating method, followed by being dried to form a film with a thickness of 12 to 13 μm. After that, the substrate 72 was placed on the substrate 71 to obtain a liquid crystal panel. In Application 35, glass with ITO (flint glass with ITO having a thickness of 500 Angstroms, manufactured by Nippon Sheet Glass Co., Ltd.) was used as the substrates 71 and 72.

COMPARATIVE EXAMPLE 34

A liquid crystal display device was manufactured in the same way as in Application 35, except that the liquid crystalline polymer Z' was not used.

Table 21 shows the results obtained by measuring contrast and response speed of the liquid crystal display devices of Application 35 and Comparative Example 5. The response speed is measured in the same way as in Application 34, except that the 10 V voltage in Application 34 is made 20 V. The contrast is measured in the same way as in Application 33.

TABLE 21

| | Comparison of electro-optic characteristics | |
|---|---|---|
| | Application 35 | Comparative Example 34 |
| Contrast | 70 | 69 |
| Response speed (ms) | 53 | 202 |

As is understood from Table 21, the liquid crystal display device of Application 35 has satisfactory contrast and a high response speed. On the other hand, the liquid crystal display device of Comparative Example 34 has a low response speed.

In the manufacturing of the liquid crystal display device of Application 35, a mixture to be coated onto one substrate is formed from a liquid crystal material, a polymerizable liquid crystalline material, and a solvent which homogeneously dissolves the liquid crystal material and the polymerizable liquid crystalline material. After this mixture is coated onto one substrate, the solvent is removed by evaporation from the mixture.

In Application 35, a liquid crystal material and a liquid crystalline polymer which satisfy the same conditions as those applied to the liquid crystal material and the polymerizable liquid crystalline compound in Applications 33 and 34 were used. Examples of the liquid crystal material used in Application 35 include E7 and E8 (manufactured by Merck & Co., Inc.). Examples of the liquid crystalline polymer used in Application 35 include polymers having a liquid crystalline functional group attracted to a side chain, which are disclosed in Japanese Laid-Open Patent Publication No. 3-195796. Preferably, polymerized liquid crystalline compounds used for manufacturing the liquid crystal display device of Application 33 can be used.

Examples of the solvent include chloroform, toluene, xylene, and cyclohexane. It is preferred that the solvent is mixed in an amount in the range of 0.01 to 10% by weight.

In addition to the above-mentioned polymerizable liquid crystalline compounds, if required, it is possible to add polymers such as polystyrene, polyvinyl alcohol, polyvinyl acetate, methyl polymethacrylate, nitrocellulose, polycarbonate, polyphenylene oxide, polymethyl methacrylate (PMMA), etc. for the purpose of improving the physical strength of the polymer walls. In Application 35, polymethyl methacrylate is added. It is preferred that the mixed ratio of the polymer for improving the physical strength of the polymer walls is 0.1% by weight based on the total weight of the liquid crystalline polymer and the polymer for improving the physical strength of the polymer walls.

A liquid crystal display device with a structure in which the liquid crystal is confined in the polymer walls (or the liquid crystal is partially partitioned by the polymer walls) can be obtained by sandwiching the liquid crystal cell of the present example by two polarizing plates. This liquid crystal display device can be applied to conventional display systems such as TN, STN, FLC (SSF) and ECB systems. In addition, in the present example, a large screen and a substrate in a film shape are made possible.

In Example 12, items described in Example 2: A light regulating means such as a photomask, Irradiation light, etc. can be applicable.

EXAMPLE 13

In Example 13, peeling phenomenon between the substrate and the polymer dispersed liquid crystal material, which has been a problem in a conventional polymer dispersed liquid crystal display device, is prevented, response speed is made high, and hysteresis is reduced by decreasing monomers remaining in a liquid crystal display device.

First, a mixture injected between facing substrates is irradiated with UV-rays. The mixture contains a liquid crystal material, a photosetting compound, a photopolymerization initiator, and a radical generating agent. Due to this, a display medium in which liquid crystal droplets are dispersed in polymer walls can be obtained. After that, the display medium is heated to thermally decompose the radical generating agent. As a result, a radical is generated from the radical generating agent, and a remaining monomer before heating is polymerized by the radical to decrease the remaining monomer.

The polymer dispersed liquid crystal display device of Example 13 has the same structure as that shown in FIG. 35. This device is manufactured as follows:

First, the electrode lines 73 and the orientation film 75 are formed on the substrate 71, and the electrode lines 74 and the orientation film 76 are formed on the substrate 72. Alternatively, the substrates 71 and 72 which have the above-mentioned structures are provided.

Next, the substrates 71 and 72 are layered on top of the other so that the orientation films 75 and 76 are made to face each other, and a homogeneous mixture containing a liquid crystal material, a polymerizable compound, a photopolymerization initiator, and a radical generating agent is injected between the substrates 71 and 72.

Then, a photomask having a dot pattern as shown in FIG. 43 is placed on one of the substrates 71 and 72. Under this condition, the mixture is irradiated with UV-rays through the photomask. The photomask have masking portions corresponding to crossed regions of the electrode lines 73 and 74. Because of this, the polymerizable compound is cured, and a phase separation occurred between the liquid crystal and the polymer. As a result, a display medium in which the liquid crystal regions 78 are partitioned by the polymer walls 77 is formed between the substrates 71 and 72. The liquid crystal regions 78 are formed in regions corresponding to the masking portions. At this time, the size of the liquid crystal regions 78 can be regulated by adjusting the light-irradiated regions.

Then, the display medium is heated to thermally decompose the radical generating agent. Due to this, a radical is generated from the radical generating agent, and a remaining monomer before heating is polymerized by the radical, whereby the remaining monomer is decreased. Thus, the polymerization ratio is increased.

Thus, in the present example, the mixture injected between the facing substrates 71 and 72 is irradiated with UV-rays to obtain a display medium in which the liquid crystal regions 78 are dispersed in the polymer walls 77. After that, the remaining monomer is polymerized by heating. Thus, the remaining monomer can be reduced. In the present example, the peeling between the substrates 71 and 72 and the polymer dispersed liquid crystal material, which is considered to be caused by the remaining monomer can be prevented. Moreover, the response speed and hysteresis can be improved.

It is preferred that the percentage of the remaining monomer (remaining monomer ratio Z) is 10% or less. More preferably, the ratio is in the range of 0.5% to 5%. Here, the remaining monomer ratio Z is calculated by the following equation:

*Remaining monomer ratio* $Z=(X/X_0)\times 100$ where X is a ratio of the light absorption of >C=C< (in the vicinity of 800 and 1600 cm$^{-1}$) in the photopolymerizable material and the light absorption of a carbonyl group (in the vicinity of 1700 cm$^{-1}$) of an ester in an infrared absorption spectrum of the polymer material obtained by excluding the liquid crystal material from the polymer dispersed liquid crystal material; and $X_0$ is a ratio of the light absorption of >C=C< (in the vicinity of 800 and 1600 cm$^{-1}$) in the photopolymerizable material and the light absorption of a carbonyl group (in the vicinity of 1700 cm$^{-1}$) of an ester before the polymerization in an infrared absorption spectrum of the polymer material obtained by excluding the liquid crystal material from the polymer dispersed liquid crystal material.

The photopolymerizable material which is generally used is acrylate or methacrylate derivatives. In the above equation, $X_0$ is almost constant, so that $X_0=3$ is used in the present example.

The reason why the remaining monomer ratio Z should be 10% or less is as follows:

When a polymer dispersed liquid crystal display device is manufactured only by general photopolymerization, the remaining monomer ratio exceeds 10%. When a great amount of multifunctional monomer is used, a network structure of the polymer material develops to increase the amount of monomer remaining in the network structure and the amount of contracted polymer material. Thus, the peeling and the like are caused between the substrate and the polymer dispersed liquid crystal material. In contrast, when the remaining monomer ratio is less than 0.5%, peroxides used in the present example should be added in a great amount. As a result, there is a possibility that the liquid crystal material is deteriorated, decreasing reliability.

Hereinafter, materials and the like applicable to the present example will be described.

A Liquid Crystal Material

The liquid crystal material described: A liquid crystal material of Example 2 can be used. More preferred examples include compounds having a photopolymerizable group such as a methacrylate group or an acrylate group and a thermosetting group such as an isocyanate group or an epoxy group. Specific examples include 2-isocyanateethyl acrylate, 2-isocyanateethyl methacrylate, and a compound represented by the following Formula (7):

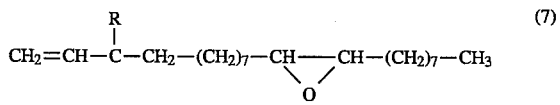

(7)

A Polymerizable Liquid Crystalline Material

The liquid crystal material described: A polymerizable liquid crystalline compound of Example 11 can be used.

The polymerizable liquid crystalline material is added for the purpose of making clear the phase separation and increasing response speed. Examples of the polymerizable liquid crystalline material include compounds having in its molecule a polymerizable functional group such as an acrylate group and a methacrylate group and a rigid functional group exhibiting liquid crystallinity.

It is preferred in terms of compatibility that the liquid crystal material and the liquid crystalline compound having a polymerizable functional group in its molecule are selected so that the respective portions of the liquid crystal material and the liquid polymerizable crystalline compound, exhibiting liquid crystallinity are similar to each other. In particular, in the case of liquid crystal materials of a fluorine type and/or a chlorine type which have specific chemical environment, it is preferred to select a liquid crystalline compound having a polymerizable functional group of a fluorine type and/or a chlorine type.

In the case where ferroelectric liquid crystal is used, it is preferred to use a polymerizable compound having ferroelectric liquid crystal in its molecule in order to form a stable smectic phase.

Regarding the weight ratio of a compound having liquid crystallinity and a polymerizable nonliquid crystalline compound, it is preferred that the percentage of the compound having liquid crystallinity is 0.5% or more. In particular, in the case where ferroelectric liquid crystal is used, two regions (i.e., low molecular liquid crystal regions and polymer liquid crystal regions) are formed by making the amount of compound having liquid crystallinity 100%. Moreover, a voltage is used so as to drive the respective compounds (i.e., low molecular liquid crystal and polymer liquid crystal regions). In this way, a ferroelectric liquid crystal display device capable of performing a tone display can be manufactured.

Weight Ratio Of Liquid Crystal and a Polymerizable Compound

Same as that of Example 11.

Structure Of a Polymer Dispersed Liquid Crystal Display Device

A structure in which a liquid crystalline compound (polymer) is fixed on polymer walls is preferred for making clear the phase separation and increasing the response speed. Due to this structure, the interfaces between the liquid crystalline and the polymer walls are driven by the application of a voltage. Under no applied voltage, the interaction between the liquid crystalline polymer and the polymer walls is increased, since the liquid crystal and the liquid crystalline polymer are bonded to each other. Thus, the response speed ($\tau_r$) under an applied voltage and the response speed ($\tau_d$) under no applied voltage can be improved. In the case of ferroelectric liquid crystal, because of the regulating ability of vertical polymer walls as well as the regulating ability of the substrate subjected to an orientation treatment, the orientation state is stabilized and shock resistance is improved. Moreover, a charge holding type element such as a TFT can be applied to the device without decreasing the electrical holding ratio of the entire device by using liquid crystal molecules having fluorine and/or chlorine atom(s) in their molecules, because the liquid crystal molecules have chemical stability.

A Photopolymerization Initiator Or a Catalyst

As a photopolymerization initiator, Irgacure 184, Irgacure 651, Irgacure 907, Darocure 1173, Darocure 1116, Darocure 2959, etc. can be used. The amount of the photopolymerization initiator is preferably in the range of 0.3% to 5% based on the total amount of the liquid crystal and the polymerizable compound. When the amount is less than 0.3%, sufficient photopolymerization reaction is not conducted; and when the amount is more than 5%, the phase separation between the liquid crystal and the polymer is conducted too fast to be regulated, forming smaller liquid crystal regions and increasing the drive voltage.

A Radical Generating Agent

The radical generating agent generates a radical by being heated. Examples of the radical generating agent include peroxides having a —O—O— bond in molecules such as BPO, t-butyl peroxide, and lauryl peroxide; and azo compound liquid crystal having a —N=N— bond in molecules such as azobis(isobutyronitrile) (AIBN). It is preferred that the radical generating agent is added in an amount of 0.1 to 10% to the mixture of the photopolymerizable material and the photopolymerization initiator. When the added amount of the radical generating agent is less than 0.1%, little effects of curing the remaining monomer after being irradiated with light are obtained; and when the added amount thereof is more than 10%, damage to the liquid crystal material is great, decreasing reliability.

Figure 46:
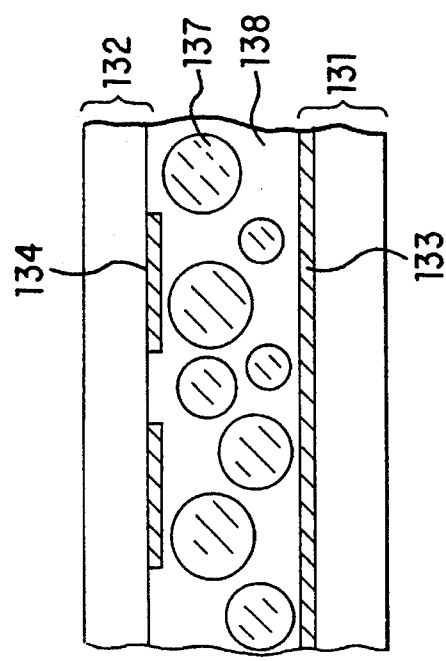
FIG. 46 is a cross-sectional view showing a liquid crystal display device of a light scattering type applicable to the present invention

The present example is applied to a non light scattering type; however, the present example is not limited thereto and can be applied to a light scattering type. FIG. 46 shows a liquid crystal display device of a light scattering type. In this liquid crystal display device, two substrates 131 and 132 having electrode lines 133 and 134, respectively are made to face each other. Between the substrates 131 and 132, a plurality of liquid crystal droplets 137 are dispersed in the polymer walls 138. The liquid crystal droplets 137 are randomly disposed, each of the droplets 137 having nonuniform size.

Hereinafter, the present example will be described by way of illustrating Applications.

APPLICATION 36

First, two flint glasses (manufactured by Nippon Sheet Glass Co., Ltd.) having ITO (a mixture of indium oxide and tin oxide) for electrodes with a thickness of 500 Angstroms were prepared as a substrate with a thickness of 1.1 mm. Then, the two flint glasses were disposed so that the respective ITO surfaces faced each other with spacers with a diameter of 12 μm sandwiched therebetween. Thus, a cell was formed.

Next, a mixture for a display medium was injected into the cell. The mixture homogeneously contained 0.2 g of (R-684, manufactured by Nippon Kayaku K.K.), 0.35 g of 2-ethylhexyl acrylate, 0.45 g of isobornyl acrylate, 4 g of a liquid crystal material (ZLI-4792, manufactured by Merck & Co., Inc.), 0.05 g of a photopolymerization initiator (Irgacure 184), and 0.05 g of lauroyl oxide (laurox, manufactured by Kayaku Akuzo Co., Ltd.) as a radical generating agent (e.g., peroxide).

Next, the cell thus obtained was irradiated with UV-rays at 40 mW/cm$^2$ for one minute by using a high-pressure mercury lamp, whereby the polymerizable compound was cured.

Finally, the cell was allowed to stand in an atmosphere, for example, at 60° C. for 50 hours, whereby a heat treatment was conducted. In this way, a liquid crystal display device of the present invention was manufactured.

COMPARATIVE EXAMPLE 35

A cell was formed in the same way as in Application 36, and a polymer dispersed liquid crystal display device was manufactured by using a material obtained by excluding the radical generating agent from the mixture used in Application 36.

Table 22 shows electro-optic characteristics and a remaining polymer ratio of the liquid crystal display device of Application 36, before and after the heat treatment, together with a peeling state of the cell after the heat treatment. Table 22 also shows the results of Comparative Example 35 formed by heat treatment at 80° C. for 4 hours. The electro-optic characteristics include a drive voltage, hysteresis, response speed, and a electrical holding ratio. The drive voltage is a voltage value at which a transmittance change is saturated. The hysteresis is the difference between the voltage in the case where transmittance is changed by 50% while the voltage increases and the voltage in the case where transmittance is changed by 50% while the voltage decreases. The response speed is the total time required for the transmittance to be changed by 90% (i.e., a sum of a time required when the transmittance is changed by 90% while voltage increases and a time required when the transmittance is changed by 90% while voltage decreases). The electrical holding ratio is the ratio of charge retained for 16.5 ms. In the item for the Peeling state, a mark ○ shows no change after the heat treatment; and a mark × shows that peeling has occurred in the vicinity of the seal. Moreover, the remaining monomer ratio is measured as follows:

One substrate of the cell is peeled off from the other substrate. The polymer dispersed liquid crystal material on the substrate is peeled off and mixed with KBr. Then, the mixture is measured, based on an infrared absorption spectrum.

TABLE 22

|  | Application 36 | | Comparative Example 35 | |
| --- | --- | --- | --- | --- |
|  | Before heat treatment | After heat treatment | Before heat treatment | After heat treatment |
| Drive voltage (V) | 12 | 12 | 12 | 12 |
| Hysteresis (V) | 0.3 | 0.1 | 0.3 | 0.3 |
| Response speed (ms) | 95 | 38 | 98 | 92 |
| Electrical holding ratio (%) | 97 | 97 | 97 | 97 |
| Remaining monomer ratio (%) | 13 | 4 | 14 | 14 |
| Peeling state | — | ○ | — | X |

As is understood from Table 22, in the case of Application 36, the drive voltage and the electrical holding ratio are almost the same as those of a conventional liquid crystal display device (Comparative Example 35). The hysteresis, response speed, remaining monomer ratio, and peeling state are improved, compared with the conventional prepared liquid crystal display device.

APPLICATION 37

First, as shown in FIG. 35, two substrates 71 and 72 were prepared. In the respective substrates 71 and 72, electrode lines 73 and 74 were formed on a PET film with a thickness of 100 μm. The electrode lines 73 and 74 were disposed with an interval of 50 μm between lines, and each side length of the electrode lines 73 and 74 were 200 μm. The number of the electrode lines 73 and 74 was 20. Then, a polyimide film was formed on the respective substrates 71 and 72 using SE150 (manufactured by Nissan Chemical Industries Ltd.) as orientation films 75 and 76, and the polyimide films were subjected to a rubbing treatment in one direction by using a nylon cloth.

Then, the two substrates 71 and 72 subjected to the rubbing treatment were made to face each other so that the respective electrode lines 73 and 74 crossed each other at right angles with spacers having a diameter of 6 μm sandwiched therebetween. Thus, a cell was formed.

The photomask shown in FIG. 43 was placed on the cell so that the masking portions 111 of the photomask covered the pixels, and a mixture was injected into the cell. The mixture homogeneously contained 0.1 g of trimethylol propane trimethacrylate, 0.35 g of 2-ethylhexyl acrylate, 0.45 g of isobornyl acrylate, 4 g of a liquid crystal material (ZLI-4792, manufactured by Merck & Co., Inc.) to which 0.3% of cholesteric nanonate (CN) was added, 0.05 g of a photopolymerization initiator (Irgacure 184), and 0.05 g of a radical generating agent (e.g., peroxide).

The cell thus obtained was irradiated through the photomask with UV-rays at 10 mW/cm$^2$ (the intensity of UV-rays measured at 365 nm) for 5 minutes by using a high-pressure mercury lamp which can provide parallel rays, whereby the polymerizable compound was cured. After that, the cell was heat-treated at 60° C. for 10 hours.

One substrate of another cell formed in the same way as the above was peeled off from the other substrate. Then, the liquid crystal material was washed away from the substrate with acetone. A horizontal cross-section of the polymer walls on the substrate was observed by the SEM, revealing that liquid crystal regions with the same regularity as that of a dot pattern of the photomask (i.e., the same regularity as that of pixels) were uniformly formed, each liquid crystal region having almost the same size. Since some of the liquid crystal regions were damaged during the formation of the sample, 20 liquid crystal regions which had the most excellent regularity were selected for observation.

Finally, polarizing plates were attached to the cell so that the respective polarizing directions were aligned with the orientation directions of the corresponding orientation films, whereby a polymer dispersed TN display device was manufactured.

COMPARATIVE EXAMPLE 36

A cell was formed by using glass with ITO having a thickness of, for example, 500 Angstroms (flint glass, manufactured by Nippon Sheet Glass Co., Ltd.) and using only the same liquid crystal material as that of Application 37. Polarizing plates were attached to the cell in the same way as in Application 37, whereby a conventional TN liquid crystal display device was manufactured.

COMPARATIVE EXAMPLE 37

A TN type cell was formed in the same way as in Application 37. Then, a mixture of the same liquid crystal as that of Application 37 and a photosetting material excluding the polymerizable compound having a liquid crystalline functional group was injected into the cell, and the cell was irradiated with UV-rays in the same way as in Application 37 without using a photomask. Thus, a polymer dispersed liquid crystal display device was manufactured.

Table 23 shows the contrast and peeling state of the liquid crystal display device of Application 37 and those of Comparative Examples 36 and 37.

TABLE 23

|  | Application 37 | Comparative | Comparative |
|---|---|---|---|
| Contrast | 39 | 41 | 9 |
| Peeling state | O | — | X |

As is understood from Table 23, the liquid crystal display device of Application 37 had an electro-optic characteristic comparable to that of Comparative Example 36. Moreover, in Application 37, a film substrate can be used, and contrast is increased due to less light scattering in the pixels, compared with the conventional polymer dispersed liquid crystal display device (Comparative Example 37). Furthermore, in Application 37, almost no peeling occurred between the substrate and the polymer dispersed liquid crystal material.

APPLICATION 38

First, two substrates subjected to a uniaxial orientation treatment in the same way as in Application 37 were made to face each other with silica beads having a diameter of 2 µm sandwiched therebetween so that the respective rubbing directions were aligned. Thus, a cell was formed.

A mixture was injected into the cell thus obtained. The mixture homogeneously contained 0.01 g of trimethylol propane trimethacrylate, 0.025 g of lauryl acrylate, 0.025 g of isobornyl acrylate, 0.4 g of a ferroelectric liquid crystal material (ZLI-4003, manufactured by Merck & Co., Inc.), 0.05 g of a photopolymerization initiator (Irgacure 184), and 0.05 g of a radical generating agent (e.g., lauroyl peroxide).

Then, the photomask which was the same as that of Application 36 was placed on the cell. The cell was irradiated with UV-rays through the photomask at 10 mW/cm$^2$ (the intensity of UV-rays at 365 nm) for 5 minutes by using a high-pressure mercury lamp which can provide parallel rays, whereby the polymerizable compound was cured.

COMPARATIVE EXAMPLE 38

A cell was formed in the same way as in Application 38. Then, the ferroelectric liquid crystal (ZLI-4003) was injected into the cell, whereby a liquid crystal display device was manufactured.

COMPARATIVE EXAMPLE 39

A cell was formed in the same way as in Application 38. Then, the same mixture as that of Application 38 containing the liquid crystal and the photosetting compound was injected into the cell. The cell was irradiated with UV-rays in the same way as in Application 36 without using a photomask, whereby a polymer dispersed liquid crystal display device was manufactured.

Table 24 shows contrast and the results of an impact test of the liquid crystal display device of Application 38 and those of Comparative Examples 38 and 39. The impact test was conducted by dropping the cell from the height of 50 cm to rubber and inspecting the change in the orientation state. A mark O shows that the orientation is slightly disturbed in the boundary regions between the liquid crystal and the polymer causing no practical problems; and a mark × shows that the orientation was disturbed in the pixels. This shows problems for practical use.

TABLE 24

|  | Application 38 | Comparative Example 38 | Comparative Example 39 |
|---|---|---|---|
| Contrast | 38 | 40 | 8 |
| Impact test | O | X | — |

As is understood from Table 24, in Comparative Example 39, the liquid crystal molecules are not sufficiently aligned and contrast is low. As to the impact test, the liquid crystal display device of Comparative Example 39 cannot be evaluated since the liquid crystal molecules are not sufficiently aligned from the beginning. In Comparative Example 38, contrast is satisfactory, however, the result of the impact test is not good. In contrast, in Application 38, contrast is satisfactory and there is no problem with the orientation state in the impact test.

In Example 13, items described in Example 2: A light regulating means such as a photomask, Irradiation light, etc. can be applicable.

EXAMPLE 14

Example 14 is the case where the phase separation between liquid crystal and a polymer is conducted without a photomask so that the liquid crystal and the polymer are not mixed with each other, and each liquid crystal region is disposed with respect to pixel(s).

Hereinafter, the present example will be described by way of illustrating Applications.

APPLICATION 39

A method for manufacturing a polymer dispersed liquid crystal display device including the step of irradiating light in a linear shape to each portion other than pixels will be described.

Figure 47:
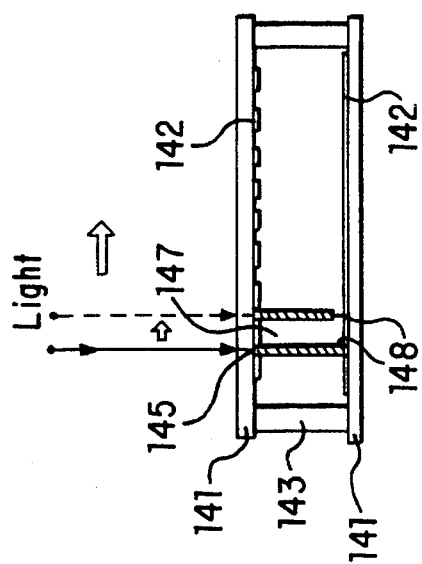
FIG. 47 is a cross-sectional view showing one step of a method for manufacturing a polymer dispersed liquid crystal display device of Application 39.
Figure 48:
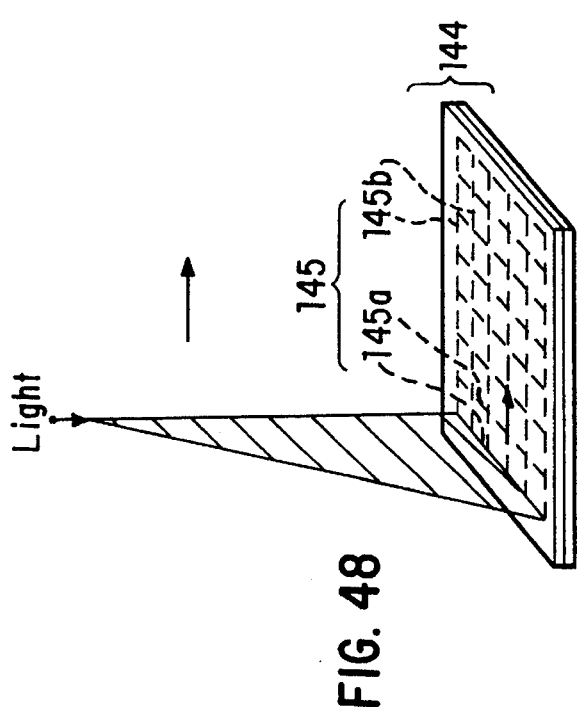
FIG. 48 is a perspective view of FIG. 47.

FIG. 47 is a cross-sectional view showing one step of a method for manufacturing the polymer dispersed liquid crystal display device of Application 39. FIG. 48 is a perspective view of the liquid crystal display device shown in FIG. 47.

First, linear electrodes 142 formed of ITO (a mixture of indium oxide and tin oxide) were formed on two substrates 141. In Application 38, as the substrate 141, flint glass with a thickness of 1.1 mm and a side of 300 mm (manufactured by Nippon Sheet Glass Co., Ltd.) was used. The linear electrodes 142 had a thickness of 500 Angstroms and a width of 200 µm and were disposed with an interval of 50 µm therebetween. The number of the linear electrodes 142 on each substrate was 1000.

Next, polyimide (SE-150, manufactured by Nissan Chemical Industries Ltd.) was coated onto the substrates 141, on which the linear electrodes 142 were formed, by a spin coating method. The substrates 141 thus obtained were heat-treated to form orientation films. After that, the orientation films were subjected to a rubbing treatment in one direction by using a nylon cloth. Then, the two substrates 141 were made to face each other with spacers having a diameter of 6 µm sandwiched therebetween. At this time, the linear electrodes 142 on the respective substrates 141 crossed each other at right angles. Thus, a liquid crystal cell 144 was formed.

Next, a homogeneous mixture containing 0.1 g of trimethylol propane trimethacrylate, 0.4 g of 2-ethylhexyl acrylate and 0.5 g of isobornyl acrylate (as a photopolymerizable Compound; 4 g of a mixture in which 0.3% of cholesteric nanonate was added to ZLI-3700-000 (manufactured by Merck & Co., Inc.) (as liquid crystal); and 0.1 g of Irgacure 184 (as a photopolymerization initiator) was injected into the liquid crystal cell 144. Crossed regions in which the linear electrodes 142 on the respective substrates 141 crossed each other with the mixture sandwiched therebetween became pixels 147.

Then, as shown in FIG. 47, portions (i.e., non-pixel portions 145) excluding the pixels 147 were successively irradiated with a He-Cd laser beam as a linear light by a beam expander. As a result, the photopolymerizable compound in the mixture was cured to form polymer walls 148.

As shown in FIG. 48, the non-pixel portions 145 were formed of a plurality of non-pixel portions 145a aligned in a vertical direction and a plurality of non-pixel portions 145b aligned in a horizontal direction. First of all, as shown in FIG. 48, the non-pixel portions 145a (which were aligned in parallel in one direction) were successively irradiated with light from the end of the cell for 5 minutes each. Then, the non-pixel portions 145b (which crossed the non-pixel portions 145a) were successively irradiated with light for 5 minutes each in the same way. After that, a phase separation occurred between the liquid crystal and the polymer, whereby the polymer walls 148 were formed in the light-irradiated regions.

One substrate of the liquid crystal cell thus obtained was peeled off from the other substrate. Then, the liquid crystal material was washed away with acetone. A cross-section of the polymer walls 148 were observed by the SEM, revealing that the liquid crystal regions with the same regularity as that of the pixels were uniformly formed, each liquid crystal region having almost the same size, and the polymer walls with regularity were formed.

Polarizing plates were attached to the cell thus formed so that each polarizing direction was aligned with the orientation of the cell, whereby a polymer dispersed liquid crystal display device was obtained.

The transmittance of light passed through the liquid crystal display device under no voltage applied and the transmittance of light passed through the device under an applied 10 V voltage were measured. The ratio of the respective light transmittance, i.e., (light transmittance under an applied voltage)/(light transmittance under no applied voltage) was calculated to obtain contrast. The contrast of Application 39 was 38. When the liquid crystal display device was raised, non display irregularity was observed.

In Application 39, all of the non-pixel portions 145 were irradiated with light, whereby each liquid crystal region was formed in each pixel. However, the present invention is not limited thereto. If it is desired to form each liquid crystal region in a plurality of adjacent pixels 147, the non-pixel portions 145 can partially be irradiated with light.

APPLICATION 40

Figure 49:
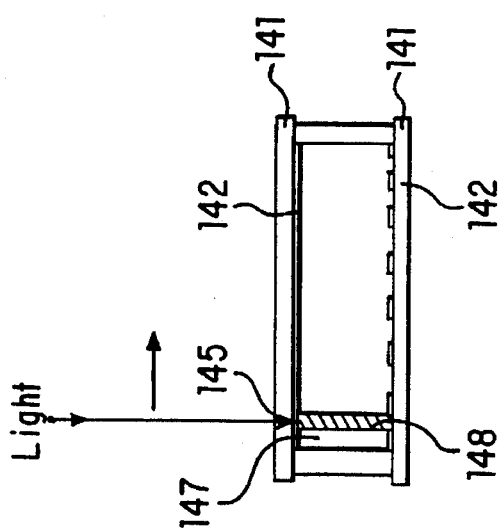
FIG. 49 is a cross-sectional view showing one step of a method for manufacturing a surface stabilized ferroelectric liquid crystal (SSFLC) display device of Application 40.
Figure 50:
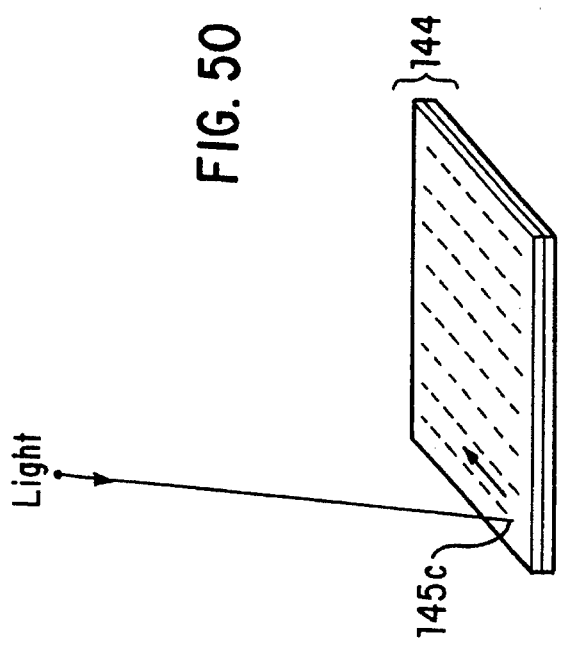
FIG. 50 is a perspective view of FIG. 49.

A method for manufacturing a surface stabilized ferroelectric liquid crystal (SSFLC) display device including the step of irradiating light in a spot shape to each portion other than pixels. FIG. 49 is a cross-sectional view showing one step of the method for manufacturing the surface stabilized ferroelectric liquid crystal (SSFLC) display device of Application 49. FIG. 50 is a perspective view of the liquid crystal display device shown in FIG. 49.

First, linear electrodes 142 formed of ITO with a thickness of 1000 Angstroms were formed on two substrates 141 by a wet etching method. Next, polyimide with a thickness of 500 Angstroms was coated onto the substrates 141, on which the linear electrodes 142 were formed, by a spin coating method. The substrates 141 thus obtained were heated at 200° C. for one hour to form orientation films. After that, the orientation films were subjected to a rubbing treatment in one direction. Then, the two substrates 141 were made to face each other with SiO beads having a diameter of 1.7 µm sandwiched therebetween. At this time, the linear electrodes 142 on the respective substrates 141 faced and crossed each other at right angles, and the rubbing directions of the respective substrates 141 were aligned. Thus, a liquid crystal cell 144 was formed.

Next, a homogeneous mixture containing the same photopolymerizable compound as that of Application 39, a liquid crystal material (ZLI-4237-000, manufactured by Merck & Co., Inc.), and 0.1 g of a photopolymerization initiator (Irgacure 184) was injected into the liquid crystal cell 144, under the condition that the mixture exhibited an isotropic liquid crystal phase at ordinary pressure.

Then, as shown in FIG. 49, the cell was irradiated with a He-Cd laser beam, while non-pixel portions 145 were point-scanned. As shown in FIG. 50, the non-pixel portions were formed of non-pixel portions 145c in a dot shape.

First of all, as shown in FIG. 50, the non-pixel portion 145c situated at the end of the substrate 141 was irradiated with light in a spot shape, and then the other non-pixel portions 145c were scanned at a speed of 1 mm/min. After that, the phase separation occurred between the liquid crystal and the polymer, whereby polymer walls 148 were formed in the light-irradiated regions.

Polarizing plates were attached to the cell in the same way as in Application 39 so that each polarizing direction was aligned with the orientation of the cell, whereby a liquid crystal display device was obtained.

In Application 40, all of the non-pixel portions 145 were irradiated with light, whereby each liquid crystal region is formed in each pixel. The present invention is not limited thereto. If it is desired that each liquid crystal region be formed in a plurality of adjacent pixels, the non-pixel portions 145 can partially be irradiated with light.

APPLICATION 41

Figure 51:
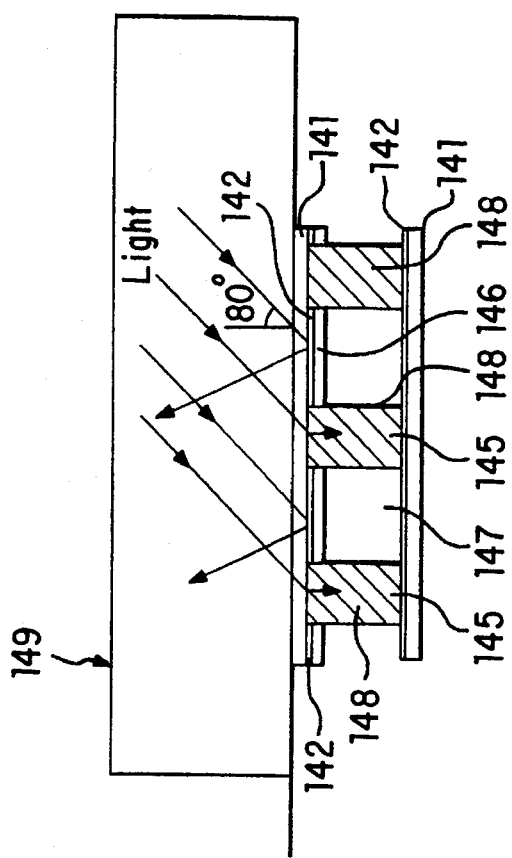
FIG. 51 is a cross-sectional view showing one step of a method for manufacturing a surface stabilized ferroelectric liquid crystal (SSFLC) display device of Application 41.

A method for manufacturing a surface stabilized ferroelectric liquid crystal (SSFLC) display device will be described. This method includes the steps of forming an insulating film on linear electrodes provided on one transparent substrate and irradiating light to a portion of a mixture which is not covered with the insulating film. FIG. 51 is a cross-sectional view showing one step of the method for manufacturing the surface stabilized ferroelectric liquid crystal (SSFLC) display device of Application 41.

Linear electrodes 142 were formed on two substrates 141 in the same way as in Application 40. Then, an insulating film 146 (refractive index: 1.4) formed of OCD (manufactured by Tokyo Ohyo Kagaku Co., Ltd.) was formed only on the linear electrode 142 provided on one substrate 141. The refractive index of the linear electrode 142 was 1.5. Then, the same steps as those of Application 40 were used to form a liquid crystal cell 144. The same mixture as that of Application 40 was injected into the cell.

Next, as shown in FIG. 51, parallel rays (UV-rays) were irradiated through toluene in a container 149 to the substrate 141 on which the insulating film 146 was formed at an incident angle of 80°. In this case, since light was passed through non-pixel portions 145, the photopolymerizable compound contained in the mixture was cured. In pixels 147, a double structure including the linear electrode 142 and the insulating film 146 was formed, so that light was reflected from the interface between the linear electrode 142 and the insulating film 146. Thus, in the pixels 147, a photosetting reaction was not conducted. Because of this, the photopolymerizable compound was selectively cured with regularity, and phase separation occurred between the liquid crystal and the polymer, whereby polymer walls 148 were formed only in the non-pixel portions 145. In application 41, the cell was irradiated with UV-rays at 10 mW/cm$^2$ for 10 minutes by using a high-pressure mercury lamp which can provide parallel rays.

Polarizing plates were attached to the cell in the same way as in Application 39, whereby a liquid crystal display device was obtained.

Tables 25 and 26 show the results obtained by measuring shock resistance, using the liquid crystal display devices of Applications 40 and 41. The disturbance of the liquid crystal molecules orientation was checked in a pressure test by applying a load of 5 kgf/cm$^2$ at a speed of 0.5 mm/min and in a drop test by allowing the cell to drop by its own weight from a height of 5 cm to a floor.

TABLE 25

| Results of a pressure test | |
|---|---|
| | Evaluation |
| Application 40 | Partial disturbance of the orientation was found in the entire region to which a pressure was applied. |
| Application 41 | Partial disturbance of the orientation was found in the entire region to which a pressure was applied. |

TABLE 26

| Drop test | |
|---|---|
| | Evaluation |
| Application 40 | No disturbance of the orientation was found. |
| Application 41 | No disturbance of the orientation was found. |

As is understood from Tables 25 and 26, the liquid crystal display devices of Applications 40 and 41 have satisfactory durability of their liquid crystal, and the cell thickness can be maintained with precision.

Hereinafter, materials and the like applicable to the present example will be described.

An Optical Source Used For Light Irradiation

In the case of irradiating light over the entire surface of the substrate, a mercury lamp is used. In the case of irradiating light to part of the surface of the substrate, a He-Cd laser, an excimer laser, and a dye laser can be used.

The materials described: A polymer material, A liquid crystal material, and A photopolymerization initiator in Example 2 can be used in the present example.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising:

two substrates facing each other, at least one of the substrates being transparent;

electrodes disposed on inside surfaces of the respective substrates;

a display medium which is provided between the two substrates and formed of polymer walls and liquid crystal regions partitioned by the polymer walls; and a plurality of pixels, wherein an interval a between a center of one liquid crystal region and a center of an adjacent liquid crystal region in a direction along a surface of the substrate is within a width of one pixel along the direction, and 80% or more of the intervals a satisfy the relationship: $3b/2 > a > b/2$, where b is an average of the intervals a.

2. A method for manufacturing a liquid crystal display device having a plurality of pixels, comprising the steps of:

providing a mixture containing a photopolymerizable compound and a liquid crystal material between a pair of substrates, two substrates facing each other, at least one of the substrates being transparent, electrodes being disposed on inside surfaces of the respective substrates; and irradiating light to the mixture with a light intensity distribution in which light intensity of at least one portion of each pixel is 90% or less of a maximum illuminance in a circular area which corresponds to 10 times the pixel area and whose center is situated in a center of the pixel.

3. A method for manufacturing a liquid crystal display device according to claim 2, wherein a photomask having a pattern with regularity is placed on the transparent substrate, and light is irradiated through the photomask to the mixture provided between the substrates.

4. A method for manufacturing a liquid crystal display device according to claim 3, wherein the pattern with regularity is formed on the photomask, and the pattern covers 30% or more of at least each pixel.

5. A method for manufacturing a liquid crystal display device according to claim 3, wherein the pattern with regularity is formed on the photomask, a minimum repeating unit of the pattern has a size within a circle having a diameter in the range of 1 μm to 50 μm, and an interval between a center of one unit and a center of an adjacent unit is in the range of 1 μm to 50 μm.

6. A method for manufacturing a liquid crystal display device according to claim 2, wherein the photomask having a pattern with regularity is placed inside one of the substrates, and light is irradiated through the photomask to the mixture provided between the substrates.

7. A method for manufacturing a liquid crystal display device according to claim 6, wherein the pattern with regularity is formed on the photomask, and the pattern covers 30% or more of at least each pixel.

8. A method for manufacturing a liquid crystal display device according to claim 7, wherein the pattern with regularity is formed on the photomask, a minimum repeating unit of the pattern has a size within a circle having a diameter in the range of 1 μm to 50 μm, and an interval between a center of one unit and a center of an adjacent unit is in the range of 1 μm to 50 μm.

9. A liquid crystal display device comprising:

two substrates facing each other, at least one of the substrates being transparent, electrodes disposed on inside surfaces of the respective substrates; and a display medium which is provided between the two substrates and formed of polymer walls containing a polymer as their main component and liquid crystal regions containing liquid crystal as their main component;

wherein the liquid crystal regions are partitioned by the polymer walls and are close to the substrates, portions of the liquid crystal regions close to the substrates being in parallel with the substrates.

10. A liquid crystal display device according to claim 9, wherein an orientation direction of a plurality of liquid crystal molecules contained in each of the liquid crystal regions is concentric along the polymer walls within a plane which is in parallel with the substrates.

11. A liquid crystal display device according to claim 9, wherein each of the liquid crystal regions has a plurality of liquid crystal domains and an orientation direction of each of the liquid crystal domains is concentric along the polymer walls within a plane which is in parallel with the substrates.

12. A liquid crystal display device according to claim 9, wherein each of the liquid crystal regions has an inside liquid crystal domain situated in a center thereof, a polymer region surrounding an outside of the inside liquid crystal domain, and a plurality of outside liquid crystal domains surrounding an outside of the polymer region; and the respective outside liquid crystal domains are aligned in a radial manner within a plane which is in parallel with the substrates.

13. A liquid crystal display device according to claim 9, wherein the liquid crystal regions have a plurality of liquid crystal domains, and an orientation direction of each of the liquid crystal domains is different within a plane which is in parallel with the substrates.

14. A liquid crystal display device according to claim 9, wherein the liquid crystal regions have a polymer region positioned in the center thereof and a plurality of liquid crystal domains surrounding an outside of the polymer region, and the respective liquid crystal domains are aligned in a radial manner within a plane which is in parallel with the substrates.

15. A liquid crystal display device according to claim 9, comprising a plurality of pixels, wherein the liquid crystal regions are provided in at least one pixel.

16. A liquid crystal display device according to claim 15, wherein at least one liquid crystal region contained in the at least one pixel has a size of 30% or more of the pixel size.

17. A liquid crystal display device according to claim 15, wherein an orientation direction of a plurality of liquid crystal molecules contained in each of the liquid crystal regions is concentric along the polymer walls within a plane which is in parallel with the substrates.

18. A liquid crystal display device according to claim 15, wherein each of the liquid crystal regions has a plurality of liquid crystal domains, and an orientation direction of each of the liquid crystal domains is concentric along the polymer walls within a plane which is in parallel with the substrates.

19. A liquid crystal display device according to claim 15, wherein the liquid crystal regions have an inside liquid crystal domain positioned in a center thereof, a polymer region surrounding an outside of the inside liquid crystal domain, and a plurality of outside liquid crystal domains surrounding an outside of the polymer region; and the respective outside liquid crystal domains are aligned in a radial manner within a plane which is in parallel with the substrates.

20. A liquid crystal display device according to claim 15, wherein the liquid crystal regions have a plurality of liquid crystal domains, and an orientation direction of each of the liquid crystal domains is different within a plane which is in parallel with the substrates.

21. A liquid crystal display device according to claim 15, wherein the liquid crystal regions have a polymer region positioned in a center thereof and a plurality of liquid crystal domains surrounding an outside of the polymer region; and the respective liquid crystal domains are aligned in a radial manner within a plane which is in parallel with the substrates.

22. A liquid crystal display device according to claim 9, comprising a plurality of pixels, wherein two or more of the liquid crystal regions are entirely or partially provided in one pixel.

23. A liquid crystal display device according to claim 22, wherein the pixel has a longitudinal side of 200 μm or more.

24. A liquid crystal display device according to claim 22, wherein an orientation direction of a plurality of liquid crystal molecules contained in the liquid crystal regions are concentric along the polymer walls within a plane which is in parallel with the substrates.

25. A liquid crystal display device according to claim 22, wherein each of the liquid crystal regions has a plurality of liquid crystal domains, and an orientation direction of each of the liquid crystal domains is concentric along the polymer walls within a plane which is in parallel with the substrates.

26. A liquid crystal display device according to claim 22, wherein each of the liquid crystal domains has an inside liquid crystal domain positioned in a center thereof, a polymer region surrounding an outside of the inside liquid crystal domain, and a plurality of liquid crystal domains surrounding an outside of the polymer region; and the respective outside liquid crystal domains are aligned in a radial manner within a plane which is in parallel with the substrates.

27. A liquid crystal display device according to claim 22, wherein the liquid crystal region has a plurality of liquid crystal domains, and an orientation direction of each of the liquid crystal domains is different within a plane which is in parallel with the substrates.

28. A liquid crystal display device according to claim 22, wherein each of the liquid crystal regions has a polymer region positioned in a center thereof and a plurality of liquid crystal domains surrounding an outside of the polymer region, and the respective liquid crystal domains are aligned in a radial manner within a plane which is in parallel with the substrates.

29. A liquid crystal display device according to claim 9, wherein a plurality of liquid crystal molecules contained in each of the liquid crystal regions are aligned in a helical manner along a helical axis which is vertical with respect to the substrates.

30. A liquid crystal display device according to claim 29, wherein the plurality of liquid crystal molecules contained in each of the liquid crystal regions are provided with a helical pitch of 15 µm to 100 µm.

31. A liquid crystal display device according to claim 9, wherein $d \times \Delta n$ is in the range of 0.4 µm to 1.1 µm; and a distance between the substrates is in the range of 3 µm to 10 µm, where d is a thickness between horizontal portions in each of the liquid crystal regions and $\Delta n$ is anisotropy of refractive index thereof.

32. A liquid crystal display device according to claim 9, wherein the display medium has a structure in which a liquid crystalline compound is fixed in the vicinity of an interface between the liquid crystal region and the polymer wall.

33. A liquid crystal display device according to claim 32, wherein anisotropy of dielectric constant $\Delta \epsilon_L$ of the liquid crystal region and anisotropy of dielectric constant $\Delta \epsilon_p$ of the liquid crystalline compound have a relationship of $\Delta \epsilon_L \times \Delta \epsilon_p < 0$.

34. A liquid crystal display device according to claim 32, wherein the liquid crystalline compound has at least one of a fluorine atom and a chlorine atom and the liquid crystal region is formed from a liquid crystal material having at least one of fluorine atom and a chlorine atom in its molecule.

35. A liquid crystal display device according to claim 34, wherein the liquid crystalline compound has an optically active group in its molecule and the liquid crystal region is formed from ferroelectric liquid crystal.

36. A liquid crystal display device according to claim 32, wherein the polymer walls are formed in a liquid crystal state.

37. A liquid crystal display device according to claim 36, wherein the liquid crystal regions and the polymer walls contain a dichroic dye.

38. A liquid crystal display device according to claim 32, wherein the polymer walls are formed in a liquid crystal state, and the polymer walls and the liquid crystal regions are in the same orientation when no voltage is applied to the display medium.

39. A liquid crystal display device according to claim 38, wherein at least one of the substrates has an orientation film in contact with the display medium, and the polymer walls and the liquid crystal regions are in the same orientation, based on the orientation film.

40. A liquid crystal display device according to claim 39, wherein the liquid crystal regions and the polymer walls contain a dichroic dye.

41. A liquid crystal display device according to claim 9, wherein anisotropy of dielectric constant $\Delta \epsilon_L$ of the liquid crystal region and anisotropy of dielectric constant $\Delta \epsilon_p$ of the liquid crystalline compound have a relationship of $\Delta \epsilon_L \times \Delta \epsilon_p < 0$.

42. A liquid crystal display device according to claim 9, wherein a remaining monomer ratio obtained from infrared absorption caused by a double bond between carbons in the polymer wall and infrared absorption caused by a carbonyl group of an ester in the polymer wall is 10% or less.

43. A liquid crystal display device according to claim 9, wherein a light-intercepting mask is placed on one of the substrates so that light-intercepting portions of the mask cover portions where the substrate and the polymer walls are in contact with each other.

44. A liquid crystal display device according to claim 43, wherein the light-intercepting mask is placed so that the light-intercepting portions thereof cover 50% or more of the respective portions where the substrate and the polymer walls are in contact with each other.

45. A liquid crystal display device according to claim 9, wherein orientation films are respectively formed on the electrodes mounted on the substrates.

46. A liquid crystal display device according to claim 45, wherein the orientation films are uniaxially aligned by an orientation treatment.

47. A liquid crystal display device according to claim 45, wherein at least one of the orientation films contain a photopolymerization initiator.

48. A liquid crystal display device according to claim 9, wherein a polarizing plate is provided outside of at least one of the substrates.

49. A method for manufacturing a liquid crystal display device having a plurality of pixels, comprising the steps of:

providing a mixture containing a photopolymerizable compound and a liquid crystal material between a pair of substrates, two substrates facing each other, at least one of the substrates being transparent, and electrodes being disposed on inside surfaces of the respective substrates, thereby forming a cell; and irradiating the mixture with light under the condition that intensity of light is reduced in predetermined portions of the mixture, thereby forming a display medium between the substrates, the display medium having polymer walls containing a polymer as their main component and liquid crystal regions containing liquid crystal as their main component.

50. A method for manufacturing a liquid crystal display device according to claim 49, wherein the predetermined portions correspond to at least one pixel, whereby the liquid crystal regions are provided in at least one pixel.

51. A method for manufacturing a liquid crystal display device according to claim 49, wherein an area of each of the predetermined portions corresponds to 30% or more of each pixel area, whereby at least one liquid crystal region contained in the pixel is made 30% or more of the pixel area.

52. A method for manufacturing a liquid crystal display device according to claim 49, wherein means for reducing intensity of light is a photomask, and the photomask is placed on the side of the display medium of one of the substrates.

53. A method for manufacturing a liquid crystal display device according to claim 49, wherein the mixture is irradiated with light through a photomask, the photomask having a plurality of masking portions for forming the liquid crystal regions and each of the masking portion having at least one light transmission hole at least in a center thereof, whereby liquid crystal domains are formed in a radial manner in each of the liquid crystal regions.

54. A method for manufacturing a liquid crystal display device according to claim 53, using a photomask having masking portions for forming the liquid crystal regions, each of the masking portions having a light transmission hole in a center thereof and light transmission slits disposed in a radial manner around the transmission hole.

55. A method for manufacturing a liquid crystal display device according to claim 49, wherein the mixture is irradiated with light while alternating a light-irradiating period and a non light-irradiating period.

56. A method for manufacturing a liquid crystal display device according to claim 49, wherein the mixture further contains a compound having effects for suppressing photopolymerization.

57. A method for manufacturing a liquid crystal display device according to claim 49, wherein the display medium having walls containing a polymer as their main component and liquid crystal regions containing liquid crystal as their main component is formed between the substrates by irradiating light to all of the portions or part thereof excluding the pixels.

58. A method for manufacturing a liquid crystal display device according to claim 57, wherein light which is irradiated to all of the portions or part thereof excluding the pixels is linear light.

59. A method for manufacturing a liquid crystal display device according to claim 57, wherein light irradiation to all of the portions or part thereof excluding the pixels is conducted while spot light in a dot shape is moved.

60. A method for manufacturing a liquid crystal display device according to claim 49, wherein means for reducing intensity of light is an insulating film formed on the electrode of one of the substrates, and the display medium having walls containing a polymer as its main component and liquid crystal regions containing liquid crystal as its main component is formed between the substrates by irradiating light to the mixture from the side of the substrate on which the insulating film is formed.

61. A method for manufacturing a liquid crystal display device according to claim 49, wherein the step of forming a cell is conducted by attaching the two substrates after providing the mixture on one of the substrates.

62. A method for manufacturing a liquid crystal display device according to claim 49, wherein polarizing plates are formed on external surfaces of the two substrates.

63. A method for manufacturing a liquid crystal display device having a plurality of pixels, comprising the steps of:
   forming an orientation film containing a photopolymerization initiator on at least one of a pair of substrates, two substrates facing each other, at least one of the substrates being transparent, and electrodes being disposed on inside surfaces of the respective substrates;
   subjecting the substrate on which the orientation film is formed to a rubbing treatment in one direction;
   providing a mixture containing a photopolymerizable compound and a liquid crystal material between the pair of substrates after the rubbing treatment; and
   forming a display medium having polymer walls containing a polymer as their main component and liquid crystal regions containing liquid crystal as their main component by curing the photopolymerizable compound.

64. A method for manufacturing a liquid crystal display device according to claim 63, wherein the photopolymerizable compound contained in the mixture contains a liquid crystalline compound having at least one polymerizable functional group in its molecule.

65. A method for manufacturing a liquid crystal display device according to claim 64, wherein a compound having a polymerizable functional group, at least one of a fluorine atom and a chlorine atom in its molecule is used as the liquid crystalline compound, and a liquid crystal material having at least one of a fluorine and a chlorine atom in its molecule is used for the liquid crystal regions.

66. A method for manufacturing a liquid crystal display device according to claim 65, wherein a compound having a polymerizable functional group and an optically active group in its molecule is used as the liquid crystalline compound, and ferroelectric liquid crystal is used for the liquid crystal regions.

67. A method for manufacturing a liquid crystal display device according to claim 63, wherein UV-rays are irradiated to the mixture so that portions where the liquid crystal regions are to be formed become weak light-irradiated regions, thereby optically polymerizing the photopolymerizable compound.

68. A method for manufacturing a liquid crystal display device according to claim 67, wherein means for forming weak light-irradiated regions is a photomask, and the photomask is placed on the side of the display medium of one of the substrates.

69. A method for manufacturing a liquid crystal display device according to claim 63, wherein the step of forming a cell is conducted by attaching the two substrates after providing the mixture on one of the substrates.

70. A method for manufacturing a liquid crystal display device according to claim 63, wherein polarizing plates are formed on external surfaces of the two substrates.

71. A method for manufacturing a liquid crystal display device having a plurality of pixels, comprising the steps of:
   forming a thin film pattern containing a photopolymerization initiator on one surface of at least one of a pair of substrates, the substrates respectively having electrodes and at least one of the substrates being transparent;
   providing a mixture containing a polymerizable compound and a liquid crystal material between the pair of substrates, at least one of the substrates having the thin film pattern, thereby forming a cell; and
   forming a display medium between the substrates by curing the polymerizable compound, the display medium having polymer walls containing a polymer as their main component and liquid crystal regions containing liquid crystal as their main component.

72. A method for manufacturing a liquid crystal display device according to claim 71, wherein the polymerization initiator is a photopolymerization initiator, the polymerizable compound is a photopolymerizable compound, a photomask allowing 50% or more of the thin film pattern to be exposed is placed outside of one of the substrates, and light is irradiated to the photopolymerizable initiator and the photopolymerizable compound through the photomask to cure the photopolymerizable compound.

73. A method for manufacturing a liquid crystal display device according to claim 72, wherein the photopolymerizable compound contained in the mixture contains a liquid crystalline compound having at least one kind of polymerizable functional group at its molecule.

74. A method for manufacturing a liquid crystal display medium according to claim 73, wherein a compound having a polymerizable functional group, and at least one of a fluorine atom and a chlorine atom in its molecule is used as the liquid crystalline compound; and a liquid crystal material having at least one of a fluorine atom and a chlorine atom in its molecule is used for the liquid crystal regions.

75. A method for manufacturing a liquid crystal display device according to claim 73, wherein a compound having a polymerizable functional group and an optically active group in its molecule is used as the liquid crystalline compound and ferroelectric liquid crystal is used for the liquid crystal regions.

76. A method for manufacturing a liquid crystal display device according to claim 71, wherein UV-rays are irradiated to the mixture so that portions where the liquid crystal regions are to be formed become weak light-irradiated regions, thereby optically polymerizing the polymerizable compound.

77. A method for manufacturing a liquid crystal display device according to claim 71, wherein the polymerization initiator is a heat polymerization initiator, the polymerizable compound is a heat polymerizable compound, and the heat polymerization initiator and the mixture are heated to cure the heat polymerizable compound.

78. A method for manufacturing a liquid crystal display device according to claim 71, wherein the step of forming a cell is conducted by attaching the two substrates after providing the mixture on one of the substrates.

79. A method for manufacturing a liquid crystal display device according to claim 71, wherein polarizing plates are formed on external surfaces of the two substrates.

80. A method for manufacturing a liquid crystal display device having a plurality of pixels, comprising the steps of:
    providing a mixture between a pair of substrates facing each other, thereby forming a cell, at least one of the substrates being transparent, electrodes being disposed on inside surfaces on the respective substrates, the mixture containing a liquid crystal material, a polymerizable liquid crystalline material having a liquid crystalline functional group in its molecule, a polymerizable compound, and a polymerization initiator, anisotropy of dielectric constant $\Delta\epsilon_L$ of the liquid crystal material and anisotropy of dielectric constant $\Delta\epsilon_p$ of the polymerizable liquid crystalline material having a relationship of $\Delta\epsilon_L \times \Delta\epsilon_p < 0$, and
    forming a display medium between the substrates by polymerizing the polymerizable compound, the display medium having polymer walls containing a polymer as their main component and liquid crystal regions containing liquid crystal as their main component, providing the liquid crystalline functional groups in the liquid crystal regions to fix a liquid crystalline polymer on the polymer walls.

81. A method for manufacturing a liquid crystal display device according to claim 80, wherein the polymerizable compound is a photopolymerizable compound, the polymerization initiator is a photopolymerization initiator, and the polymerizable compound is optically polymerized.

82. A method for manufacturing a liquid crystal display device according to claim 81, wherein UV-rays are irradiated to the mixture so that portions where the liquid crystal regions are to be formed become weak light-irradiated regions, thereby optically polymerizing the mixture.

83. A method for manufacturing a liquid crystal display device according to claim 82, wherein means for forming the weak light-irradiated regions is a photomask, and the photomask is placed on the side of the display medium of one of the substrates.

84. A method for manufacturing a liquid crystal display device according to claim 80, wherein the polymerizable compound is a heat polymerizable compound, the polymerization initiator is a heat polymerization initiator, and the polymerizable compound is polymerized by heating.

85. A method for manufacturing a liquid crystal display device according to claim 80, wherein a compound having at least one of a fluorine atom and a chlorine atom in its molecule is used as the liquid crystal material and the polymerizable liquid crystalline material.

86. A method for manufacturing a liquid crystal display device according to claim 80, wherein the step of forming a cell is conducted by attaching the two substrates after providing the mixture on one of the substrates.

87. A method for manufacturing a liquid crystal display device according to claim 80, wherein the step of forming a cell comprises the steps of:
    coating the mixture onto one of the substrates, the mixture further containing a solvent capable of homogeneously dissolving the liquid crystal material and the polymerizable liquid crystalline material;
    removing the solvent from the mixture coated onto one of the substrates by evaporation to provide the liquid crystalline functional groups in the liquid crystal regions, thereby fixing a liquid crystalline compound on the polymer walls; and
    placing the other substrate on the substrate on which the mixture is coated.

88. A method for manufacturing a liquid crystal display device according to claim 80, wherein polarizing plates are formed on external surfaces of the two substrates.

89. A method for manufacturing a liquid crystal display device having a plurality of pixels, comprising the steps of:
    providing a mixture between a pair of substrates facing each other, thereby forming a cell, at least one of the substrates being transparent, electrodes being disposed on inside surfaces of the respective substrates, the mixture containing a liquid crystal material, a photopolymerizable compound, a photopolymerization initiator, and a radical generating agent;
    irradiating light to the mixture to cause a phase separation, thereby obtaining a state in which liquid crystal regions are dispersed in the polymer walls; and
    thermally decomposing the radical generating agent by heating the display medium.

90. A method for manufacturing a liquid crystal display device according to claim 89, wherein UV-rays are irradiated to the mixture so that portions where the liquid crystal regions are to be formed become weak light-irradiated regions, thereby optically polymerizing the polymerizable compound.

91. A method for manufacturing a liquid crystal display device according to claim 90, wherein means for forming the weak light-irradiated regions is a photomask, and the photomask is placed on the side of the display medium of one of the substrates.

92. A method for manufacturing a liquid crystal display device according to claim 89, wherein a liquid crystal material of at least one of a fluorine type and chlorine type is used as the liquid crystal material.

93. A method for manufacturing a liquid crystal display device according to claim 89, wherein the photopolymerizable compound contains a photopolymerizable liquid crystal compound.

94. A method for manufacturing a liquid crystal display device according to claim 89, wherein the step of forming a cell is conducted by attaching the two substrates after providing the mixture on one of the substrates.

95. A method for manufacturing a liquid crystal display device according to claim 89, wherein polarizing plates are formed on external surfaces of the two substrates.

* * * * *

UNITED STATES PATENT AND TRADEMARK OFFICE
CERTIFICATE OF CORRECTION

PATENT NO. : 5,473,450
DATED : December 5, 1995
INVENTOR(S) : Yamada, et al

It is certified that error appears in the above-indentified patent and that said Letters Patent is hereby corrected as shown below:

In column 19, line 28, "discrimination" should read -- disclination --.

In column 81, line 40, "D-S-G" should read -- D-E-G --.

Signed and Sealed this

Twenty-third Day of July, 1996

*Attest:*

BRUCE LEHMAN

*Attesting Officer*     *Commissioner of Patents and Trademarks*